US012700676B2

(12) United States Patent
Sampo

(10) Patent No.: US 12,700,676 B2
(45) Date of Patent: Aug. 4, 2026

(54) ANTENNA DEVICE

(71) Applicant: YOKOWO CO., LTD., Tokyo (JP)

(72) Inventor: Takeshi Sampo, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 73 days.

(21) Appl. No.: 18/699,393

(22) PCT Filed: Sep. 29, 2022

(86) PCT No.: PCT/JP2022/036412
§ 371 (c)(1),
(2) Date: Apr. 8, 2024

(87) PCT Pub. No.: WO2023/068008
PCT Pub. Date: Apr. 27, 2023

(65) Prior Publication Data

US 2024/0413535 A1 Dec. 12, 2024

Related U.S. Application Data

(60) Provisional application No. 63/270,628, filed on Oct. 22, 2021.

(51) Int. Cl.

| | |
|---|---|
| ***H01Q 9/04*** | (2006.01) |
| ***H01Q 1/42*** | (2006.01) |
| ***H01Q 1/48*** | (2006.01) |
| ***H01Q 21/28*** | (2006.01) |

(52) U.S. Cl.
CPC ............ *H01Q 9/0407* (2013.01); *H01Q 1/42* (2013.01); *H01Q 1/48* (2013.01); *H01Q 9/0428* (2013.01); *H01Q 21/28* (2013.01)

(58) Field of Classification Search
None
See application file for complete search history.

(56) References Cited

U.S. PATENT DOCUMENTS

2002/0075192 A1 6/2002 Iwai et al.
2004/0252061 A1 12/2004 Vance
2019/0356036 A1* 11/2019 Hayakawa ............ H01Q 1/325

FOREIGN PATENT DOCUMENTS

JP H11-340719 A 12/1999
JP 2002223114 A 8/2002
JP 2005124048 A * 5/2005
JP 2006527557 A 11/2006
JP 2009-267765 A 11/2009

(Continued)

OTHER PUBLICATIONS

International Search Report for PCT/JP2022/036412, mailed on Dec. 20, 2022.

(Continued)

*Primary Examiner* — Crystal L Hammond
(74) *Attorney, Agent, or Firm* — Rabin & Berdo, P.C.

(57) ABSTRACT

An antenna device includes: a patch antenna; and a ground portion at which the patch antenna is disposed, the ground portion having an external form obtained by forming a cutout portion in a rectangle, the cutout portion overlapping with at least a part of the patch antenna, in side view. Further, a first center of the patch antenna is shifted toward a long side of the rectangle having the cutout portion formed therein, relative to a second center of the rectangle.

15 Claims, 35 Drawing Sheets

(56) References Cited

FOREIGN PATENT DOCUMENTS

| | | | |
|---|---|---|---|
| JP | 2011066713 | A | 3/2011 |
| JP | 2012029137 | A | 2/2012 |

OTHER PUBLICATIONS

Written Opinion of the International Searching Authority for PCT/JP2022/036412, mailed on Dec. 20, 2022.

International Search Report and Written Opinion with English Translation of related PCT/JP2022/036410 dated Dec. 13, 2022.

U.S. Office Action issued in related U.S. Appl. No. 18/690,671 dated Dec. 17, 2025.

* cited by examiner

ANTENNA DEVICE

TECHNICAL FIELD

The present disclosure relates to an antenna device.

BACKGROUND ART

PTL1 discloses an antenna device in which a patch antenna is disposed at the same ground portion at which an antenna element for telephone (hereinafter, may be referred to as "element") is disposed.

Citation List

Patent Literature

[PTL 1] Japanese Patent Application Publication No. 2009-267765

Summary of Invention

Technical Problem

Depending on the shape of the ground portion where the patch antenna is disposed, the axial ratio of the patch antenna may deteriorate.

An example of an object of the present disclosure is to improve the axial ratio of a patch antenna. Other objects of the present disclosure will become apparent from the present Description given herein.

Solution to Problem

An aspect of the present disclosure is an antenna device comprising: a patch antenna; and a ground portion at which the patch antenna is disposed, the ground portion having an external form obtained by forming a cutout portion in a rectangle, the cutout portion overlapping with at least a part of the patch antenna, in side view.

According to an aspect described above of the present disclosure, it is possible to improve the axis ration of a patch antenna.

DESCRIPTION OF EMBODIMENTS

Figure 1:
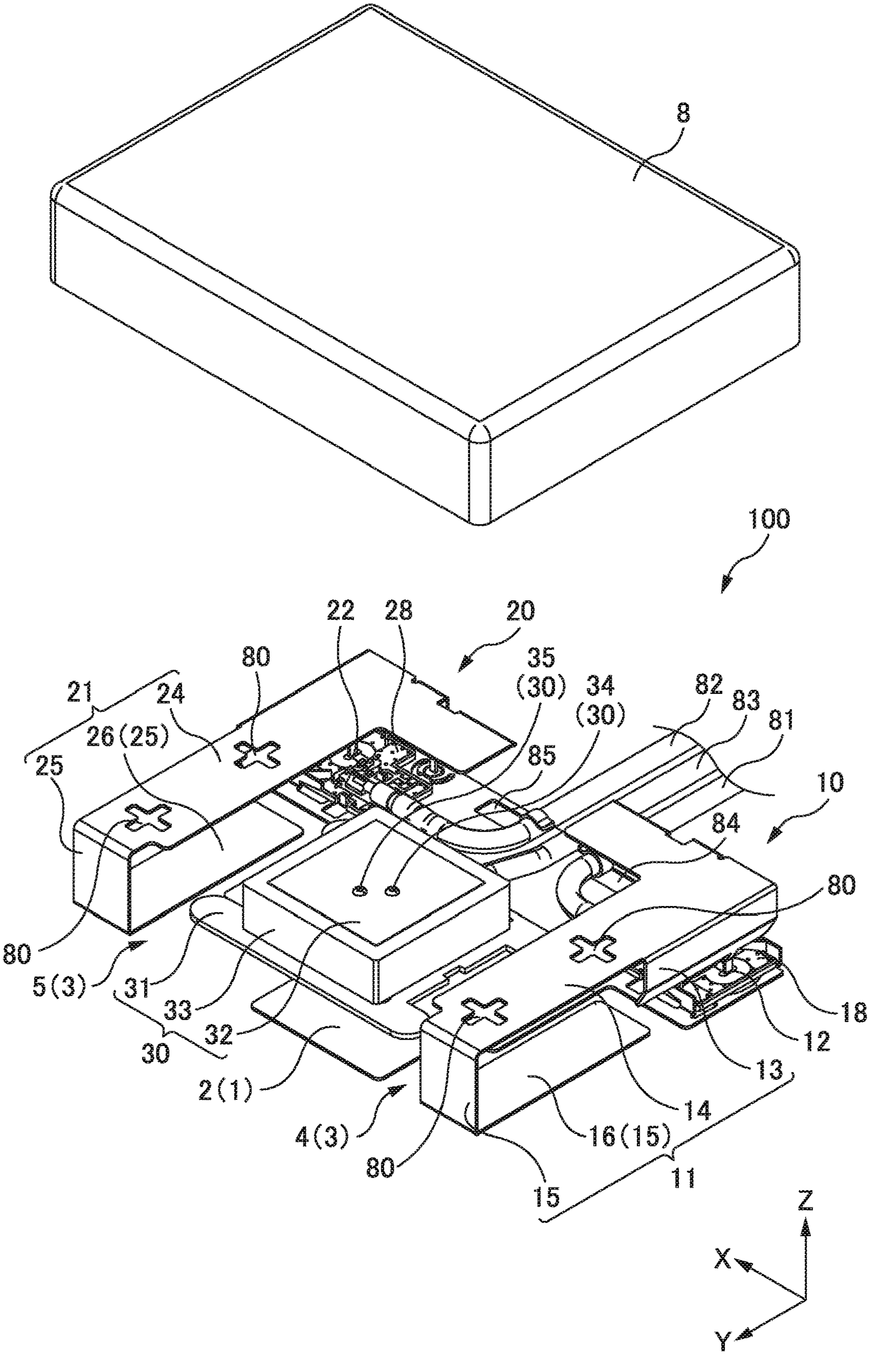
FIG. 1 is a perspective view illustrating an antenna device 1 of a first embodiment.

At least following matters will become apparent from the present description and the accompanying drawings.

Hereinafter, preferred embodiments of the present disclosure will be described with reference to the drawings. The same or equivalent components, members, and the like illustrated in the drawings are given the same reference numerals, and an overlapping description is omitted as appropriate.

First Embodiment

Figure 2:
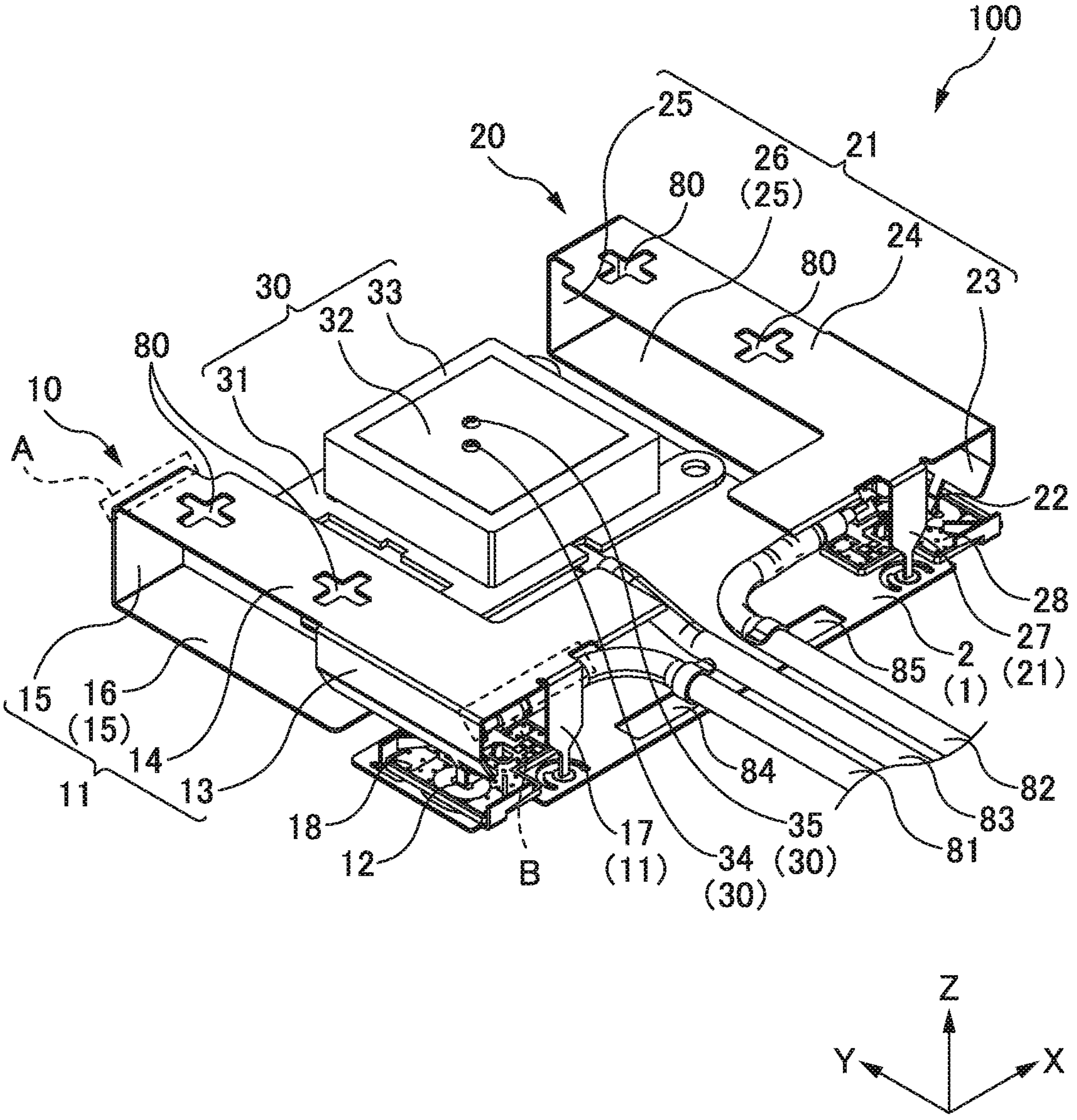
FIG. 2 is a perspective view illustrating an antenna device 100 when seen from another angle different from that in FIG. 1.

FIG. 1 is a perspective view of an antenna device 100 of a first embodiment. FIG. 2 is a perspective view of the antenna device 100 when seen from another angle different from that in FIG. 1.

Definition of Directions and the Like

First, with reference to FIGS. 1 and 2, directions (X direction, Y direction, and Z direction) and the like in the antenna device 100 are defined.

The directions parallel to a front surface 2 of a ground portion 1 (described later) and orthogonal to each other are defined as a "+X direction" and a "+Y direction". In an embodiment of the present disclosure, as illustrated in FIGS. 1 and 2, the +X direction is a direction from a first antenna 10 (described later) toward a second antenna 20 (described later) through a third antenna 30 (described later). The +Y direction is a direction from the center of a radiating element 32 (described later) of the third antenna 30 toward a feeding portion 35 on a port 2 side (described later). Further, a +Z direction is a direction normal to the front surface 2 of the ground portion 1, and is the direction from the back surface toward the front surface 2.

A direction opposite to the +X direction (here, the direction from the second antenna 20 toward the first antenna 10 through the third antenna 30) is defined as a "−X direction". Further, both the +X direction and the −X direction or either the +X direction or the −X direction as a representative may be simply referred to as "X direction". Furthermore, in the same way as the −X direction and the X direction with respect to the +X direction, a "−Y direction" and the "Y direction" with respect to the +Y direction, and a "−Z direction" and "Z direction" with respect to the +Z direction are also defined.

Here, the "front surface 2" of the ground portion 1 indicates a surface of the ground portion 1 on the side on which the first antenna 10 is located. Further, "the back surface" of the ground portion 1 indicates a surface of the ground portion 1 on the side opposite, in the Z direction, to the front surface 2. In addition, the "center" is the geometric center in an external form.

In FIGS. 1 and 2, each direction of the +X, +Y, and +Z directions is given by a line with an arrow for easier understanding of the directions and the like in the antenna device 100. The point of intersection among these lines with arrows does not mean the coordinate origin.

The antenna device 100 of an embodiment of the present disclosure is arranged such that the +Z direction is directed in the zenith direction. Thus, in the following description, the +Z direction may be referred to as "zenith direction" or "upward direction," and the −Z direction may be referred to as "downward direction". In addition, a direction parallel to an XY plane (i.e., the direction parallel to the front surface 2 of the ground portion 1) may be referred to as "plane direction", and the Z direction may be referred to as "up-down direction" or "height direction".

The above-described definitions of directions and the like are common to other embodiments in the present description as well unless otherwise specified.

<<Overview of Antenna Device 100>>

Next, an overview of the antenna device 100 of an embodiment of the present disclosure will be described, referring again to FIGS. 1 and 2 and newly referring to FIGS. 3A to 4B.

Figure 3A:
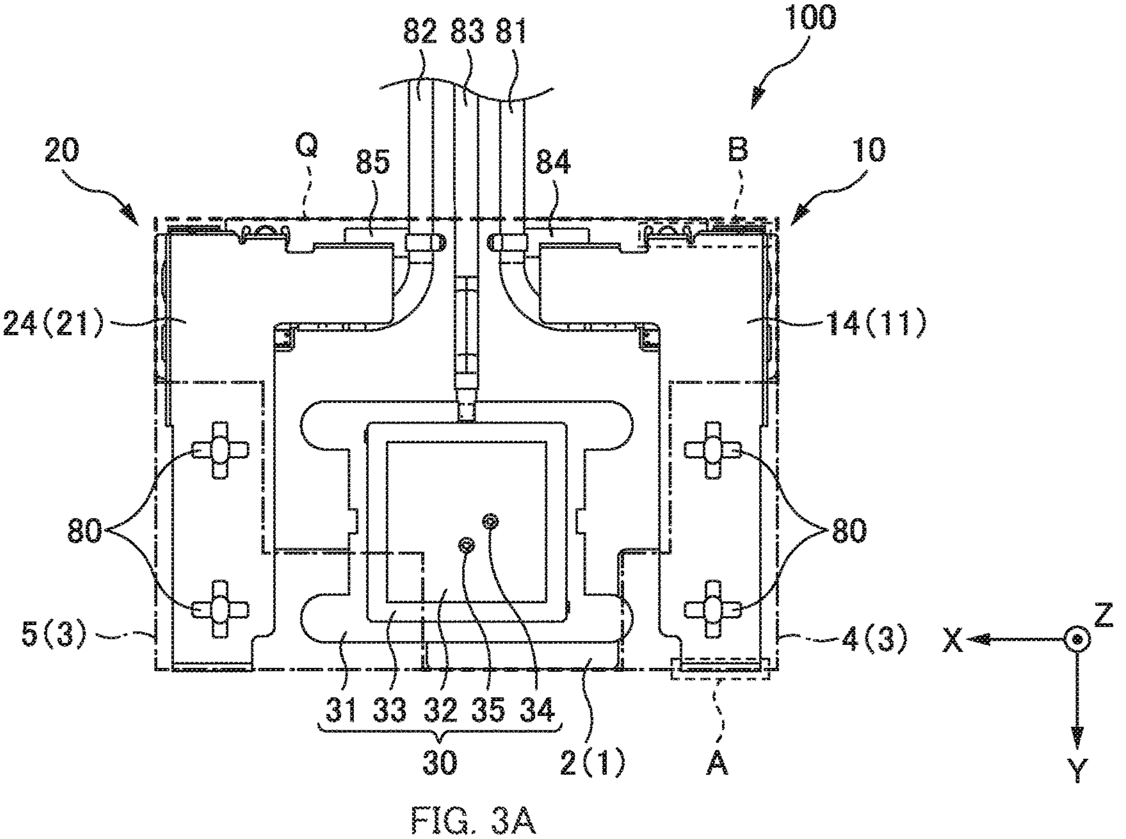
FIG. 3A is a plan view illustrating an antenna device 100.
Figure 3B:
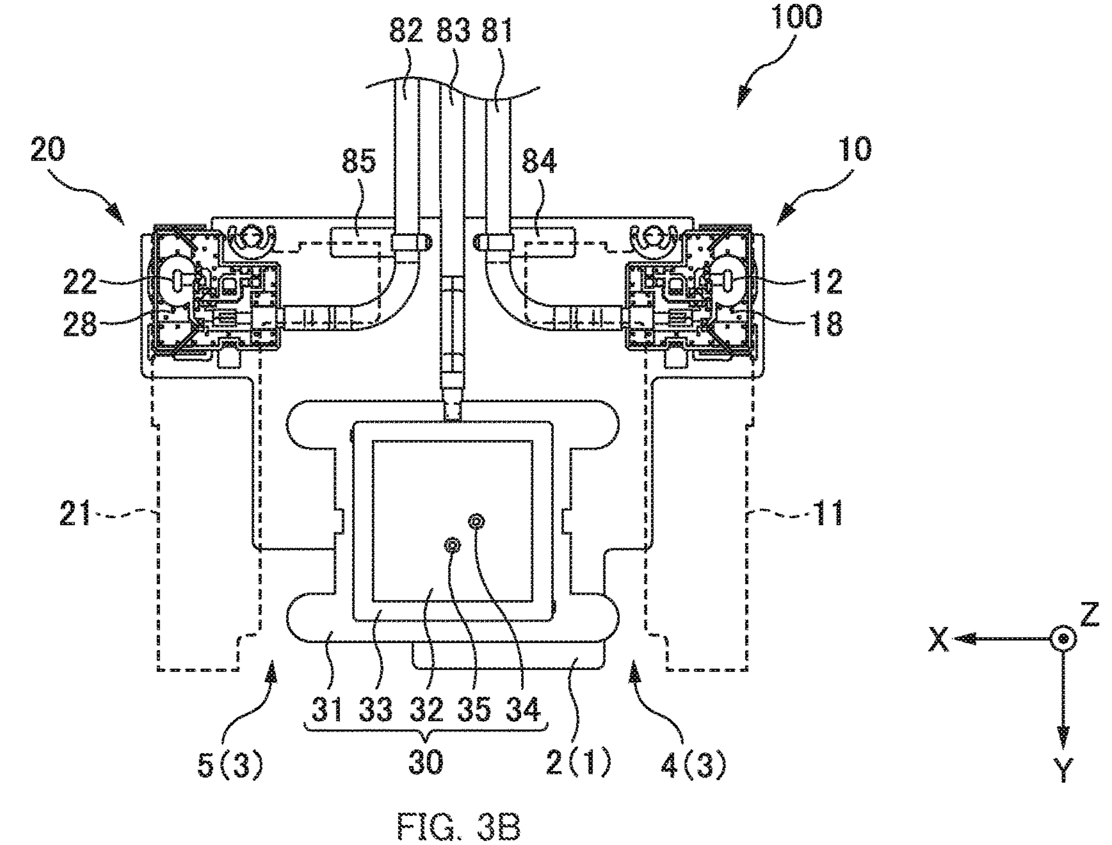
FIG. 3B is a plan view illustrating an antenna device 100 with a first element 11 and a second element 21 removed.
Figure 4A:
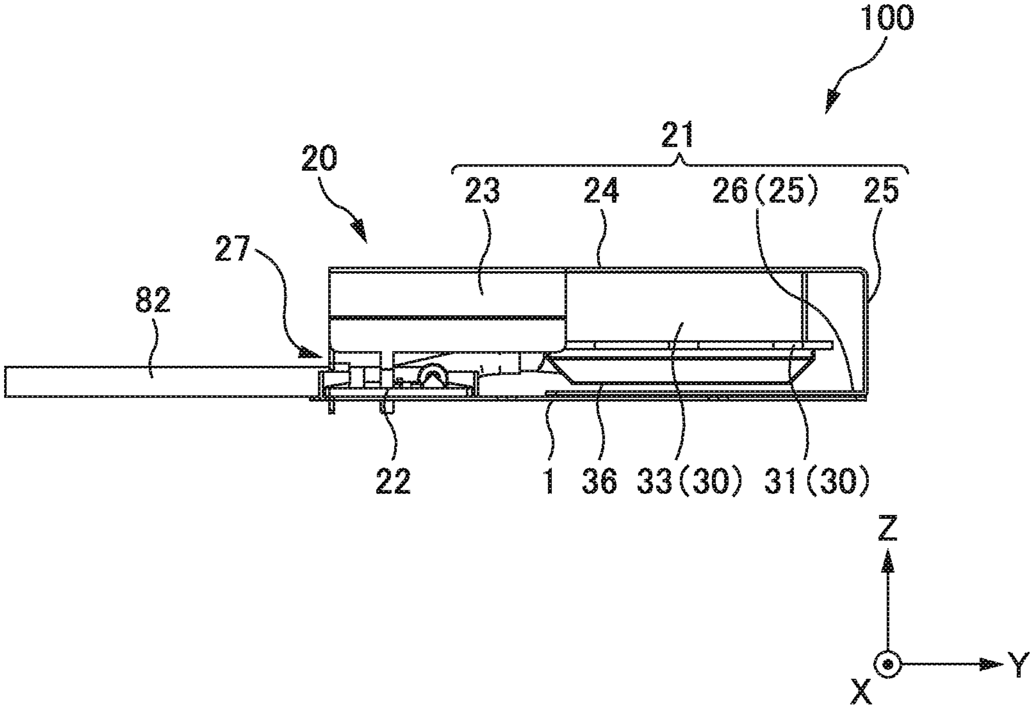
FIG. 4A is a side view illustrating an antenna device 100 when seen in a −X direction.
Figure 4B:
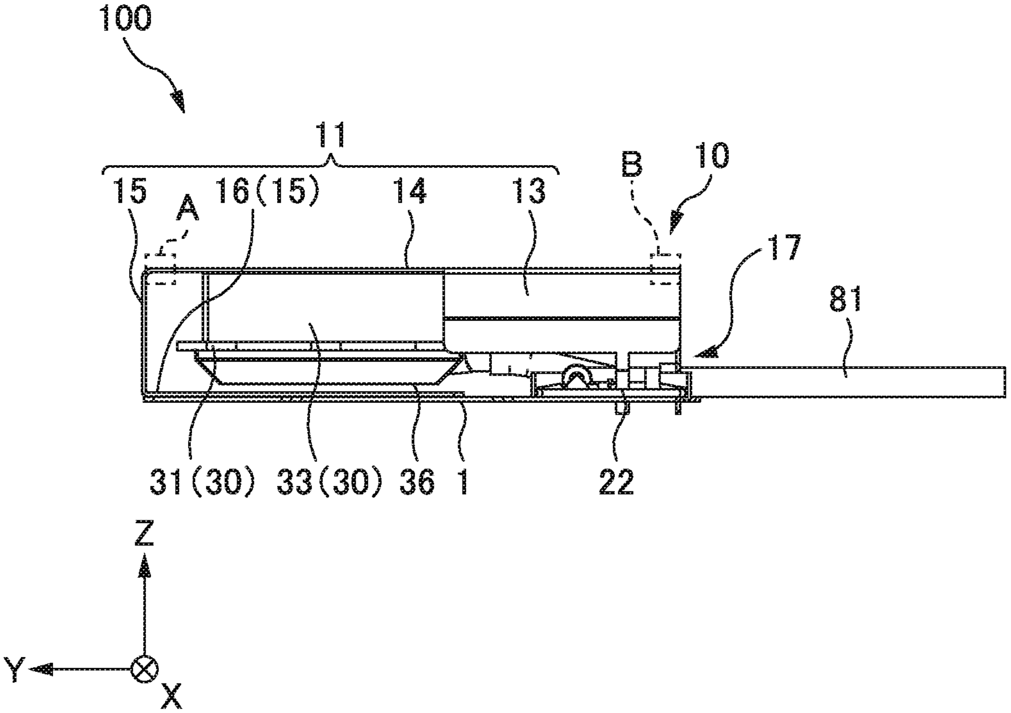
FIG. 4B is a side view illustrating an antenna device 100 when seen in a +X direction.

FIG. 3A is a plan view illustrating the antenna device 100. FIG. 3B is a plan view illustrating the antenna device 100 with a first element 11 and a second element 21 removed. FIG. 4A is a side view illustrating the antenna device 100 when seen in the −X direction. FIG. 4B is a side view illustrating the antenna device 100 when seen in the +X direction.

The antenna device 100 is an antenna device used for a vehicle, for example. The antenna device 100 is mounted inside the instrument panel of a vehicle, for example. However, the position of a vehicle at which the antenna device 100 is mounted may be changed as appropriate according to an environmental condition such as an assumed communication target and the like. The antenna device 100 may be mounted at various positions of a vehicle, such as a roof, an upper part of a dashboard, an overhead console, a bumper, a mounting part of a license plate, a pillar part, a spoiler part, and the like.

Here, the antenna device 100 is not limited to an aspect in which it is attached to a vehicle, but also includes an aspect in which it is to be brought into a vehicle and used in a vehicle. In addition, it is assumed that the device 100 of an embodiment of the present disclosure is used for a "vehicle" which is a wheeled vehicle, but it is not limited thereto, but may be used for a movable body such as a flight vehicle including a drone and the like, a probe vehicle, and a construction machinery, an agricultural machinery, a vessel, and the like without wheels for example. Further, the antenna device 100 may be an antenna device used for those other than the mobile body.

The antenna device 100 includes the ground portion 1, a case 8, the first antenna 10, the second antenna 20, and the third antenna 30. Note that the case 8 is illustrated only in FIG. 1, and is not illustrated in FIGS. 2 to 4B.

<Ground Portion 1>

The ground portion 1 is a member that functions as a ground of an antenna. Further, the ground portion 1 is also a member forming the bottom surface of the antenna device 100. In an embodiment of the present disclosure, the ground portion 1 functions as the ground common to the first antenna 10, the second antenna 20, and the third antenna 30. However, the ground portion 1 may function as a ground of part of the first antenna 10, the second antenna 20, and the third antenna 30. For example, the ground portion 1 may function as a ground of the first antenna 10 and the second antenna 20, and another ground portion may function as a ground of the third antenna 30.

Further, in an embodiment of the present embodiment, the ground portion 1 is formed as an integral metal plate (sheet metal). However, the ground portion 1 may be formed of a plurality of separate metal plates. For example, the ground portion 1 may be formed such that a metal plate at which the first antenna 10 is disposed, a metal plate at which the second antenna 20 is disposed, and a metal plate at which the third antenna 30 is disposed are electrically connected.

Note that the ground portion 1 may be formed of a shape other than a plate shape as long as it is a member that functions as a ground of the antenna(s). Further, the ground portion 1 may be configured such that a metal member and a member made of a material other than metal are freely combined, as long as it functions as a ground of the antenna(s). For example, the ground portion 1 may include a metal plate and an insulator made of resin. Alternatively, the ground portion 1 may be formed of a single substrate in which a conductive pattern is formed at a printed-circuit board (PCB), or formed of a plurality of substrates.

As illustrated in FIGS. 3A and 3B, the external form of the ground portion 1 is a shape obtained by forming a cutout portion 3 in a quadrilateral in plan view when seen in the −Z direction (downward direction). In FIG. 3A, the outline of the region corresponding to the cutout portion 3 is given by a dashed-dotted line.

The cutout portion 3 includes a first cutout portion 4 and a second cutout portion 5, as illustrated in FIGS. 3A and 3B. The first cutout portion 4 is a cutout portion formed on the first antenna 10 side, of the cutout portion 3. The second cutout portion 5 is a cutout portion formed on the second antenna 20 side, of the cutout portion 3. However, the cutout portion 3 may include only one of the first cutout portion 4 or the second cutout portion 5, or may further include a cutout portion other than the first cutout portion 4 and the second cutout portion 5.

Here, the term "quadrilateral" indicates a shape formed of four sides, and examples thereof include a square, a rectangle, a trapezoid, a parallelogram, and the like. In an embodiment of the present disclosure, the external form of the ground portion 1 is a shape obtained by forming the cutout portion 3 in a rectangle having long sides along the X direction and short sides along the Y direction, as illustrated in FIGS. 3A and 3B. However, the external form of the ground portion 1 may be such a shape in which a cutout portion (recessed portion) and/or a protrusion (a protruding portion) other than the cutout portion 3 is formed. The external form of the ground portion 1 may be a quadrilateral without no cutout portion (recessed portion) or protrusion (protruding portion), or it may be circular, oval, polygonal, or other shape.

In the antenna device 100 of an embodiment of the present disclosure, the components of the antenna device 100 are disposed within the quadrilateral, in which the cutout portion 3 is to be formed, in plan view when seen in the −Z direction (downward direction), as illustrated in FIG. 3A. Here, the components of the antenna device 100 are, for example, the first antenna 10, the second antenna 20, and the third antenna 30, which will be described later. Hereafter, this quadrilateral region in which the cutout portion 3 is to be formed may be referred to as "quadrilateral region Q". In other words, the "quadrilateral region Q" is also a region in which the components of the antenna device 100 (e.g., the first antenna 10, the second antenna 20, and the third antenna 30) are to be disposed. The "quadrilateral region Q" has long sides along the X direction and short sides along the Y direction.

In the ground portion 1, a ground hole 84 and a ground hole 85 are formed, as illustrated in FIG. 2. The ground hole 84 and the ground hole 85 are holes formed in the ground portion 1. Each of the ground hole 84 and the ground hole 85 is formed by forming a cut in part of the ground portion 1. The metal portions of the ground portion 1 corresponding to the ground hole 84 and the ground hole 85 are bent to the front surface 2 side, to thereby form a structure to hold coaxial cables. The metal portion corresponding to the ground hole 84 holds a coaxial cable 81, and the metal portion corresponding to the ground hole 85 holds a coaxial cable 82. Further, a coaxial cable 83 may be held, although not illustrated.

Here, as illustrated in FIG. 3B, the coaxial cable 81 is a cable to be connected to the first antenna 10 through a first base portion 18 (described later). The coaxial cable 82 is a cable to be connected to the second antenna 20 through the second base portion 28 (described later). The coaxial cable 83 is a cable to be connected to the third antenna 30 through the antenna base 31 (described later). Herein, the phrase "be connected" is not limited to "be physically connected", but includes "be electrically connected". Accordingly, the phrase "be connected" is not limited to being connected with a conductor, but includes being connected through an electronic circuit, an electronic component, and/or the like.

As described above, the ground hole 84 and the ground hole 85 are holes formed in the ground portion 1, and thus charges are concentrated around the holes when the antenna (here, at least one of the first antenna 10 or the second antenna 20) is operating. By utilizing the potential difference caused by the concentration of charges around the holes as such, it is possible to suppress a leakage current that leaks to at least one of the coaxial cable 81 or the coaxial cable 82. In an embodiment of the present disclosure, it is possible to control the leakage current that leaks the coaxial cable 81 by adjusting the size of the ground hole 84. Similarly, it is possible to control the leakage current that leaks to the coaxial cable 82 by adjusting the size of the ground hole 85.

However, the ground portion 1 do not have to have the ground hole 84 or the ground hole 85 formed therein. In this case, the coaxial cable 81 and the coaxial cable 82 may be held by other holding members.

Other characteristics of the ground portion 1 will be described below.

<Case 8>

The case 8 is a member forming the top surface of the antenna device 100, as illustrated in FIG. 1. The case 8 is made of insulating resin, but may be made of a material, other than insulating resin, allowing radio waves to pass therethrough. The case 8 may include a part made of insulating resin and a part made of another material allowing radio waves to pass therethrough, and may include any combination of members.

In an embodiment of the present disclosure, the case 8 is fixed to the ground portion 1 with screws not illustrated. However, the case 8 is not limited to being fixed to the ground portion 1 with screws, but may be fixed thereto by snap fitting, welding, adhesion, and/or the like. The first antenna 10, the second antenna 20, and the third antenna 30 of the antenna device 100 are disposed within the accommodation space defined by the case 8 forming the top surface of the antenna device 100 and the ground portion 1 forming the bottom surface of the antenna device 100.

The case 8 may be fixed to a member other than the ground portion 1. For example, the case 8 may be fixed to a base member (not illustrated) that is a member other than the ground portion 1 and forms the bottom surface of the antenna device 100. The base member may be made of, for example, insulating resin, or may be made of a material, other than insulating resin, allowing radio waves to pass therethrough. In addition, the base member may include a part made of insulating resin and a part made of another material allowing radio waves to pass therethrough, and may include any combination of members. The ground portion 1, the first antenna 10, the second antenna 20, the third antenna 30 may be disposed in the accommodation space defined by the case 8 forming the upper surface of the antenna device 100, and the base member forming the bottom surface of the antenna device 100.

<First Antenna 10>

The first antenna 10 is a wideband antenna for mobile communication based on an inverted-F antenna. In an embodiment of the present disclosure, the first antenna 10 supports radio waves in a frequency band of 617 to 5000 MHz for GSM, UMTS, LTE, and 5G, for example. However, the first antenna 10 may support radio waves in a frequency band for part (e.g., only 5G) of GSM, UMTS, LTE, and 5G.

In the following description, a predetermined frequency band on the low frequency side in the frequency band of radio waves supported by the first antenna 10 may be referred to as "low frequency band". In an embodiment of the present disclosure, the low frequency band is in a range of 617 MHz to 960 MHZ, for example, but may also be a range of 400 MHz to 960 MHz.

Further, a predetermined frequency band on the high frequency side in the frequency band of radio waves supported by the first antenna 10 may be referred to as "high frequency band". In an embodiment of the present disclosure, the high frequency band is in a range of 3300 MHz to 5000 MHz, for example.

A predetermined frequency band between the low frequency band and the high frequency band in the frequency band of radio waves supported by the first antenna 10 may be referred to as "intermediate frequency band". In an embodiment of the present disclosure, the intermediate frequency band is in a range of 1710 MHz to 2690 MHz, for example.

As described above, the low frequency band is a frequency band lower than the intermediate frequency band. The intermediate frequency band is a frequency band higher than the low frequency band and lower than the high frequency band. The high frequency band is a frequency band higher than the intermediate frequency band.

Note that the intermediate frequency and high frequency bands may be collectively referred to as "intermediate/high frequency band". The ranges of the low frequency band, intermediate frequency band, and high frequency band are not limited to the exemplified ranges, and may vary depending on the frequency band of radio waves supported by the antenna (here, the first antenna 10).

Further, the first antenna 10 may support radio waves in a frequency band other than the frequency band of 617 MHz to 5000 MHz. The first antenna 10 may support radio waves in a frequency band other than the frequency band for GSM, UMTS, LTE, and 5G. The first antenna 10 may be an antenna supporting radio waves of a frequency band used for telematics, vehicle to everything (V2X) (vehicle-to-vehicle communication, road-to-vehicle communication), Wi-Fi, Bluetooth, and the like, for example.

The detailed configuration of the first antenna 10 will be described later.

<Second Antenna 20>

The second antenna 20 is a wideband antenna for mobile communication based on an inverted-F antenna. In an embodiment of the present disclosure, the second antenna 20 supports radio waves in a frequency band of 617 MHz to 5000 MHz for GSM, UMTS, LTE, and 5G, for example. However, the second antenna 20 may support radio waves in a frequency band for part (e.g., only 5G) of GSM, UMTS, LTE, and 5G.

Further, the second antenna 20 may support radio waves in a frequency band other than the frequency band of 617 MHz to 5000 MHz. The second antenna 20 may support radio waves in a frequency band other than the frequency band for GSM, UMTS, LTE, and 5G. The second antenna 20 may be an antenna supporting radio waves in a frequency band used for telematics, V2X, Wi-Fi, Bluetooth, and the like, for example.

The detailed configuration of the second antenna 20 will be described later.

The antenna device 100 may be an antenna device for MIMO communication, for example. In MIMO communication, multiple antennas individually data transmit and receive data simultaneously. The antenna device 100 that performs MIMO communication transmits data from the first antenna 10 and the second antenna 20 and receives data with the first antenna 10 and the second antenna 20 simultaneously.

In the antenna device that performs MIMO communication, each of the multiple antennas needs to respond to a signal independently. Thus, in the antenna device 100 of an embodiment of the present disclosure, the first antennas 10 and the second antenna 20 are separated apart as much as possible, to thereby suppress mutual influence (coupling) between the antennas. Specifically, as illustrated in FIG. 3A, the first antenna 10 and the second antenna 20 are respectively disposed at the end parts in the direction parallel to the long sides (X direction) in the quadrilateral region Q of the antenna device 100. That is, the first antenna 10 is disposed at the end part on the −X direction side in the quadrilateral region Q, and the second antenna 20 is located at the end part on the +X direction side in the quadrilateral region Q.

<Third Antenna 30>

The third antenna 30 is a planar antenna (particularly, a patch antenna), and supports radio waves in a frequency band for a global navigation satellite system (GNSS), for example. Examples of the target frequencies in the third antenna 30 include 1575.42 MHz, 1602.56 MHz, 1561.098 MHz, and the like.

However, the communication standard and frequency band supported by the third antenna 30 are not limited to GNSS, and may be other communication standards and frequency bands. The third antenna 30 may support radio waves for Satellite Digital Audio Radio Service (SDARS) or radio waves for V2X, for example. Further, the third antenna 30 may support a desired circularly polarized waves, or may support a desired linearly polarized waves, such as vertically polarized waves or horizontally polarized waves.

Further, the third antenna 30 may be a so-called multi-band antenna that supports radio waves in multiple frequency bands. Specifically, the third antenna 30 may support radio waves in two frequency bands of L1 band (1559 to 1610 MHz band) and L5 band (1164 to 1214 MHz band). Further, the frequency band of radio waves supported by the third antenna 30 may be a combination of two frequency bands such as L1 band and L2 band (1212 to 1254 MHZ band), or may also be a combination of three frequency bands of L1 band, L2 band, and L5 band.

The target frequencies in L1 band, L2 band, and L5 band are, for example, the center frequencies of the frequency bands, respectively. Here, the center frequency of L1 band is 1575.42 MHz, the center frequency of L2 band is 1227.60 MHz, and the center frequency of L5 band is 1176.45 MHz. In the third antenna 30, the shape of the radiating element 32, which will be described later, is designed based on the target frequency. The antenna device 100 may be an antenna device of a so-called stacked patch antenna in which multiple third antennas 30 that support radio waves in frequency bands different from one another are stacked, in order to support radio waves of multiple frequency bands.

Furthermore, the frequency band of the radio waves supported by the third antenna30 may include L1 band, L2 band, L5 band, L6 band (1273 to 1284 MHz band) obtained by further combining a corrected satellite signal, and L band (1525 to 1559 MHz band). Further, the frequency bands of the radio waves supported by the third antenna 30 are not limited to the above-described specific combination of multiple frequency bands, but may be any combination of multiple frequency bands.

The third antenna 30 includes an antenna base portion 31, a shield case 36, the radiating element 32, and a dielectric 33.

The antenna base portion 31 is a member at which the dielectric 33 is disposed. In an embodiment of the present disclosure, the antenna base portion 31 is fixed to the case 8 with screws not illustrated. However, the antenna base portion 31 may be supported by a seat portion that is formed such that part of the ground portion 1 is bent by bending so as to protrude upward, and be fixed to the seat portion with screws.

Further, in an embodiment of the present disclosure, the antenna base portion 31 is located above the front surface 2 of the ground portion 1, through the shield case 36, at a predetermined distance apart therefrom, as illustrated in FIGS. 4A and 4B. However, the antenna base portion 31 may be disposed directly at the front surface 2 of the ground portion 1. In other words, the antenna base portion 31 may be positioned at the front surface 2 of the ground portion 1 without any space therebetween.

In an embodiment of the present disclosure, the antenna base portion 31 is a substrate (circuit board), and conductive patterns not illustrated are formed at the front surface and the back surface of the antenna base portion 31. A ground conductor plate (ground conductor film) of the third antenna 30 and the conductive pattern that functions as a ground of a circuit not illustrated are formed at the front surface of the antenna base portion 31. The conductive pattern to which a signal line of the coaxial cable 83 is connected is formed at the back surface of the antenna base portion 31. However, the conductive patterns formed at the antenna base portion 31 are not limited thereto, and may be different depending on the type of the third antenna 30. Further, the antenna base portion 31 may be configured such that a conductive pattern is formed at a resin material using a molded interconnect device (MID) technique.

The shield case 36 is made of metal and electrically shields the conductive pattern formed at the back surface of the antenna base portion 31 and the mounted electronic components. The shield case 36 is attached to the back surface of the antenna base portion 31. The shield case 36 is located between the antenna base portion 31 and the front surface 2 of the ground portion 1, as illustrated in FIGS. 4A and 4B.

The radiating element 32 is a conductive member disposed at the dielectric 33. As illustrated in FIGS. 3A and 3B, the external form of the radiating element 32 is a quadrilateral in plan view when viewed in the −Z direction (downward direction). In an embodiment of the present disclosure, the external form of the radiating element 32 is a square with equal vertical and lateral lengths. However, the external form of the radiating element 32 may be a rectangle with different vertical and lateral lengths. Further, the external form of the radiating element 32 may be formed with a cutout portion (recessed portion) and/or a protrusion (protruding portion), and/or may be circular, oval, polygonal, or the like.

At least one of a slot or a slit may be formed in the radiating element 32. The frequency band of radio waves supported by the radiating element 13 with a slot (or slit) include two frequency bands, one of which is determined by external dimensions of the radiating element 32 and the other of which is determined by the length of the slot (or slit) formed in the radiating element 32. This enables the third antenna 30 to support the radio waves of multiple frequency bands, even if it is not of a type of a stacked patch antenna as described above.

The radiating element 32 includes a feeding portion 34 on the port 1 side and a feeding portion 35 on the port 2 side. Each of the feeding portion 34 on the port 1 side and the feeding portion 35 on the port 2 side is a conductive part including a feeding point. The feeding point is a part at which power is supplied to the radiating element 32 with a feeder not illustrated. The third antenna 30 of an embodiment of the present disclosure employs a configuration including two feeders for supplying power to the radiating element 32, in other words, a double-feed system. Thus, in an embodiment of the present disclosure, the radiating element 32 has two feeding portions which are the feeding portion 34 on the port 1 side and the feeding portion 35 on the port 2 side. As illustrated in FIGS. 3A and 3B, the feeding portion 34 on the port 1 side and the feeding portion 35 on the port 2 side are connected to the coaxial cable 83 through the antenna base portion 31.

However, the feed system in the third antenna 30 is not limited to the double-feed system. The third antenna 30 may employ a quadruple-feed system, for example. The third antenna 30 employing the quadruple-feed system has four feeding portions formed in the radiating element 32. Further, the third antenna 30 may also employ a single feed system, for example. The third antenna 30 employing the signal feed system has one feeding portion formed therein.

The dielectric 33 is a member made of a dielectric material such as ceramic or the like. As illustrated in FIGS. 3A and 3B, the external form of the dielectric 33 is a quadrilateral in plan view when viewed in the −Z direction (downward direction). However, the external form of the dielectric 33 is not limited to a quadrilateral, but may be a circular shape, an elliptic shape, a polygonal shape, or the like. The radiating element 32 is arranged on the upper side of the dielectric 33, as illustrated in FIGS. 1 to 3B. Although not illustrated, a conductive pattern, which functions as a ground conductor film (or ground conductor plate), is formed on the back surface side of the dielectric 33. The radiating element 32 may be a dielectric substrate or may be a solid or hollow resin member.

<Configuration of Antenna(s) in Antenna Device 100>

As described above, the antenna device 100 of an embodiment of the present disclosure includes three antenna which are the first antenna 10, the second antenna 20, and the third antenna 30. However, the antenna device 100 does not have to include all of these three antennas, and for example, may include only the first antenna 10, or only the first antenna 10 and the second antenna 20.

<<Details of First Antenna 10 and Second Antenna 20>>

Next, while referring again to FIGS. 1 to 4B, details of the first antenna 10 and the second antenna 20 in the antenna device 100 of an embodiment of the present disclosure will be described.

<Details of First Antenna 10>

The first antenna 10 includes the first element 11 and the first base portion 18.

The first element 11 is an antenna element with respect to the frequency band of radio waves supported by the first antenna 10. In an embodiment of the present disclosure, the first element 11 is located at the end part on the −X direction side in the quadrilateral region Q of the antenna device 100, as illustrated in FIG. 3A. Further, the first element 11 is connected to the ground portion 1 through the first base portion 18.

In an embodiment of the present disclosure, the first element 11 is plated with a non-magnetic material having low electrical resistivity, although not illustrated. Examples of the plating material includes tin (Sn), zinc (Zn), or the like. The first element 11 prior to being plated is formed using a mold mainly made of iron (Fe). In this event, with iron, which is a ferromagnetic material, being present in the surface of a thin portion and/or a narrow portion of the first element 11, an eddy current may be generated during the operation of the first antenna 10. This may increase the loss of the first antenna 10.

Thus, the first element 11 is plated with a non-magnetic material having low electrical resistivity, to suppress the presence of iron in the surface of the first element 11, thereby being able to suppress an eddy current during the operation of the first antenna 10. Accordingly, the loss of the first antenna 10 can be reduced. However, such plating as described above does not have to be applied to the first element 11.

The first element 11 includes a first standing portion 13, a first main body portion 14, a first extending portion 15, and a first short-circuit portion 17.

The first element 11 is formed as an integral metal plate (sheet metal). Specifically, as illustrated in FIGS. 1 and 2, the first element 11 is formed of a one-piece metal plate with a shape obtained by bending it to form the first standing portion 13, the first main body portion 14, the first extending portion 15, and the first short-circuit portion 17. However, the first element 11 may be formed by joining separate metal plates together.

The first standing portion 13 is a portion of the first element 11 connected to the ground portion 1 through the first base portion 18 and formed so as to stand with respect to the front surface 2 of the ground portion 1. In an embodiment of the present disclosure, the first standing portion 13 is formed so as to rise upward (+Z direction) with respect to the front surface 2, as illustrated in FIGS. 1 and 2. That is, the first standing portion 13 is formed so as to stand in the direction normal to the front surface 2. However, the first standing portion 13 is not limited to the case of standing upward with respect to the front surface 2, but may be of being inclined at a predetermined angle with respect to the direction normal to the front surface 2.

The first standing portion 13 is a portion corresponding to at least the high frequency band in the frequency bands of radio waves supported by the first antenna 10. In an embodiment of the present disclosure, the first standing portion 13 is formed to improve the characteristics of the first antenna 10 a particularly high frequency band (e.g., around 5000 MHz) in the high frequency band. Thus, the first standing portion 13 is formed to have a length and width according to the wavelength used in the particularly high frequency band in the high frequency band.

The first standing portion 13 has a self-similar shape, as illustrated in FIGS. 1 and 2. Herein, the self-similar shape is a shape that is similar to itself even when the scale (size ratio) changes. This makes it possible to variously set the length and width according to the wavelength used in the frequency band of radio waves supported by the first antenna 10, thereby being able to achieve a wider frequency band. However, the first standing portion 13 does not have to have a self-similar shape.

The first main body portion 14 is a portion of the first element 11 located away from the ground portion 1 so as to face the ground portion 1. In an embodiment of the present disclosure, the first main body portion 14 is formed to extend in the Y direction. Further, the first extending portion 15 is located on the end part side on the +Y direction side of the first main body portion 14, and the first standing portion 13 and the first short-circuit portion 17 are located on the end part side on the −Y direction side of the first main body portion 14. In the following description, as illustrated in FIGS. 2 and 4B, the end part on the +Y direction side of the first main body portion 14 may be referred to as "end part A", and the end part on the −Y direction side of the first main body portion 14 may be referred to as "end part B".

In an embodiment of the present disclosure, as illustrated in FIG. 4B, the first main body portion 14 is formed so as to extend from the upper end part of the first standing portion 13. This makes it possible for the first main body portion 14 to be located a predetermined distance apart from the front surface 2 of the ground portion 1 in the +Z direction (upward direction).

However, the first main body portion 14 may be formed so as to extend from a part of the first standing portion 13 other than the upper end part. That is, the first main body portion 14 may be formed so as to extend from a middle of the first standing portion 13 in the up-down direction. The direction in which the first main body portion 14 extends is not limited to the direction parallel to the front surface 2 of the ground portion 1, but may be a direction inclined at a predetermined angle relative to the direction parallel to the front surface 2 of the ground portion 1.

The first extending portion 15 is a portion extending from the end part A of the first main body portion 14. In an embodiment of the present disclosure, as illustrated in FIG. 4B, the first extending portion 15 extends from the end part A of the first main body portion 14 toward the ground portion 1. In other words, the first extending portion 15 has one end part (here, an upper end part) located at the end part A of the first main body portion 14, and the other end part (an end part opposite to the one end part) located closer to the ground portion 1 than the one end part. The direction in which the first extending portion 15 extends is not limited to the Z direction (up-down direction), but may be a direction inclined at a predetermined angle from the Z direction (up-down direction). Further, the first extending portion 15 may have a shape extending in one direction, or may have a bent shape. As will be described later, in the first element 11 of an embodiment of the present disclosure, the first extending portion 15 is bent to form a first facing portion 16.

In an embodiment of the present disclosure, the first extending portion 15 includes the first facing section 16. The first facing portion 16 is a portion in which the first extending portion 15 is bent to extend so as to face the first main body portion 14. The direction in which the first facing portion 16 extends is not limited to the same direction as the direction in which the first main body portion 14 extends (i.e., the direction parallel to the front surface 2 of the ground portion 1), but may be a direction inclined at a predetermined angle from the direction in which the first main body portion 14 extends. Further, the first extending portion 15 does not have to include the first facing portion 16.

The first extending portion 15 including the first facing portion 16 is, together with the first main body portion 14, a portion corresponding to at least the low frequency band in the frequency band of radio waves supported by the first antenna 10. In an embodiment of the present disclosure, the first extending portion 15 is formed to improve the characteristics of the first antenna 10 in a particularly low frequency band (e.g., around 617 MHz) in the low frequency band. Thus, the first extending portion 15 is formed, together with the first main body portion 14, to have a length and width according to the wavelength used in a particularly low frequency band in the low frequency band.

In an embodiment of the present disclosure, as illustrated in FIG. 4B, the first element 11 has a shape obtained by being bent twice to form three portions which are the first main body portion 14, the first extending portion 15, and the first facing portion 16. Further, when the first extending portion 15 includes no first facing portion 16, the first element 11 has a shape obtained by being bent once to form two portions which are the first main body portion 14 and the first extending portion 15.

In an embodiment of the present disclosure, the first element 11 can easily ensure the length capable of supporting the particularly low frequency band in the low frequency band. Accordingly, in an embodiment of the present disclosure, it is possible to easily achieve the element that supports the radio waves in the low frequency band, which needs a predetermined length in the limited accommodation space within the antenna device.

As described above, the first extending portion 15 extends from the first main body portion 14 toward the ground portion 1. That is, the first element 11 has a shape obtained by being bent downward toward the ground portion 1. Here, even if the first element 11 is bent parallel to the front surface 2 of the ground portion 1 (in the lateral direction), it is possible to ensure the length capable of supporting the particularly low frequency band.

However, when the entire antenna device 100 is to be downsized, if the first element 11 is bent in the lateral direction, it must be bent toward the second antenna 20, since the accommodation space is limited. This may cause the first antenna 10 and the second antenna 20 to be close to each other, so that the first antenna 10 and the second antenna 20 may be affected by each other. Further, even if the antenna device 100 has no second antenna 20, the first element 11 of the first antenna 10 being bent in the X direction may affect other antennas and the component(s) of the antenna device 100.

Thus, as in an embodiment of the present disclosure, by bending the first element 11 toward the ground portion 1, it is possible to ensure the length of first element 11, and to downsize the antenna device 100, without the first antennas 10 and the second antenna 20 being close to each other. This makes it also possible to suppress mutual influence between the first antenna 10 and the second antenna 20.

As described above, the first extending portion 15 extends from the end part A of the first main body portion 14 toward the ground portion 1. In this event, the first facing portion 16 included in the first extending portion 15 has no contact with the front surface 2 of the ground portion 1. In other words, one end part of the first extending portion 15 (here, the upper end part) is located in the end part A of the first main body portion 14, and the other end part of the first extending portion 15 (the end part opposite to the one end part) has no contact with the front surface 2 of the ground portion 1.

In an embodiment of the present disclosure, as illustrated in FIG. 1, the first facing portion 16 of the first extending portion 15 (the other end part of the first extending portion 15) is located in the first cutout portion 4. That is, in plan view when viewed in the −Z direction (downward direction), the first extending portion 15 lies in the first cutout portion 4. This makes it possible for the first facing portion 16 of the first extending portion 15 (the other end part of the first extending portion 15) can be located so as not to be in contact with the front surface 2 of the ground portion 1.

As described above, in plan view when viewed in the −Z direction (downward direction), the first facing portion 16 of the first extending portion 15 (the other end part of the first extending portion 15) is located so as not to be in contact with the front surface 2 of the ground portion 1. In this case, in side view as illustrated in FIG. 4B, the lower end part (the end part in the −Z direction) of the first extending portion 15 or the first facing portion 16 may be located at the same position as the back surface of the ground portion 1 or located on the lower side relative to the back surface of the ground portion 1.

However, in side view as illustrated in FIG. 4B, if the lower end part (the end part in the −Z direction) of the first extending portion 15 or the first facing portion 16 is located below the back surface of the ground portion 1, the entire antenna device 100 increase in size in the Z direction accordingly. Thus, in order to downsize the antenna device 100, it is desirable that the lower end part (the end part in the −Z direction) of the first extending portion 15 or the first facing portion 16 is located at the same position as the back surface of the ground portion 1, or is located on the upper side (on the end part A side) relative to the back surface of the ground portion.

Note that when the lower end part (the end part in the −Z direction) of the first extending portion 15 or the first facing portion 16 is located on the upper side relative to the back surface of the ground portion 1, the first facing portion 16 (the other end part of the first extending portion 15) can be located so as not to be in contact with the front surface 2 of the ground portion 1, even if there is no first cutout portion 4 (even if the ground portion 1 exists below the first extending portion 15).

Note that the antenna device 100 may be configured such that at least a part of the first main body portion 14 overlaps with the first cutout portion 4 in plan view when viewed in the −Z direction (downward direction). This makes it possible to cause the first facing portion 16 (the other end part of the first extending portion 15) not to be in contact with the front surface 2, even if the first extending portion 15 includes the first facing portion 16 that faces the first main body portion 14.

The first short-circuit portion 17 is a part that branches from the end part B of the first main body portion 14, to thereby be connected to the ground portion 1 through the first base portion 18, and is a short pin or screw, for example. That is, one end part of the first short-circuit portion 17 (here, the lower end part) is connected to the ground portion 1 through the first base portion 18, and the other end part of the first short-circuit portion 17 (here, the upper end part, and the end part opposite to the one end part) is located on the end part B side of the first main body portion 14. Since the first element 11 includes the short-circuit portion 17, it is possible to easily achieve impedance matching in the frequency band (particularly, low frequency band) of radio waves supported by the first antenna 10.

In an embodiment of the present disclosure, in plan view when viewed in the −Z direction (downward direction), the first short-circuit portion 17 branches from the end part B of the first main body portion 14, but may be branch from a part on the end part A side relative to the end part B of the first main body portion 14 (specifically, on the end part A side relative to a first feeding portion 12, which will be described later). However, in this case, the first short-circuit portion 17 branches from a middle part in the longitudinal direction of the first element 11 (Y direction), to be short-circuited, although the length of the first element 11 needs to be ensured in order to support the particularly low frequency band. This suppresses achievement of the lower frequency band of radio waves supported by the first antenna 10.

Accordingly, with the first short-circuit portion 17 branching from the end part B of the first main body portion 14, it is possible to easily achieve impedance matching in the frequency band (particularly, low frequency band) of radio waves supported by the first antenna 10, and easily achieve the first element 11 that supports the radio waves in the low frequency band.

In an embodiment of the present disclosure, the first short-circuit portion 17 and the above-described first standing portion 13, the first main body portion 14, and the first extending portion 15, each are formed as a part of the first element 11. However, the first short-circuit portion 17 may include a coil and/or an inductance component mounted to a circuit. The shape of the first short-circuit portion 17 can be varied as appropriate, as long as it is configured to operate as a short-circuit portion.

The first short-circuit portion 17 may be connected to the ground portion 1 by soldering, snap-fitting, welding, bonding or the like, or by screwing. In this case, with a screw boss for screwing being formed at the case 8 of the antenna device 100 and screwed together with the ground portion 1, it is possible to achieve both mechanical support of the first short-circuit portion 17 and electrical connection to the ground portion 1. Further, in this case, with the length of the screw being adjusted, the screw can act as a part of the antenna.

As illustrated in FIG. 2, the first short-circuit portion 17 has a shape having a width (length in the X direction) decreases as it goes downward when viewed in the −Y direction. This can easily achieve impedance matching in the intermediate/high frequency band. In an embodiment of the present disclosure, the width of the first short-circuit portion 17 decreases linearly as it goes downward, but the width may decrease in an arc shape or a curved shape as it goes downward.

The first short-circuit portion 17 has a self-similar shape, as illustrated in FIG. 2. As in the first standing portion 13, this makes it possible to variously set the length and width according to the wavelength used in the frequency band of radio waves supported by the first antenna 10, thereby being able to achieve a wider frequency band. However, the first short-circuit portion 17 does not have to have a self-similar shape.

The first short-circuit portion 17 may have a shape having a width increasing as it goes downward, or a width that is equal across the up-down direction. The width of the first short-circuit portion 17 may increase to about five times the width of the part at which the first standing portion 13 of the first element 11 is connected to the first base portion 18 (i.e., the part in which the first feeding portion 12 which will be described later is located). This can achieve a wider frequency band of the first antenna 10.

As described above, in the first element 11 of an embodiment of the present disclosure, the standing portion 13 and the short-circuit portion 17 are connected to the ground portion 1 through the first base portion 18. Accordingly, the first element 11 is supported by the ground portion 1 at the standing portion 13 and the short-circuit portion 17. In an embodiment of the present disclosure, the first element 11 is fixed to the case 8, by welding, with resin and a protrusion (not illustrated) formed at the case 8. The fixing is not limited to welding with resin, the first element 11 may be fixed to the case 8 by screwing to the case 8 with screws not illustrated. The configuration in which the first element 11 is supported can be modified as appropriate, and, for example, the first element 11 may be supported by a resin support member located at the ground portion 1.

The first element 11 has a hole 80 formed therein, as illustrated in FIGS. 1 and 2. With the hole 80 being formed in the first element 11, it is possible to increase the length according to the wavelength used in the low frequency band, thereby being able to achieve the lower frequency band of radio waved supported by the first antenna 10. The hole 80 is a portion in which the protrusion is fitted in when the first element 11 is secured to the protrusion (not illustrated) formed at the case 8. As such, the hole 80 can be used as the part for achieving the lower frequency band of radio waves supported by the first antenna 10, and for fixing the first element 11 to the case 8.

In an embodiment of the present disclosure, two holes 80 are formed in the first main body portion 14 of the first element 11. However, the location and number of the holes 80 formed in the first element 11 are not limited thereto, and can be varied according to the frequency band of radio waves supported by the first antenna 10. Further, the first element 11 does not have to have any hole 80.

The first base portion 18 is a member at which the feeding portion 12 and a matching circuit of the first antenna 10 are located. The feeding portion 12 is a region including the feed point of the first antenna 10. In an embodiment of the present disclosure, the first feeding portion 12 is located at the part at which the first standing portion 13 of the first element 11 is connected to the first base portion 18, as illustrated in FIGS. 1 and 2. The first element 11 is connected to the coaxial cable 81 through the matching circuit mounted to the first base portion 18, as illustrated in FIG. 3B. A circuit element and an electronic component other than the matching circuit, such as a connection detection circuit and/or the like, for example, may be mounted to the first base portion 18.

The first base portion 18 is a substrate (circuit board), and a conductive pattern (not illustrated) and an electronic component and/or a circuit element, such as the matching circuit described above, are mounted to the front surface of the first base portion 18. Further, the first base portion 18 may also be configured such that a conductive pattern is formed at a resin material, using MID technology.

In an embodiment of the present disclosure, the contact surface of the first base portion 18 with the ground portion 1 is subjected to a conductive surface treatment such as hot air solder leveling, gold plating, gold flash, or the like. This facilitates electrical connection between the first base portion 18 and the ground portion 1. However, the contact surface of the first base portion 18 with the ground portion 1 does not have to be subject to the conductive surface treatment.

<Details of Second Antenna 20>

The second antenna 20 includes a second element 21 and a second base portion 28.

The second element 21 is an antenna element with respect to the frequency band of radio waves supported by the second antenna 20. In an embodiment of the present disclosure, the second element 21 is located at the end part on the +X direction side in the quadrilateral region Q of the antenna device 100, as illustrated in FIG. 3A. The second element 21 is connected to the ground portion 1 through the second base portion 28.

In an embodiment of the present disclosure, the second element 21 has the same characteristics as the first element 11. That is, the second element 21 includes a second standing portion 23, a second main body portion 24, a second extending portion 25, and a second short-circuit portion 27. The second extending portion 25 includes a second facing portion 26. Other features of the second standing portion 23, the second main body portion 24, the second extending portion 25, the second facing portion 26, and the second short-circuit portion 27 are similar to those of corresponding constituents in the first element 11 of the first antenna 10, respectively, and thus the descriptions thereof are omitted.

The second base portion 28 is a member where the second feeding portion 22 and the matching circuit of the second antenna 20 are located. The second element 21 is connected to the coaxial cable 82 through a matching circuit mounted to the second base portion 28, as illustrated in FIG. 3B. Other features of the second base portion 28 are similar to those of the first base portion 18 in the first antenna 10, and thus the description thereof are omitted.

<Positional Relationship Among Antennas>

In plan view when viewed in the −Z direction (downward direction), the first feeding portion 12 of the first element 11 and the second feeding portion 22 of the second element 21 are located in line symmetry with respect to the axis parallel to the Y direction (the direction in which the first main body portion 14 of the first element 11 extends), as illustrated in FIG. 3B. Detailed verification will be described below, but this can suppress deterioration of the isolation between the first element 11 and the second element 21.

In the antenna device 100 of an embodiment of the present disclosure, the third antenna 30 can be separated from the first antenna 10 and the second antenna 20 as much as possible, to thereby being able to suppress the influence thereon from the first antenna 10 and the second antenna 20. Here, as illustrated in FIG. 3A, the first antenna 10 and the second antenna 20 are positioned to cover three sides of the quadrilateral region Q (the short side in the +X direction, the long side in the −Y direction, and the short side in the −X direction). Thus, the third antenna 30 is located so as to be close to the long side in the +Y direction. That is, the feeding portion of the third antenna 30 (at least one of the feeding portion 34 on the port 1 side or the feeding portion 35 on the port 2 side) is located closer to the end part A than to the end part B of the first main body portion 14.

<<Excitation of Other Antenna Elements>>

When there is an antenna located at a ground portion, the characteristics of the antenna are generally determined by the length of the antenna element and the length of the ground portion. However, in the case where the antenna is to support the particularly low frequency band while the entire antenna device is downsized, the length of the antenna element and/or the ground portion may result in being insufficient. Here, it is assumed that the length from the feeding portion to the end part of the antenna element is the length of the antenna element, for convenience. It is further assumed that the length from the feeding portion to the end part of the ground portion is the length of the ground portion, for convenience.

In an embodiment of the present disclosure, when the first antenna 10 operates, it is possible to achieve the lower frequency band of radio waved supported by the first antenna 10, with the portion corresponding to the second element 21 of the second antenna 20 being excited. This is because the characteristics of the first antenna 10 are determined by taking into account not only the lengths of the first element 11 and the ground portion 1, but also the length of the second element 21, since the portion corresponding to the second element 21 is excited. Similarly, when the second antenna 20 operates, it is possible to achieve the lower frequency band of radio waved supported by the second antenna 20, with the portion corresponding to the first element 11 of the first antenna 10 being excited.

Here, in order for the portion corresponding to the second element 21 to be excited, the second element 21 needs to be at least electrically coupled to the ground portion 1. In an embodiment of the present disclosure, the second element 21 includes the second short-circuit portion 27 that is connected to the ground portion 1, which facilitates the excitation by the portion corresponding to the second element 21 more.

<<Frequency Characteristics of First Antenna 10 and Second Antenna 20>>

The following describes the results of the verification of the frequency characteristics of the first antenna 10 and the second antenna 20, using, as a model, the antenna device 100 including only the first antenna 10 and the second antenna 20.

<Frequency Characteristics of VSWR>

Figure 5A:
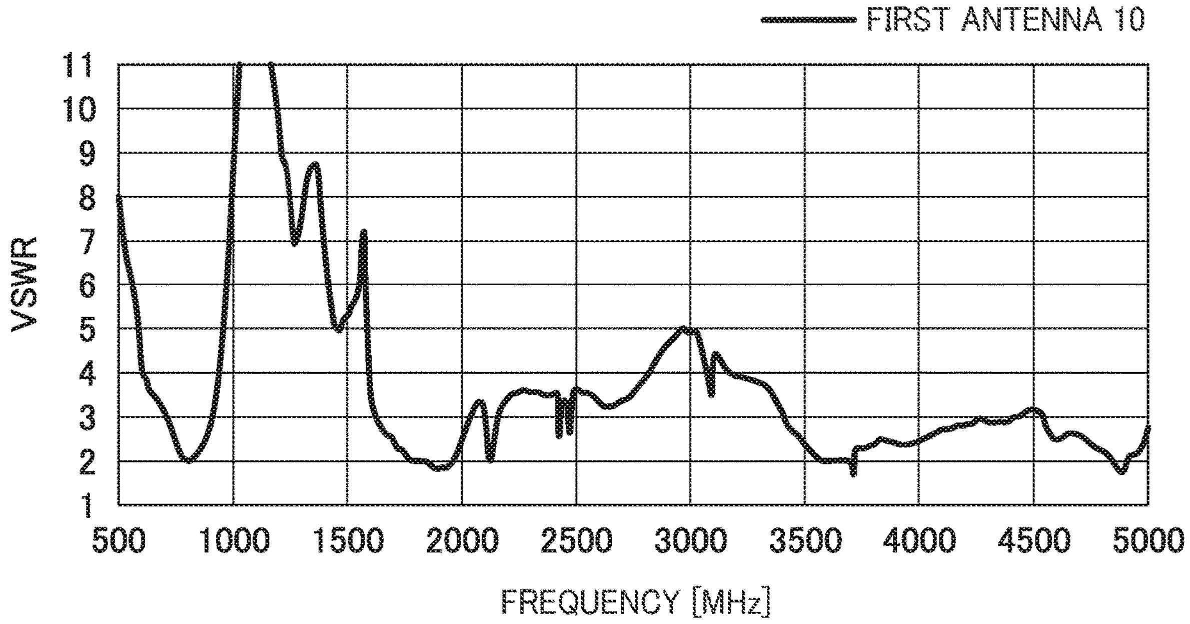
FIG. 5A is a diagram illustrating the frequency characteristics of the VSWR of a first antenna 10.
Figure 5B:
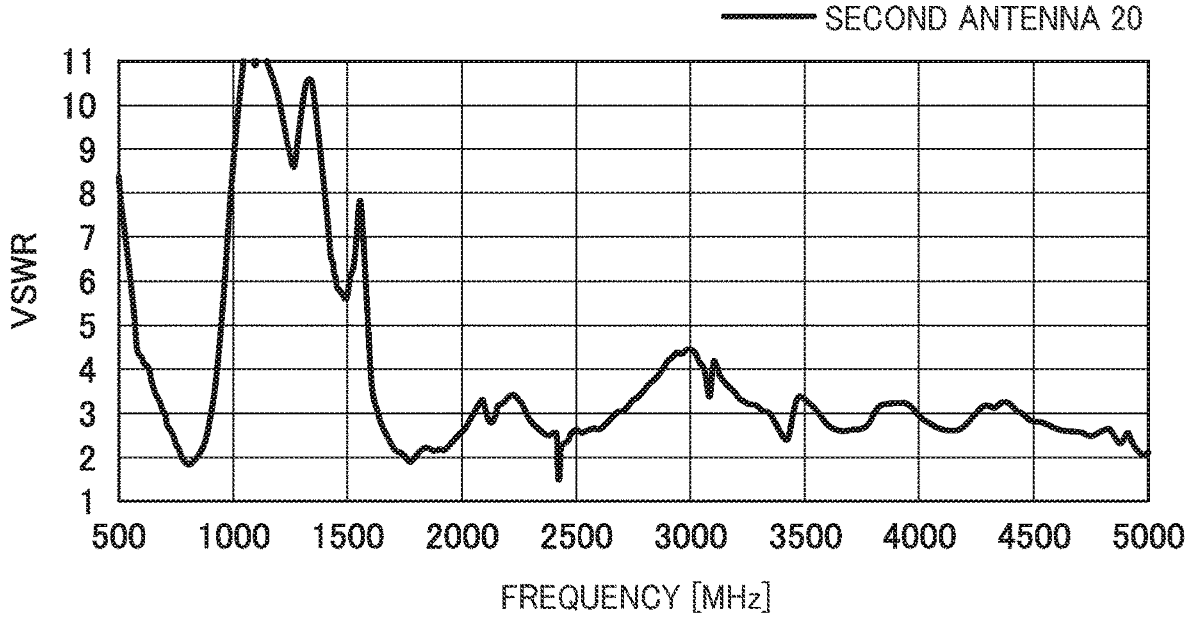
FIG. 5B is a diagram illustrating the frequency characteristics of the VSWR of a second antenna 20.

FIG. 5A is a diagram illustrating the frequency characteristics of the VSWR of the first antenna 10. FIG. 5B is a diagram illustrating the frequency characteristics of the VSWR of the second antenna 20. The verification results illustrated in FIGS. 5A and 5B are obtaining by verification using the model without the coaxial cable 81 nor the coaxial cable 82.

In FIG. 5A and FIG. 5B, the horizontal axis represents frequency and the vertical axis represents voltage standing wave ratio (VSWR). As illustrated in FIGS. 5A and 5B, it can be seen that in both the VSWR of the first antenna 10 and the VSWR of the second antenna 20, the characteristics are good, particularly in the low frequency band (617 MHz to 960 MHz band), although there are some exceptions. The characteristics are generally good in the intermediate/high frequency band. The range in which the characteristics of the VSWR is good is preferably the range in which the VSWR is 4 or less and more preferably the VSWR is 3.5 or less.

<Frequency Characteristics of Coefficient of Correlation>

Figure 6:
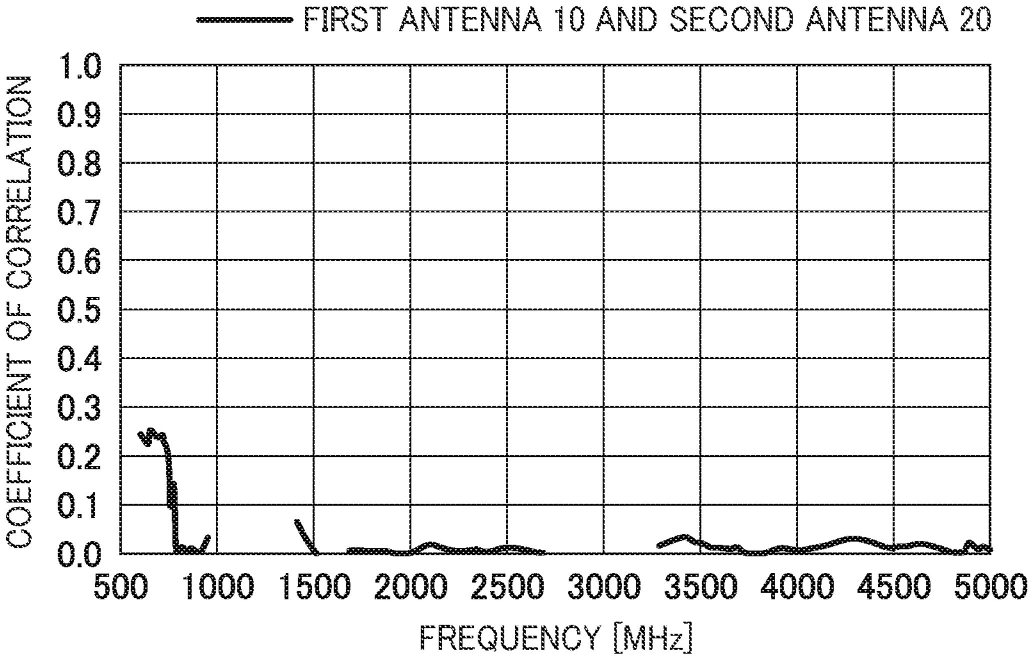
FIG. 6 is a diagram illustrating the frequency characteristics of the coefficient of correlation between a first antenna 10 and a second antenna 20.

FIG. 6 is a diagram illustrating the frequency characteristics of the coefficient of correlation between the first antenna 10 and the second antenna 20.

As described above, particularly, in the antenna device performing MIMO communication, when the antenna elements (here, the first element 11 and the second element 21) are close to each other, the antennas are affected (coupling) each other, which may reduce the efficiency of the antennas. Since multiple antennas are used in MIMO communication, it is important to obtain multiple independent propagation paths to obtain sufficient transmission performance in MIMO.

The coefficient of correlation is an index to evaluate whether each of the multiple antennas is able to independently respond to a signal. The lower the correlation (that is, the smaller the coefficient of correlation is and the closer it is to 0), the more independently each of the multiple antennas (here, the first antenna 10 and the second antenna 20) can respond to a signal.

As illustrated in FIG. 6, the coefficient of correlation is larger in the low-frequency band than in the intermediate/high frequency band, but is below the allowable value of the coefficient of correlation (e.g., 0.5), and it can be seen that the correlation between the first antenna 10 and the second antenna 20 is low and thus each thereof is able to respond to a signal independently. As described above, it seems that in the case where the first antenna 10 operates, when the portion corresponding to the second element 21 of the second antenna 20 is excited, the correlation between the first antenna 10 and the second antenna 20 is within an allowable range.

COMPARATIVE EXAMPLE

Next, the frequency characteristics of the first antenna 10 and the second antenna 20 of the antenna device 100 in an embodiment of the present disclosure will be described through comparison with the frequency characteristics of a first antenna 10A in an antenna device 100A of a comparative example.

Figure 7:
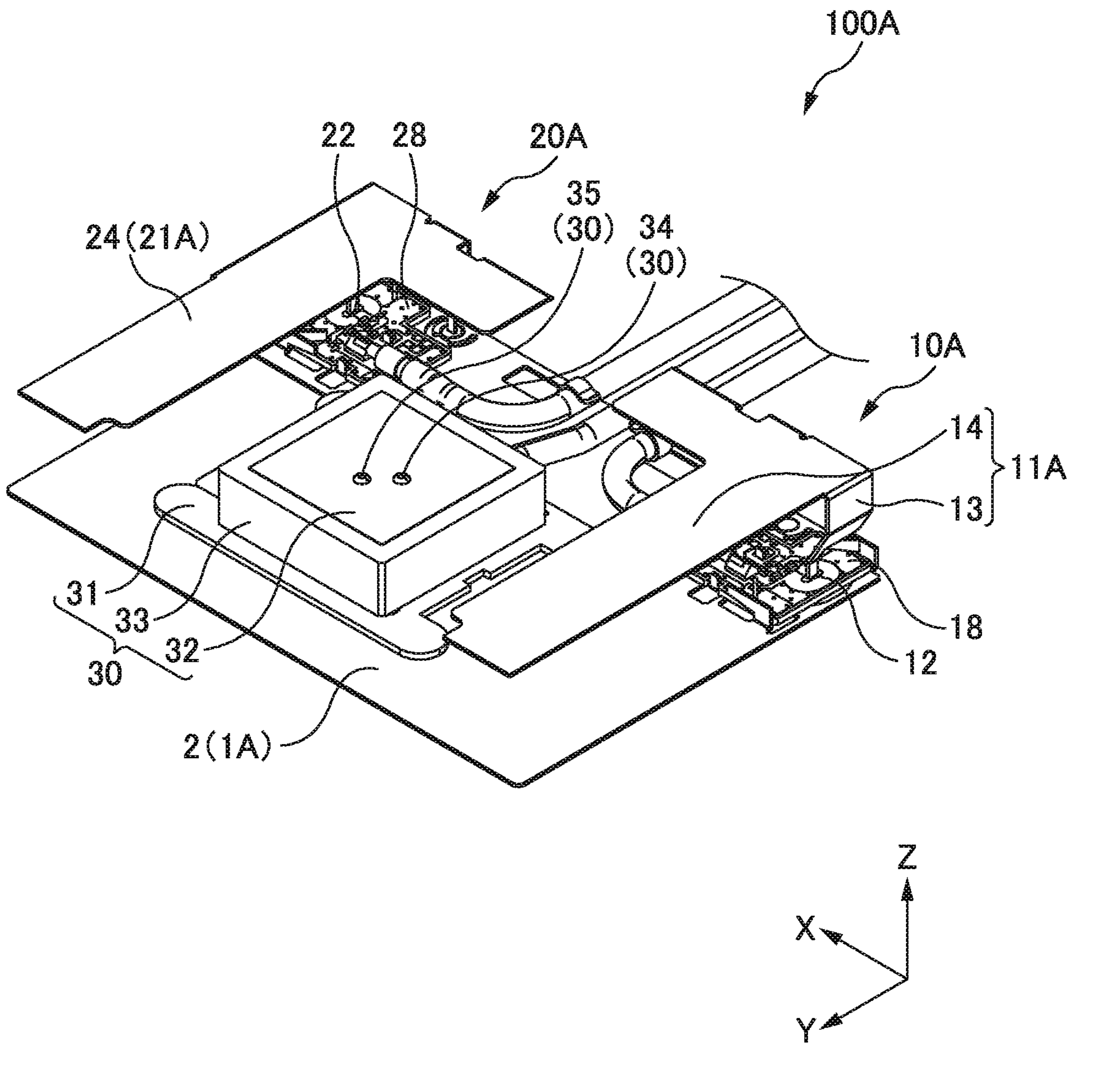
FIG. 7 is a perspective view illustrating an antenna device 100A of a comparative example.

FIG. 7 is a perspective view illustrating the antenna device 100A of the comparative example.

The antenna device 100A includes a ground portion 1A, the case 8 (not illustrated), the first antenna 10A, a second antenna 20A, and a third antenna 30.

The first antenna 10A in the comparison example is a wideband antenna for mobile communications, based on the reverse F antenna, as in the first antenna 10 in an embodiment of the present disclosure. However, a first element 11A of the first antenna 10A in the comparative example is different from the first element 11 of an embodiment of the present disclosure in including only the first standing portion 13, the first main body portion 14 and the first short-circuit portion 17 (not illustrated).

That is, the first element 11A in the comparative example is different from the first element 11 of an embodiment of the present disclosure, in not including the first extending portion 15 and the first facing portion 16. Similarly, the second element 21A of the second antenna 20A in the comparative example does not include the second extending portion 25 or the second facing portion 26, unlike the second element 21 in an embodiment of the present disclosure. Accordingly, in the comparative example, it is more difficult to ensure the length capable of supporting the particularly low frequency band in the low frequency band, while downsizing the entire antenna device 100A, as compared to an embodiment of the present disclosure.

Figure 8:
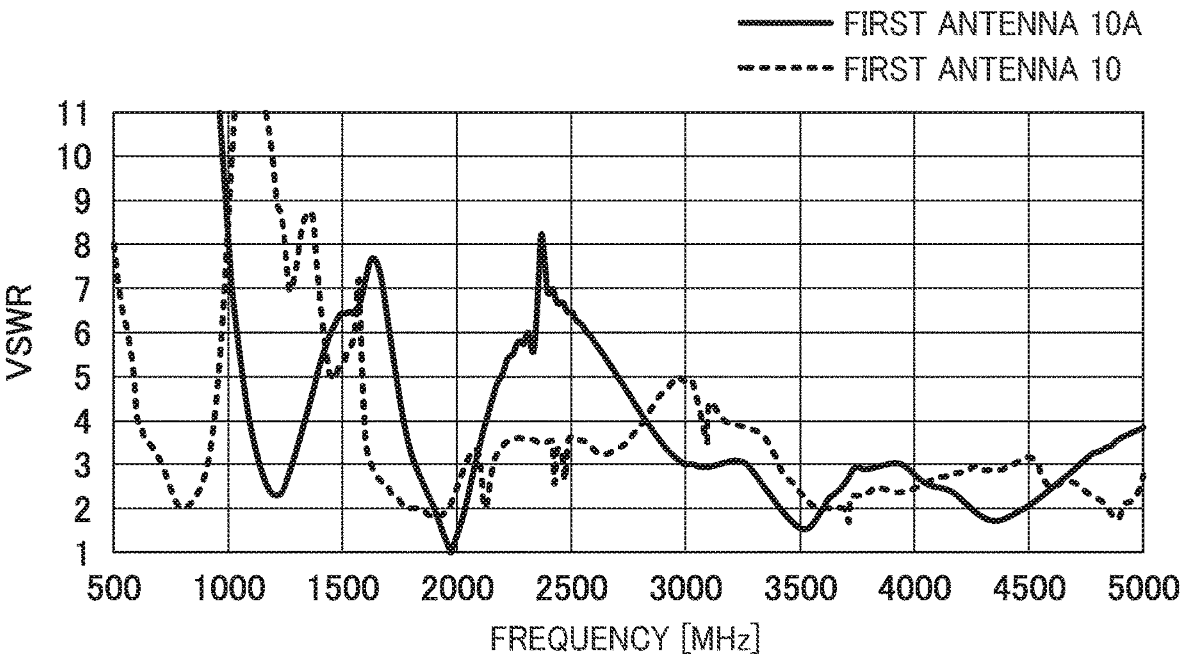
FIG. 8 is a diagram illustrating the frequency characteristics of the VSWR of a first antenna 10A.

FIG. 8 is a diagram illustrating the frequency characteristics of the VSWR of the first antenna 10A.

In FIG. 8, the horizontal axis represents frequency and the vertical axis represents voltage standing wave ratio (VSWR). The results of the first antenna 10A in the comparative example are given by a solid line, and the results of the first antenna 10 in an embodiment of the present disclosure described above are given by a dashed line. As illustrated in FIG. 8, it can be seen that as compared to the results (dashed line) of the first antenna 10 in an embodiment of the present disclosure, the VSWR of the first antenna 10A in the comparison example has no good characteristic range (has no range in which the VSWR is 4 or less) in the low-frequency band (617 MHz to 960 MHz band).

From the above, by forming the first element 11 so as to be bent toward the ground portion 1, as in an embodiment of the present disclosure, it is possible to easily ensure the length capable of supporting the particularly low frequency band in the low frequency band while downsizing the entire antenna device 100.

Modification Example

As described above, in an embodiment of the present disclosure, when the first antenna 10 operates, it is possible to achieve the lower frequency band of radio waves supported by the first antenna 10, with the portion corresponding to the second element 21 of the second antenna 20 being excited. The results of the verification regarding this effectiveness of the excitation will be described using the antenna device 100B in a modification example.

The antenna device 100B in the modification example includes only the first antenna 10B, which has the same configuration as that of the first antenna 10 in an embodiment of the present disclosure. That is, the antenna device 100B does not have the second antenna 20, which is included in the antenna device 100 in an embodiment of the present disclosure, and thus is a model that operates only with the first antenna 10B. Since the first antenna 10B has the same configuration as that of the first antenna 10 in an embodiment of the present disclosure, a detailed description thereof is omitted.

Figure 9:
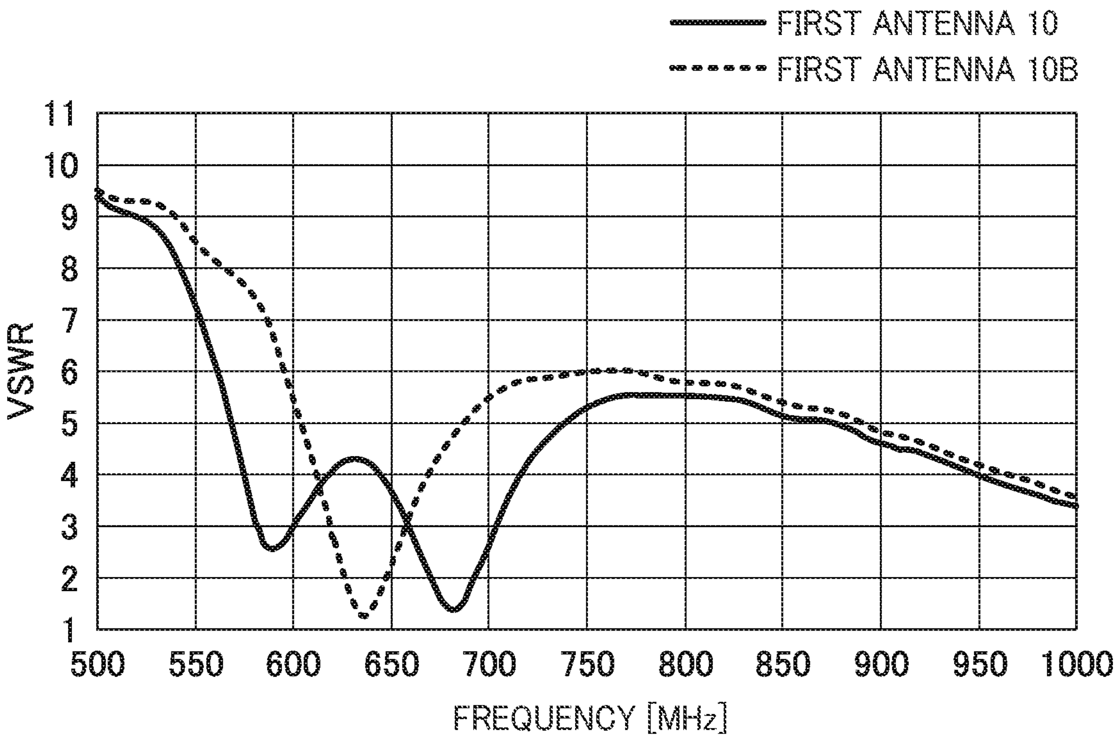
FIG. 9 is a diagram illustrating the frequency characteristics of the VSWRs of a first antenna 10 and a first antenna 10B.

FIG. 9 is a diagram illustrating the frequency characteristics of the VSWRs of the first antenna 10 and the first antenna 10B.

In FIG. 9, the horizontal axis represents frequency and the vertical axis represents voltage standing wave ratio (VSWR). The results of the first antenna 10 in an embodiment of the present disclosure are given by a solid line and the results of the first antenna 10B in the modification example are given by a dashed line.

As illustrated in FIG. 9, the VSWR in the first antenna 10B in the modification example peaks near 630 MHz in the low-frequency band (617 MHz to 960 MHz band), while the VSWR in the first antenna 10 in an embodiment of the present disclosure peaks near 580 MHZ in the low-frequency band.

Accordingly, it can be seen that when the first antenna 10 in an embodiment of the present disclosure operates, it is possible to achieve the lower frequency band of radio waves supported by the first antenna 10, with the portion corresponding to the second element 21 of the second antenna 20 being excited. However, even the first antenna 10B of the modification example has better characteristics in the low-frequency band although not as good as the first antenna 10 of an embodiment of the present disclosure. Accordingly, depending on the desired frequency band, even the antenna device 100B of the modification example can easily ensure the length capable of supporting the particularly low frequency band in the low-frequency band, while downsizing the entire the antenna device 100B.

<<Arrangement of First Antenna 10 and Second Antenna 20 in Ground Portion>>

In the following, the arrangement of the first antenna 10 and the second antenna 20 in the ground portion will be verified using antenna devices of reference examples, which are simpler models.

Figure 10A:
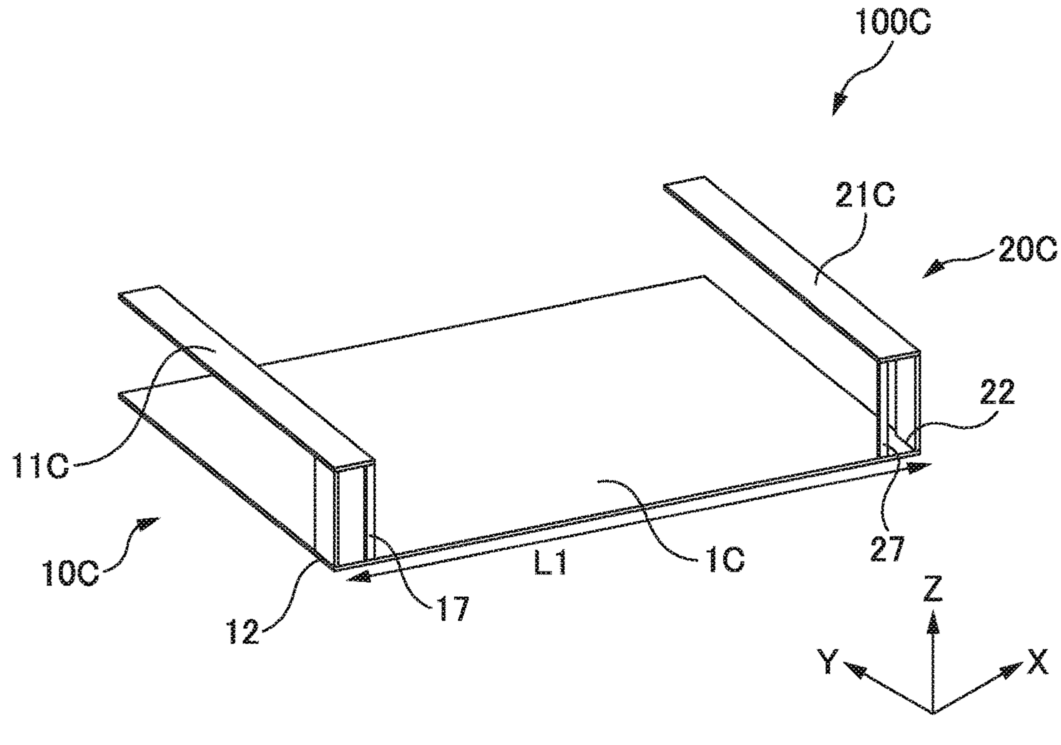
FIG. 10A is an explanatory diagram illustrating an antenna device 100C of a first reference example.
Figure 10B:
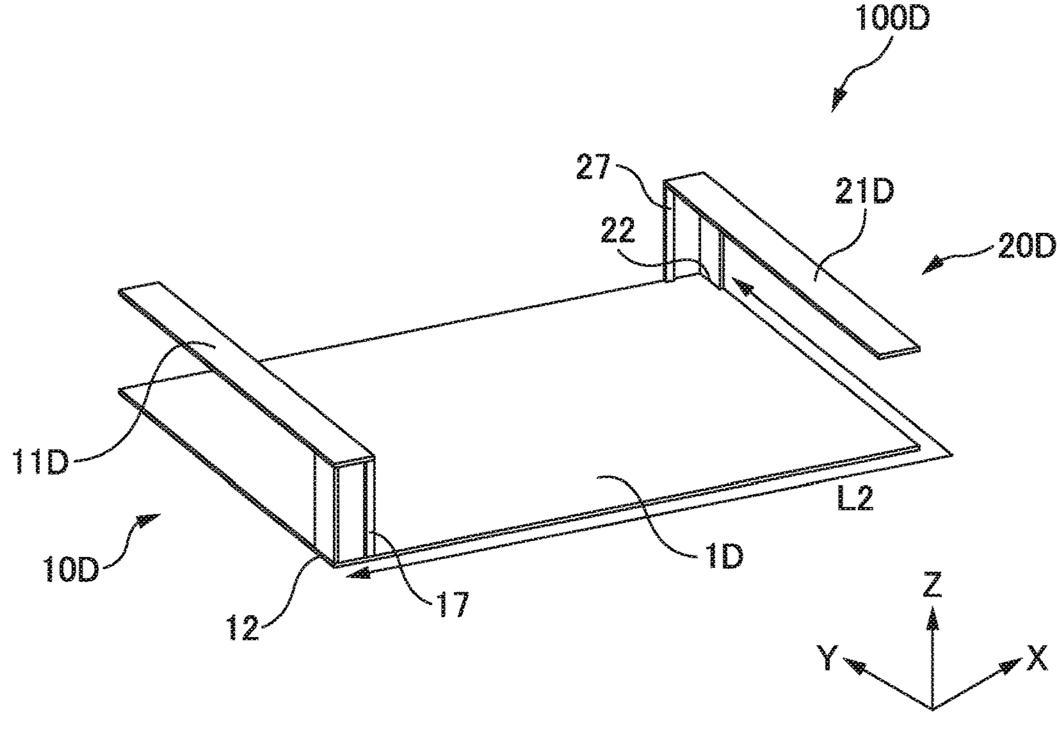
FIG. 10B is an explanatory diagram illustrating an antenna device 100D of a second reference example.

FIG. 10A is an explanatory diagram illustrating an antenna device 100C of a first reference example. FIG. 10B is an explanatory diagram illustrating an antenna device 100D of a second reference example.

In an embodiment of the present disclosure, the first antenna 10 and the second antenna 20 are respectively disposed at the two end parts in the direction parallel to the long side (X direction) in the quadrilateral region Q of the antenna device 100, as illustrated in FIG. 3A, in order to suppress the mutual influence (coupling) between the antennas. The antenna device 100C in the first reference example is a simpler model in which a first antenna 10C and a second antenna 20C are respectively located in the two end parts in the direction parallel to the long side (X direction) of a ground portion 1C formed into a rectangle, as illustrated in FIG. 10A. Similarly, in the antenna device 100D in the second reference example as well, a first antenna 10D and a second antenna 20D are respectively disposed in the two end parts in the direction parallel to the long side (X direction) of a ground portion 1D formed into a rectangle, as illustrated in FIG. 10B.

In the antenna device 100C of the first reference example, the first feeding portion 12 of the first antenna 10C and the second feeding portion 22 of the second antenna 20C are located so as to be line symmetrical with respect to the axis parallel to the direction in which the main body portion of the first element 11C (or the second element 21C) extends. On the other hand, in the antenna device 100D of the second reference example, the first feeding portion 12 of the first antenna 10D and the second feeding portion 22 of the second antenna 20D are located so as to be point symmetrical with respect to the center of the ground portion 1D. In the following description, the antenna device 100C in the first reference example may be referred to as "line symmetric model" and the antenna device 100D in the second reference example as "point symmetric model.

Figure 11:
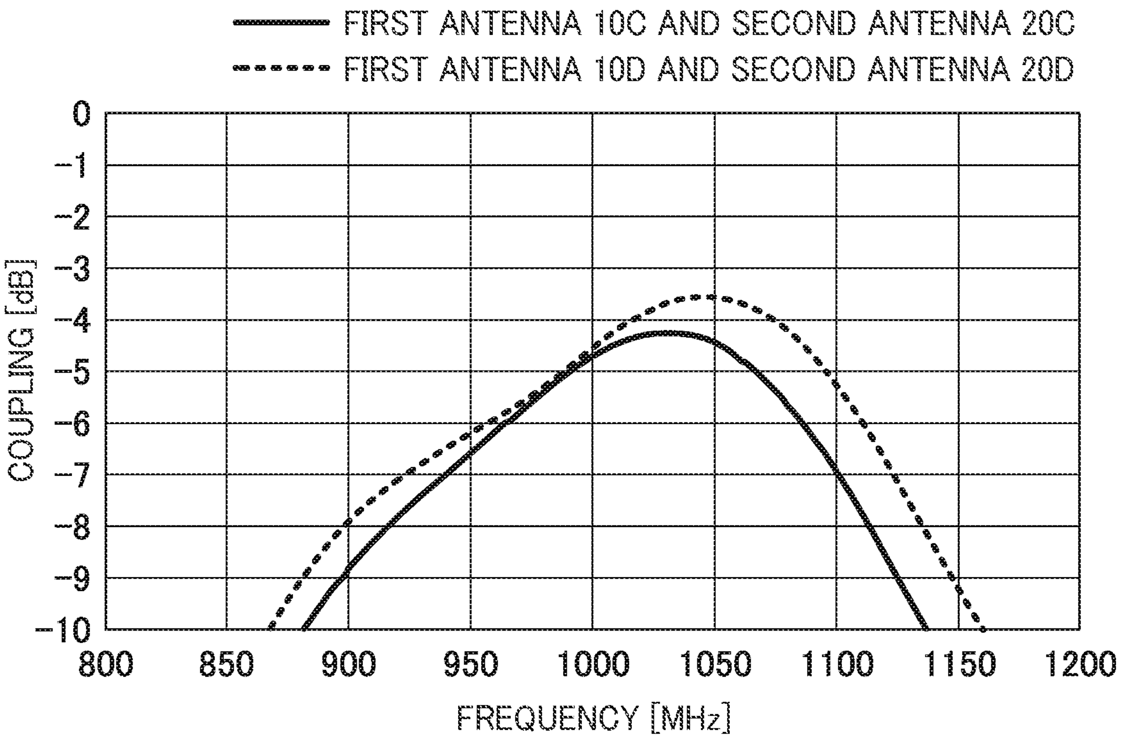
FIG. 11 is a diagram illustrating the frequency characteristics of coupling between an antenna device 100C and an antenna device 100D.

FIG. 11 is a diagram illustrating the frequency characteristics of the coupling between the antenna device 100C and the antenna device 100D.

In FIG. 11, the horizontal axis represents frequency and the vertical axis represents coupling. The results of the antenna device 100C in the first reference example are given by a solid line, and the results of the antenna device 100D in the second reference example are given by a dashed line.

FIG. 11 indicates that the smaller the coupling, the more the mutual influence between the antennas is suppressed. That is, the smaller the coupling, the more the mutual influence between the antennas is suppressed, that is, the better the isolation between the antennas is. As illustrated in FIG. 11, it can be seen that the mutual influence between the antennas is suppressed more and the isolation is better in the line-symmetric model (the antenna device 100C in the first reference example) than in the point-symmetric model (the antenna device 100D in the second reference example).

This seems to be because, in the low-frequency band, the length on the outline of the ground portion from the first feeding portion 12 to the second feeding portion 22 affects the operation of both the antennas. That is, this seems to be because the isolation deteriorates, with the length on the outline of the ground portion from the first feeding portion 12 to the second feeding portion 22 being substantially equal to the length according to the wavelength used in the low-frequency band.

In the line-symmetric model illustrated in FIG. 10A, L1 is defined as the length on the outline of the ground portion 1C from the feeding portion 12 to the feeding portion 22, and in the point-symmetric model illustrated in FIG. 10B, L2 is defined as the length on the outline of the ground portion 1D from the feeding portion 12 to the ground portion 22. It seems that with the length L2 in the point-symmetric model being substantially equal to the length according to the wavelength used in the low-frequency band, the isolation in the point-symmetric model deteriorates.

<<Excitation by Parasitic Element>>

In the antenna device 100C of the first reference example and the antenna device 100D of the second reference, described above, the antennas are respectively disposed at the two end parts in the direction (X direction) parallel to the long side of the ground portion formed into a rectangular. However, one of the elements of the antennas may be a parasitic element. With the portion corresponding to the parasitic element being excited, it is possible to achieve the lower frequency band of radio waves supported by the antenna.

Figure 12:
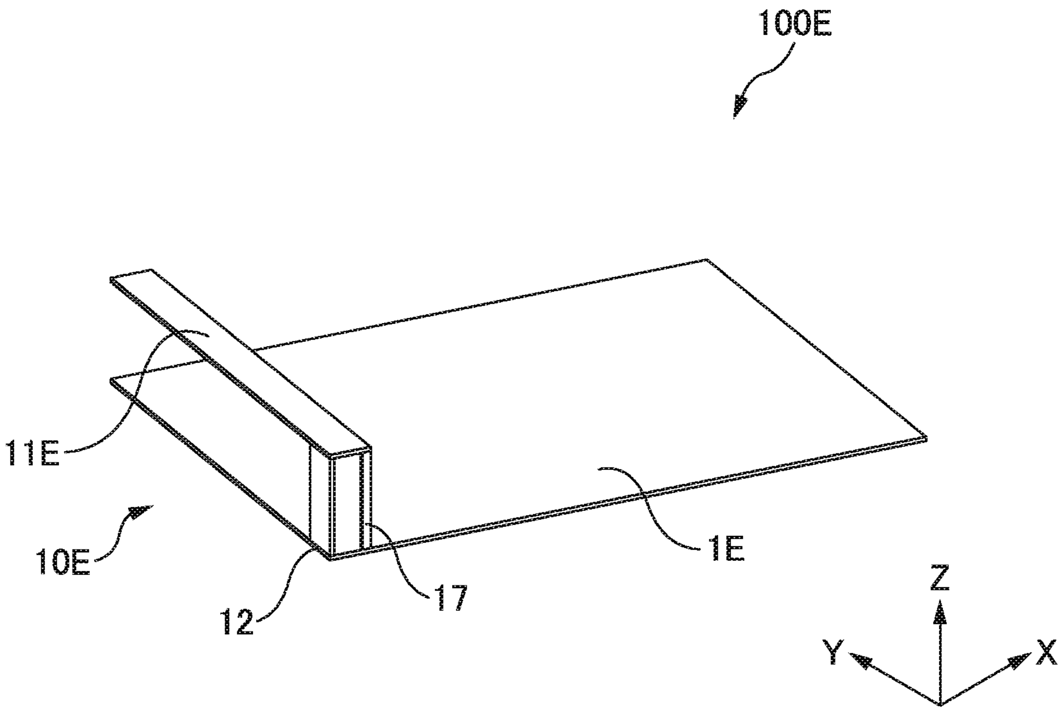
FIG. 12 is an explanatory diagram illustrating an antenna device 100E of a third reference example.
Figure 13A:
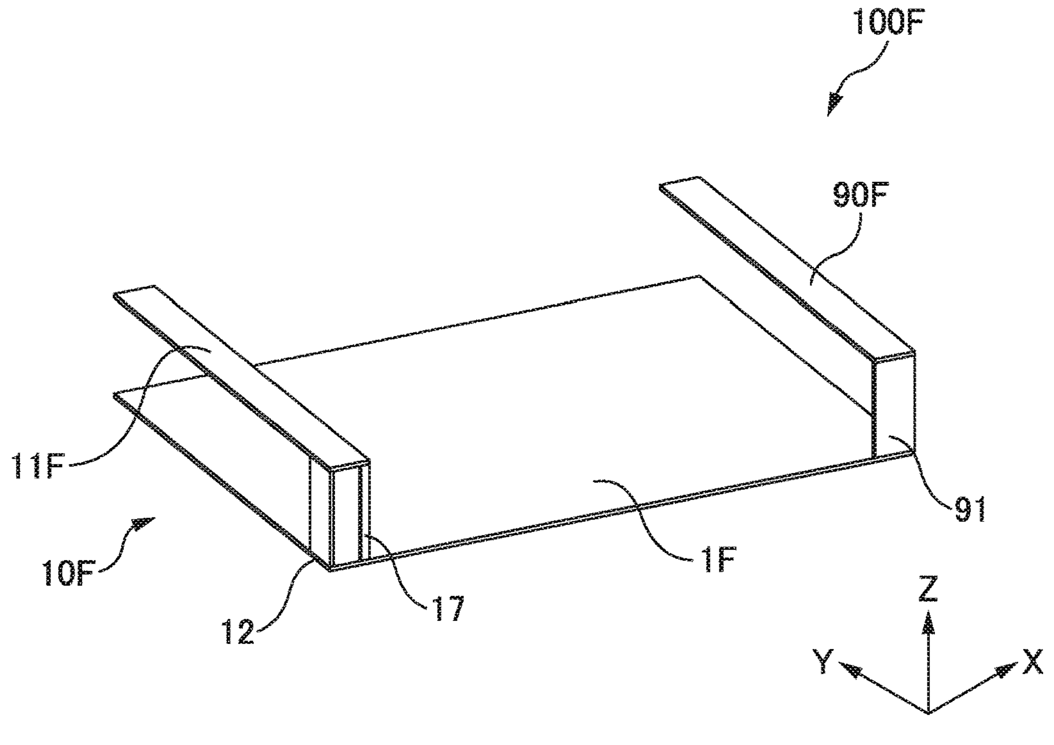
FIG. 13A is an explanatory diagram illustrating an antenna device 100F of a fourth reference example.
Figure 13B:
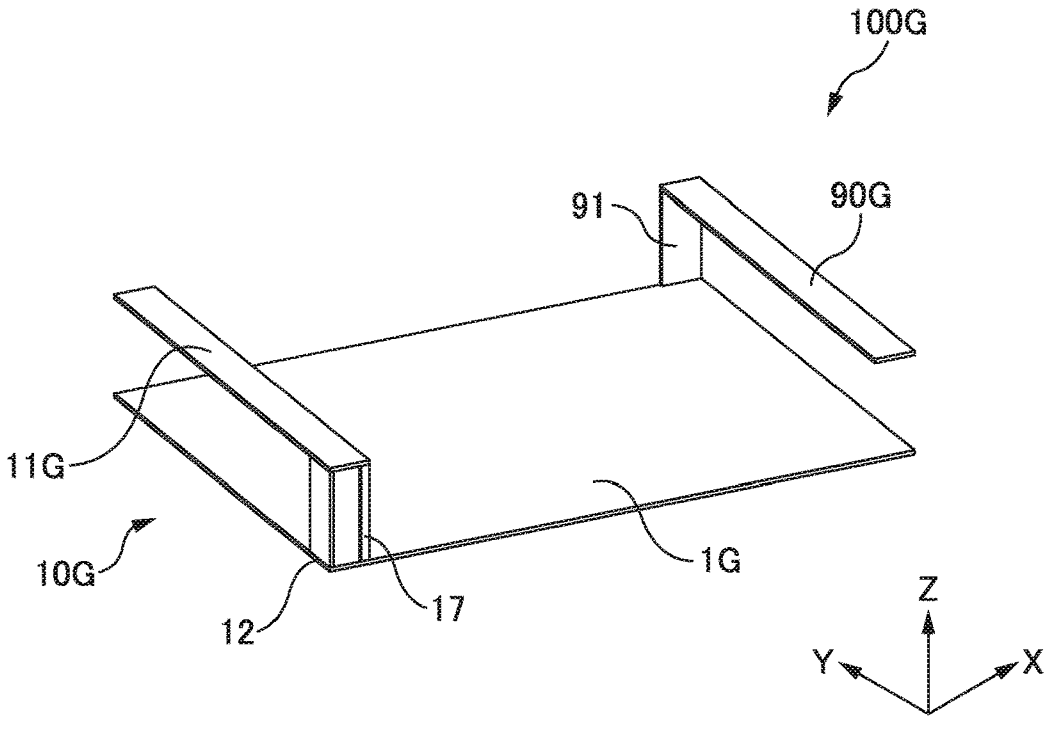
FIG. 13B is an explanatory diagram illustrating an antenna device 100G of a fifth reference example.

FIG. 12 is an explanatory diagram illustrating an antenna device 100E of a third reference example. FIG. 13A is an explanatory diagram illustrating an antenna device 100F of a fourth reference example. FIG. 13B is an explanatory diagram illustrating an antenna device 100G of a fifth reference example.

The antenna device 100E of the third reference example is a model including only a first antenna 10E, as a comparison target with an antenna device 100F of the fourth reference example to an antenna device 100I of the seventh reference example. In the antenna device 100E, the first antenna 10E is disposed in the end part on the −X direction side in a ground portion 1E formed into a rectangle, as illustrated in FIG. 12.

The antenna device 100F of the fourth reference example is a model obtained by replacing the second element 21C of the second antenna 20C with a parasitic element 90F in the antenna device 100C of the first reference example illustrated in FIG. 10A described above.

In the antenna device 100F, the parasitic element 90F is disposed at a ground portion 1F, as illustrated in FIG. 13A. The parasitic element 90F includes a standing portion 91 formed so as to stand from the ground portion 1F. In addition, in the antenna device 100F, the first feeding portion 12 of the first antenna 10F and the standing portion 91 of the parasitic element 90F are located so as to be line symmetrical with respect to the axis parallel to the direction in which the main body portion of the first element 11F extends.

The antenna device 100G of the fifth reference example is a model obtained by replacing the second element 21D of the second antenna 20D with the parasitic element 90F in the antenna device 100D of the second reference example illustrated in FIG. 10B described above.

In the antenna device 100G, as illustrated in FIG. 13B, the parasitic element 90G is disposed at a ground portion 1G. The parasitic element 90G includes the standing portion 91 formed so as to stand from the ground portion 1G. Further, in the antenna device 100G, the first feeding portion 12 of the first antenna 10G and the standing portion 91 of the parasitic element 90G are located so as to be point-symmetrical with respect to the center of the ground portion 1G.

In the antenna device 100F of the fourth reference example and the antenna device 100G of the fifth reference example described above, the parasitic element includes a portion extending in a height direction (i.e., the standing portion). However, the parasitic element may have a shape extending in the same plane as the front surface of the ground portion, without including the standing portion.

Figure 14A:
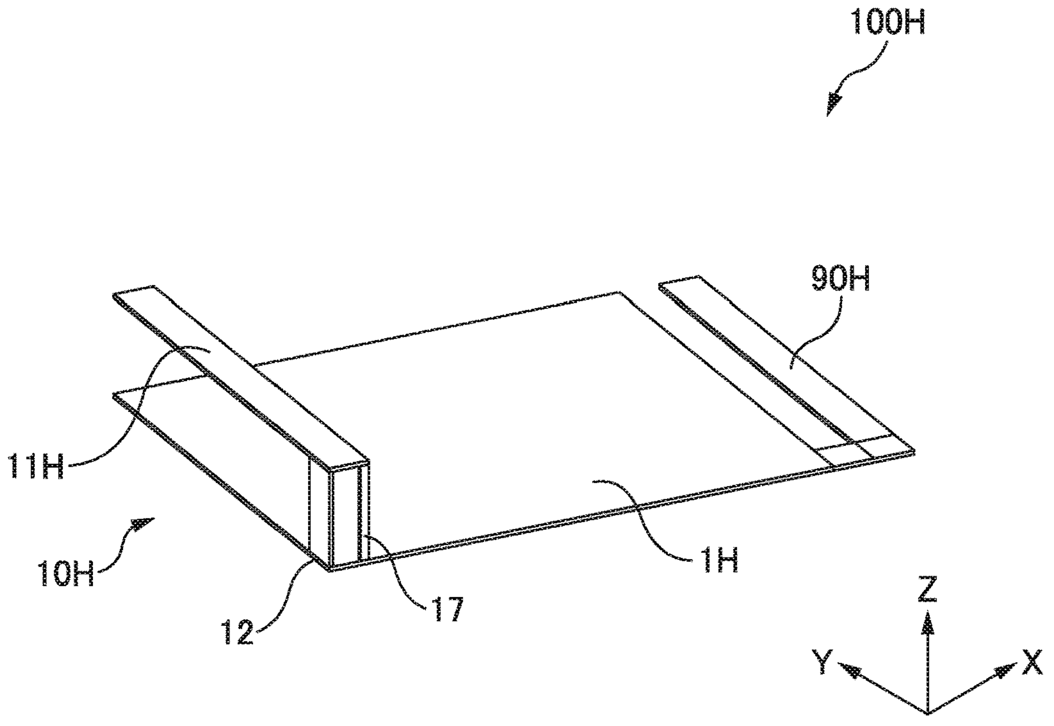
FIG. 14A is an explanatory diagram illustrating an antenna device 100H of a sixth reference example.
Figure 14B:
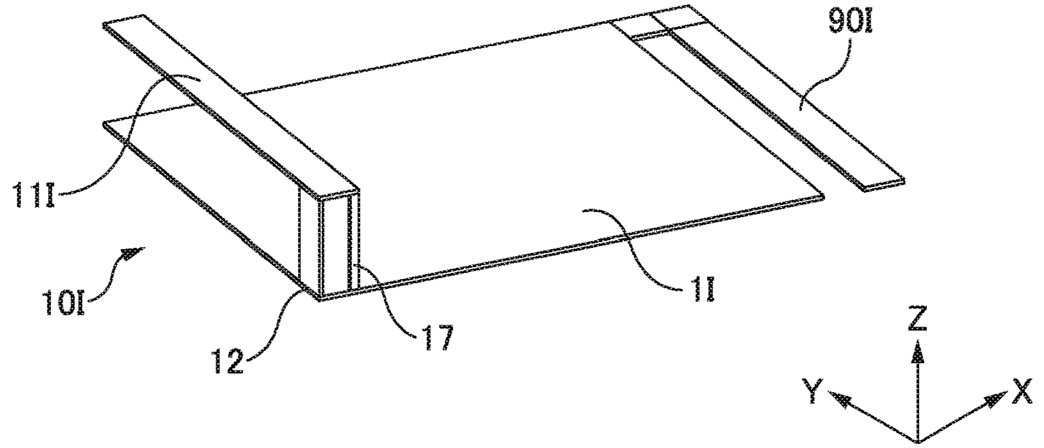
FIG. 14B is an explanatory diagram illustrating an antenna device 1001 of a seventh reference example.

FIG. 14A is an explanatory diagram illustrating the antenna device 100H of the sixth reference example. FIG. 14B is an explanatory diagram illustrating the antenna device 100I of the seventh reference example.

The antenna device 100H of the sixth reference example is a model obtained by replacing the parasitic element 90F with a parasitic element 90H in the antenna device 100F of the fourth reference example illustrated in FIG. 13A described above. In the antenna device 100H, the parasitic element 90H has a shape extending in the same plane as the front surface of a ground portion 1H, as illustrated in FIG. 14A.

The antenna device 100I of the seventh reference example is a model obtained by replacing the parasitic element 90G with a parasitic element 90I, in the antenna device 100G of the fifth reference example illustrated in FIG. 13B described above. In the antenna device 100I, the parasitic element 90I has a shape extending in the same plane as the front surface of a ground portion 1I, as illustrated in FIG. 14B.

In the following description, the antenna device 100E of the third reference example may be referred to as "single antenna element model". Further, the antenna device 100F of the fourth reference example may be referred to as "standing parasitic element and line symmetric model", and the antenna device 100G of the fifth reference example may be referred to as "standing parasitic element and point symmetric model". Further, the antenna device 100H of the sixth reference example may be referred to as "planar parasitic element and line symmetric model", and the antenna device 100I of the seventh reference example may be referred to as "planar parasitic element and point symmetric model".

Figure 15:
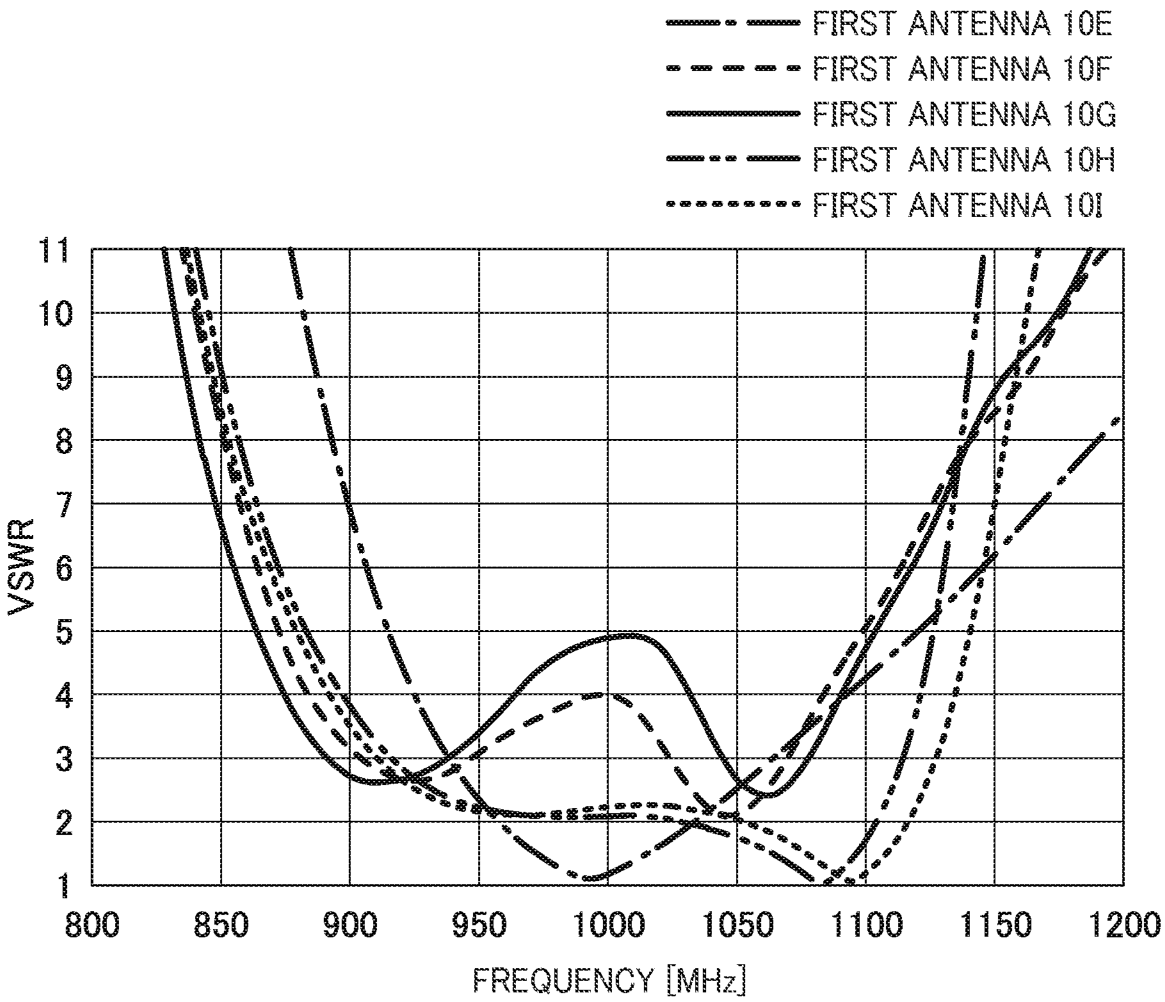
FIG. 15 is a diagram illustrating the frequency characteristics of the VSWRs of a first antenna 10E to a first antenna 101.

FIG. 15 is a diagram illustrating the frequency characteristics of the VSWRs of the first antenna 10E to the first antenna 101.

In FIG. 15, the horizontal axis represents frequency and the vertical axis represents voltage standing wave ratio (VSWR). The results of the first antenna 10E of the third reference example are given by a dash-dot line, the results of the first antenna 10F of the fourth reference example are given by a dashed line, the results of the first antenna 10G of the fifth reference example given by a solid line, the results of the first antenna 10H of the sixth reference example are given by a dash-dot-dot line, and the results of the first antenna 10I of the seventh reference example are given by a dotted line.

As illustrated in FIG. 15, in the low-frequency band (617 MHz to 960 MHz band), when evaluating the bandwidth of the frequency band corresponding to the peak of the VSWR, the model that was the most effective in expanding the low frequency band was the standing parasitic element and point symmetric model (the first antenna 10G of the fifth reference example). The model that was effective in expanding the low frequency band next was the standing parasitic element and line symmetric model (the antenna device 100F in the fourth reference example).

The following gives, in the order of effectiveness in expanding the low frequency band, the planar parasitic element and point symmetric model (the antenna device 100I of the seventh reference example), the planar parasitic element and line symmetric model (the antenna device 100H of the sixth reference example), and the single antenna element model (the antenna device 100E of the third reference example).

In the verification in FIG. 11 described above (verification with the arrangement of the first element and the second element), the line symmetric model had better characteristics than the point symmetric model. However, in the verification using the arrangement of the first element and the parasitic element, the point symmetric model had better characteristics than the line symmetric model.

This seems to be because there is no need to consider the isolation in the combination of the first element and the parasitic element. This seems to be because, without consideration of the isolation, the point symmetric model, in which the length on the outline of the ground portion from the first feeding portion 12 to the parasitic element is longer, has better characteristics than the line symmetric model.

Second Embodiment

In the first embodiment described above, as illustrated in FIGS. 3A and 3B, the description has been given of the antenna device 100 in which the ground portion 1 has an external form obtained by forming the cutout portion 3 in a quadrilateral, in plan view when viewed in the −Z direction (downward direction). In an antenna device 200 in an embodiment of the present disclosure illustrated in FIGS. 19A and 19B, which will be described later, as in the antenna device 100 of the first embodiment, the ground portion has an external form obtained by forming a cutout portion in a quadrilateral, in plan view when viewed in the −Z direction (downward direction).

In the antenna device 200, the size, shape, position, and/or the like of the cutout portion formed in the ground portion may be changed as appropriate in relation to the third antenna (patch antenna) disposed at the ground portion. Thus, the following describes an example in which the size, shape, position, and/or the like of the cutout portion formed in the ground portion are variously changed, using, as a model, the antenna device 200 which has only the third antenna (patch antenna).

In addition, a description will be given of the verification results of the characteristics (VSWRs by port and axial ratio) of the third antenna (patch antenna) located at the ground portion, when the size, shape, position, and/or the like of the cutout portion formed in the ground portion are variously changed. Note that even the antenna device, further including at least one of the first antenna or the second antenna described above, in addition to the third antenna (patch antenna), also can obtain results similar to present verification results described below.

COMPARATIVE EXAMPLE

Before describing the antenna device 200 of a second embodiment, antenna devices (an antenna device 200A and an antenna device 200B) of comparative examples will be described, first.

Overview

Figure 16A:
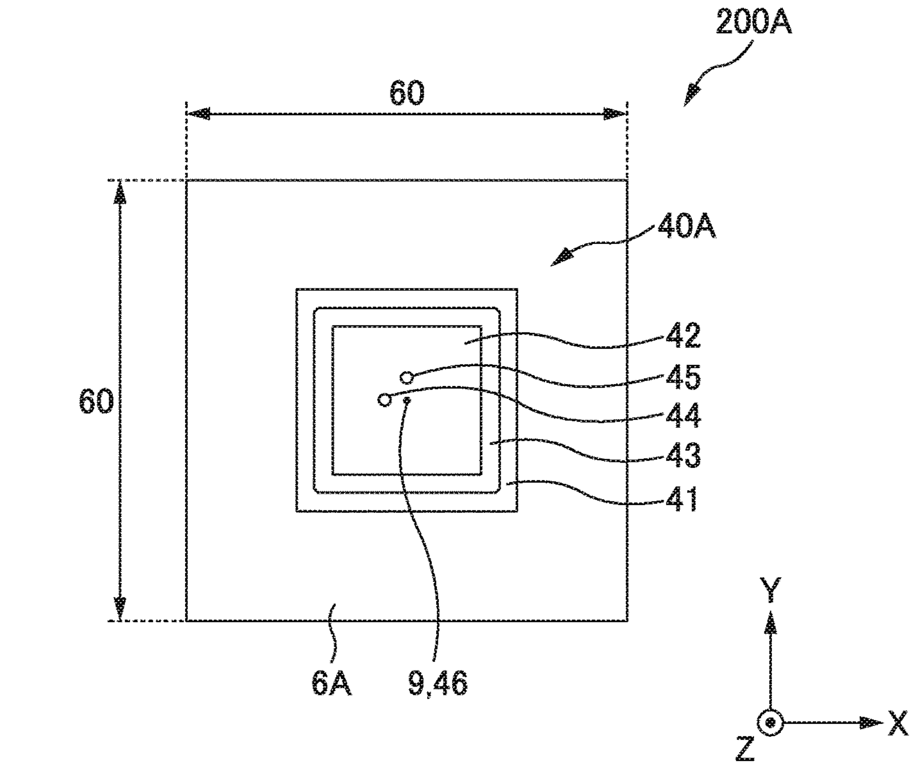
FIG. 16A is an explanatory diagram illustrating an antenna device 200A of a first comparative example.
Figure 16B:
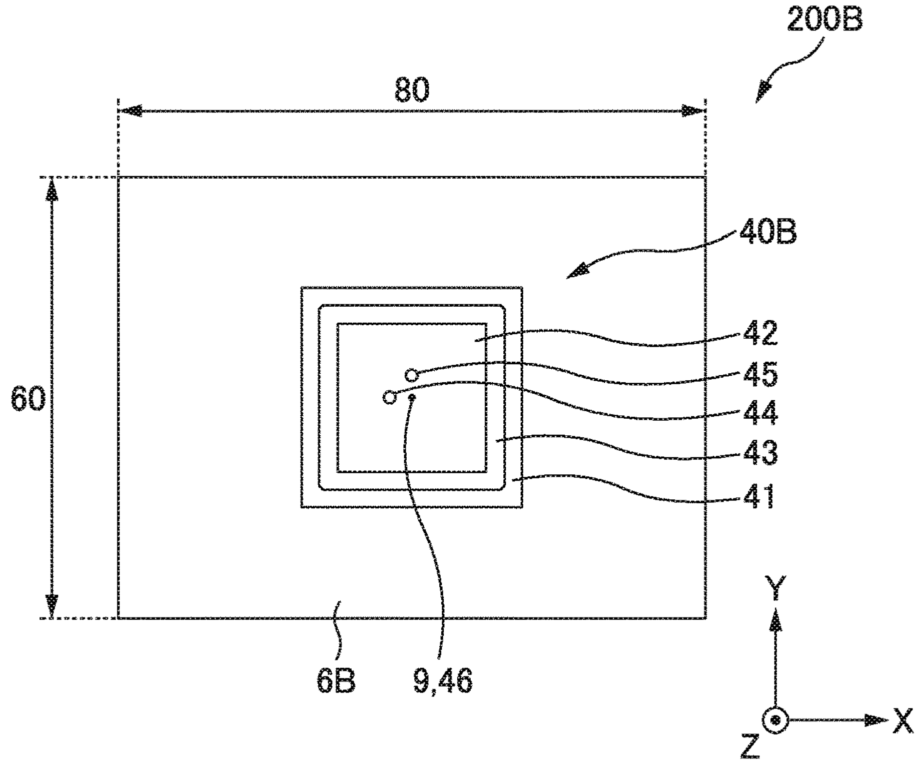
FIG. 16B is an explanatory diagram illustrating an antenna device 200B of a second comparative example.

FIG. 16A is an explanatory diagram illustrating the antenna device 200A of a first comparative example. FIG. 16B is an explanatory diagram illustrating the antenna device 200B of a second comparative example.

In the antenna device 200A of the first comparative example, as illustrated in FIG. 16A, the external form of a ground portion 6A is a square having equal vertical length (in the Y direction) and lateral length (in the X direction) in plan view when viewed in the −Z direction (downward direction). Specifically, the external form of the ground portion 6A is a square with a vertical length of 60 mm and a lateral length of 60 mm. Further, in the antenna device 200A of the first comparative example, a third antenna 40A is disposed at the center 9 of the ground portion 6A.

Here, the phrase "the third antenna is disposed at the center of the ground portion" indicates that, when taking the antenna device 200A of the first comparative example as an example, the center 9 of the ground portion 6A and the center 46 of the third antenna 40A substantially match. The "center" is the geometric center in the external form, as in the antenna device 100 in the first embodiment described above. Further, "substantially match" is not limited to the case where they completely match, but includes the case where there is a deviation within a predetermined range considering tolerances and the like. Further, the center 46 of the third antenna 40A is the center of a radiating element 42 (described later) of the third antenna 40A.

The third antenna 40A includes an antenna base portion 41, the radiating element 42, and a dielectric 43, as in the third antenna 30 of the antenna device 100 in the first embodiment described above. The antenna base portion 41, the radiating element 42, and dielectric 43 have the same configurations as the corresponding components in the third antenna 30. For example, as in the radiating element 32, the radiating element 42 includes a feeding portion 44 on the port 1 side (hereinafter, may be referred to as "port 1") and a feeding portion 45 on the port 2 side (hereinafter, may be referred to as "port 2"). The third antenna 40A employs a configuration including two feeders for supplying power to the radiating element 42, in other words, a double-feed system. Other characteristics of the third antennas 40A are omitted since they are similar to the third antenna 30.

In the antenna device 200B of the second comparative example, as illustrated in FIG. 16B, the external form of the ground portion 6B is rectangular in plan view when viewed in the −Z direction (downward direction), and has vertical length (in the Y direction) and lateral length (in the X direction) that are different. Specifically, the external form of the ground portion 6B is a rectangle with a vertical length of 60 mm and a lateral length of 80 mm, where the vertical length is shorter than the lateral length. Further, in the antenna device 200B of the second comparative example, the third antenna 40B similar to the third antenna 40A in the first comparative example is disposed at the center 9 of the ground portion 6B.

<Frequency Characteristics>

Figure 17A:
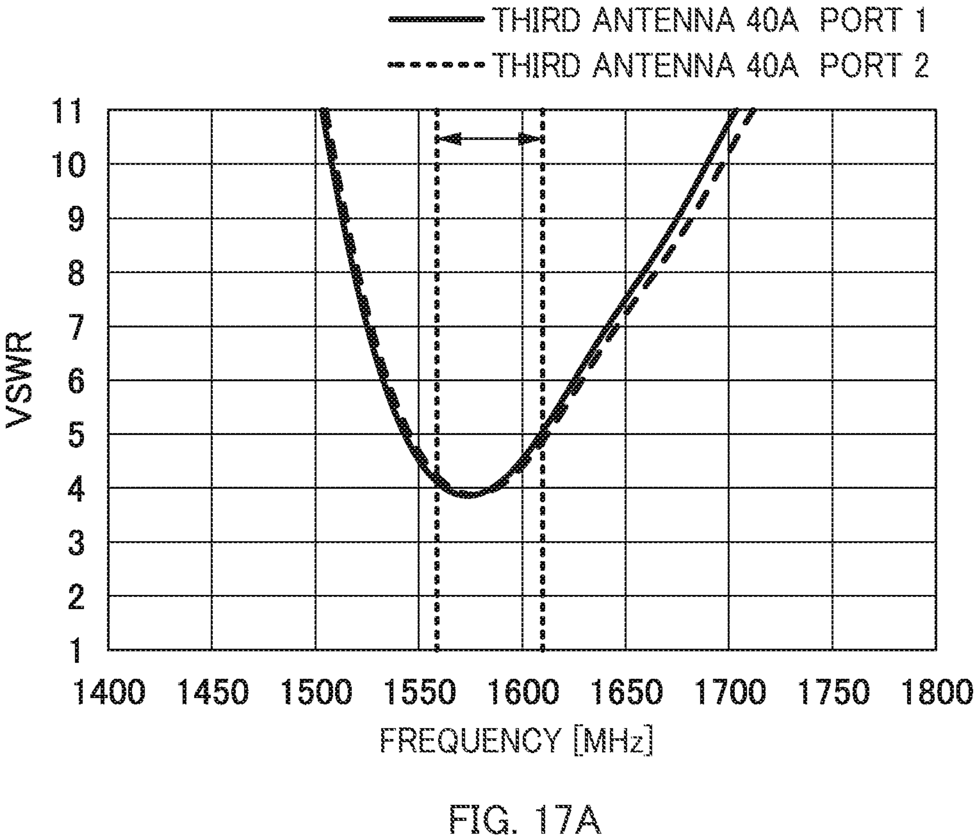
FIG. 17A is a diagram illustrating the frequency characteristics of the VSWRs by port of a third antenna 40A.
Figure 17B:
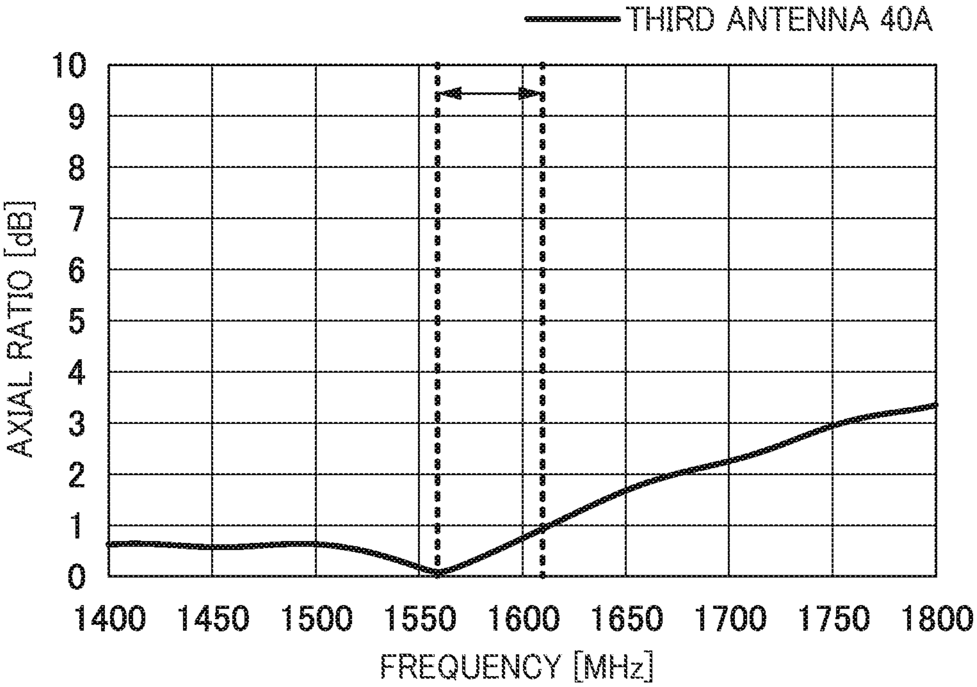
FIG. 17B is a diagram illustrating the frequency characteristics of the axial ratio of a third antenna 40A.
Figure 18A:
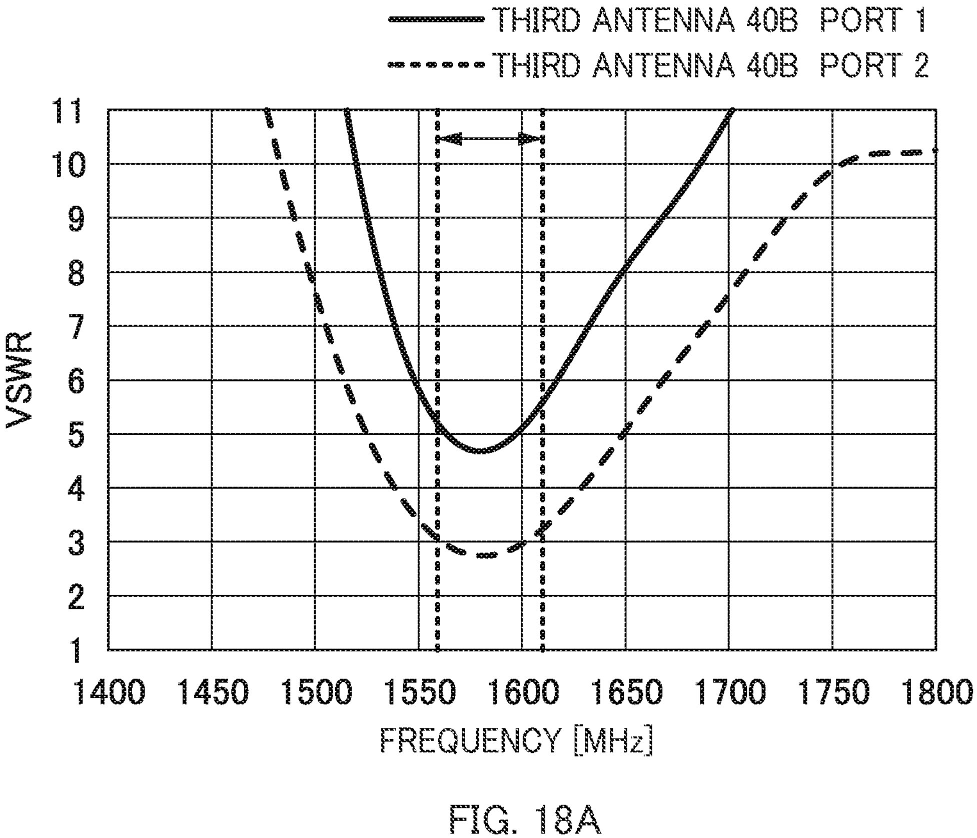
FIG. 18A is a diagram illustrating the frequency characteristics of the VSWRs by port of a third antenna 40B.
Figure 18B:
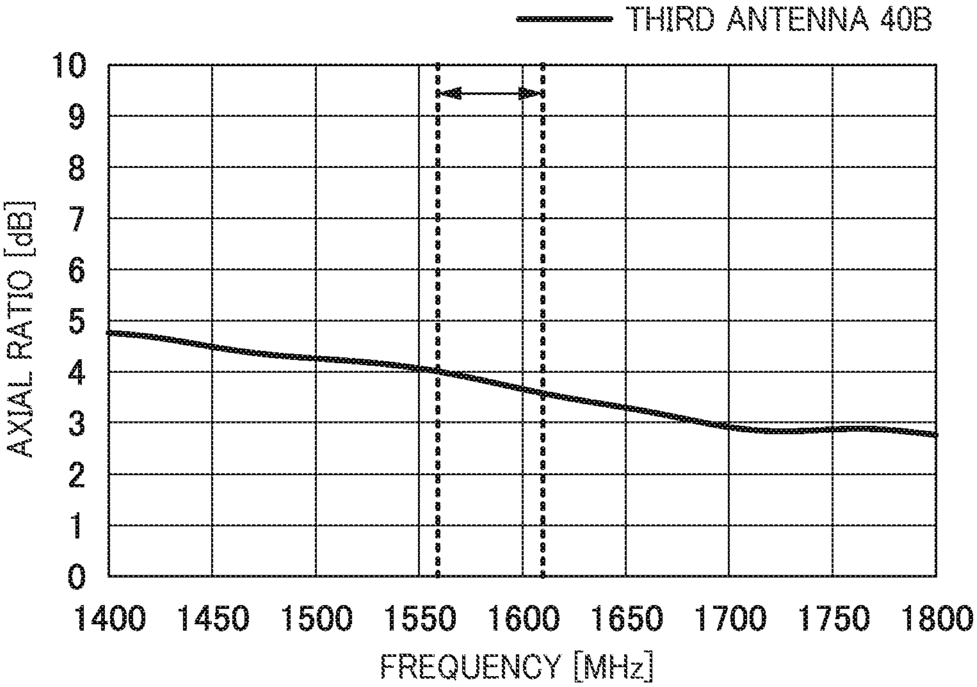
FIG. 18B is a diagram illustrating the frequency characteristics of the axial ratio of a third antenna 40B.

FIG. 17A is a diagram illustrating the frequency characteristics of the VSWRs by port of the third antenna 40A. FIG. 17B is a diagram illustrating the frequency characteristics of the axial ratio of the third antenna 40A. FIG. 18A is a diagram illustrating the frequency characteristics of the VSWRs by port of the third antenna 40B. FIG. 18B is a diagram illustrating the frequency characteristics of the axial ratio of the third antenna 40B. In each of FIGS. 17A to 18B, the dashed line represents the range of the frequency band of radio waves supported by the third antenna (the third antenna 40A and the third antenna 40B).

In FIGS. 17A and 18A, the horizontal axis represents frequency and the vertical axis represents voltage standing wave ratio (VSWR). In the third antenna, the results of the feeding portion 44 on the port 1 side are given by a solid line, and the results of the feeding portion 45 on the port 2 side are given by a dashed line.

Further, in FIGS. 17B and 18B, the horizontal axis represents frequency, and the vertical axis represents axial ratio (AR). Here, the axial ratio is an index to evaluate how ideal circularly polarized waves the third antenna (patch antenna), which supports the circularly polarized waves, is being able to support. The better the axial ratio is (i.e., the smaller the axial ratio is, and the closer it is to 0), the more the radiation efficiency becomes substantially equal between the ports of the third antenna (patch antenna), and the more circularly polarized waves it is being able to support.

As illustrated in FIG. 17A, the characteristics of the VSWR are substantially the same between the ports (port 1 and port 2) of the third antenna 40A. This seems to be because the external form of the ground portion 6A where the third antenna 40A is disposed is square, and thus the impedance characteristics are substantially the same between the ports 1 and 2. Accordingly, the radiation efficiency is substantially equal between the ports of the third antenna 40A, and the axial ratio of the third antenna 40A is good as illustrated in FIG. 17B.

On the other hand, as illustrated in FIG. 18A, the VSWR characteristics are significantly different between the ports (port 1 and port 2) of the third antenna 40B. This seems to be because the external form of the ground portion 6B, where the third antenna 40B is disposed, is different in vertical length and lateral length (i.e., the ground portion 6B is rectangular), and thus the impedance characteristics will be significantly different between the port 1 and the port 2. Accordingly, the radiation efficiency results in being significantly different between the ports of the third antenna 40B, and as illustrated in FIG. 18B, the axial ratio of the third antenna 40B results in being significantly worse than the axial ratio of the third antenna 40A.

<<Antenna Device 200>>

Overview

Figure 19A:
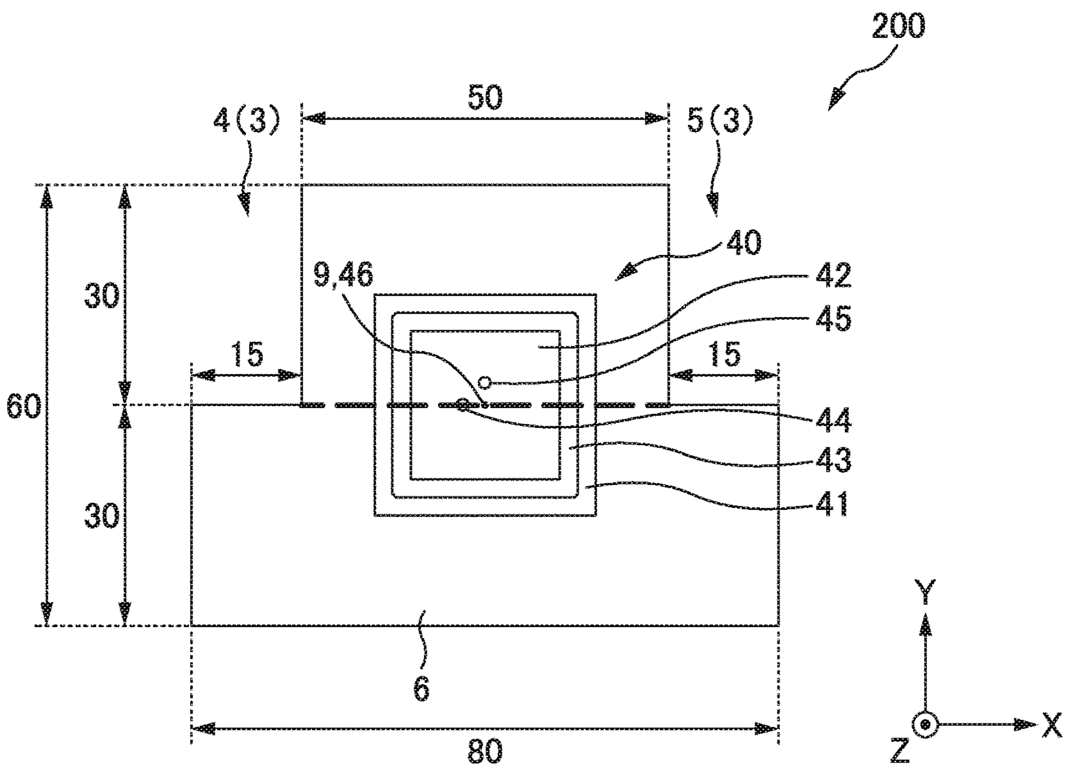
FIG. 19A is an explanatory diagram of an antenna device 200 of a second embodiment.
Figure 19B:
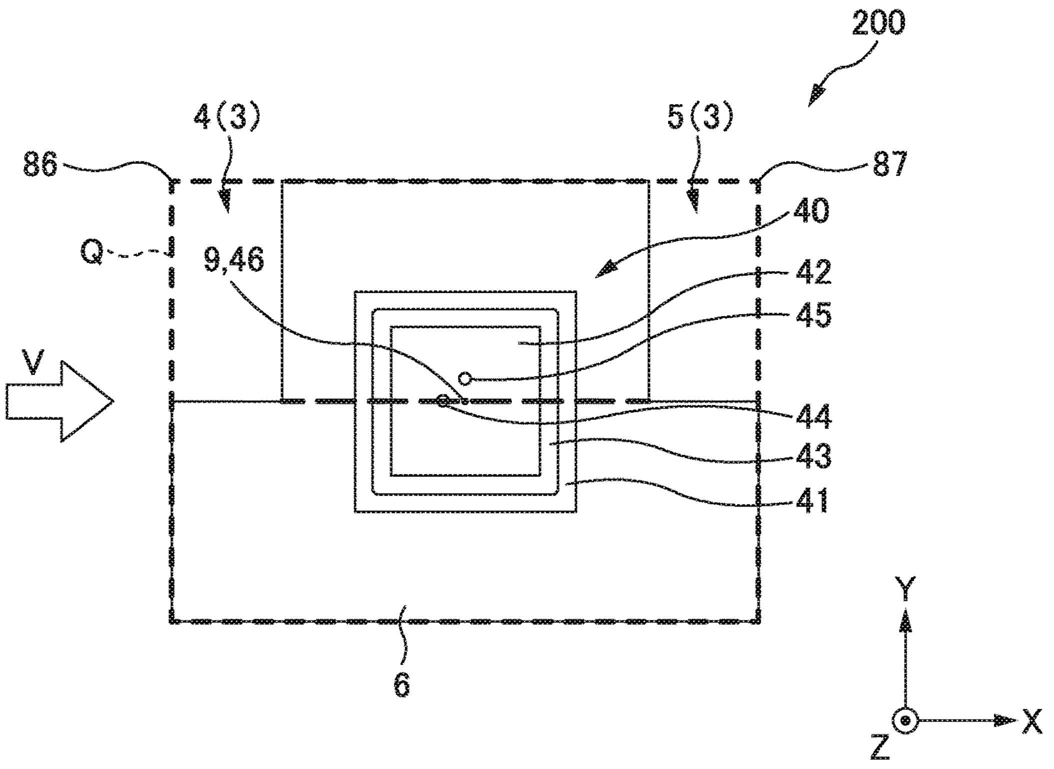
FIG. 19B is an explanatory diagram of a quadrilateral region Q.

FIG. 19A is an explanatory diagram of the antenna device 200 of the second embodiment. FIG. 19B is an explanatory diagram of the quadrilateral region Q.

In the antenna device 200 in an embodiment of the present disclosure, as illustrated in FIGS. 19A and 19B, a ground portion 6 has an external form obtained by forming the cutout portion 3 in a quadrilateral (here, a rectangle), in plan view when viewed in the −Z direction (downward direction). As in the antenna device 100 of the first embodiment described above, the quadrilateral region in which this cutout portion 3 is to be formed may be referred to as "quadrilateral region Q". The quadrilateral region Q is a region given by a dashed line in FIG. 19B.

In the antenna device 200 in an embodiment of the present disclosure, as illustrated in FIG. 19B, the external form of the quadrilateral region Q is a rectangle, in plan view when viewed in the −Z direction (downward direction), with vertical length and lateral length that are different. Specifically, the external form of the quadrilateral region Q is a rectangle with a vertical length of 60 mm and a lateral length of 80 mm, where the vertical length is shorter than the lateral length. The external dimensions (vertical length and lateral length) of the quadrilateral region Q are equal to the external dimensions (vertical length and lateral length) of the ground portion 6B in the antenna device 200B of the second comparison example, for comparison. However, the external dimensions of the quadrilateral region Q described above are merely examples, and can be changed as appropriate depending on the frequency band of radio waves supported by the third antenna 40.

Further, in the antenna device 200 in an embodiment of the present disclosure, the third antenna 40, which is the same or similar to the third antenna 40B in the second comparative example, is disposed at the center 9 of the quadrilateral region Q.

The cutout portion 3 formed in the quadrilateral region Q has a first cutout portion 4 positioned at a first corner 86 of the quadrilateral region Q, and a second cutout portion 5 positioned at a second corner 87 of the quadrilateral region Q.

In the antenna device 200 in an embodiment of the present disclosure, the external form of the first cutout portion 4 in the quadrilateral region Q is a rectangle with a vertical length of 30 mm and a lateral length of 15 mm. Further, the external form of the second cutout portion 5 in the quadrilateral region Q is a rectangle with a vertical length of 30 mm and a lateral length of 15 mm. That is, the external form of the first cutout portion 4 in the quadrilateral region Q and the external form of the second cutout portion 5 in the quadrilateral region Q have the same shape and the same dimensions.

Further, in the antenna device 200 in an embodiment of the present disclosure, the first corner 86 and the second corner 87 are respectively located on the sides of two ends of the long side of the quadrilateral region Q, as illustrated in FIGS. 19A and 19B. In other words, the first cutout portion 4 and the second cutout portion 5 are respectively located on the two end sides of the long side of the quadrilateral region Q. Accordingly, the external form of the ground portion 6 is a line-symmetrical shape with respect to the axis passing through the center 9 of the quadrilateral region Q and parallel to the short side of the quadrilateral region Q.

However, in the antenna device 200, the first corner 86 (first cutout portion 4) and the second corner 87 (second cutout portion 5) may be respectively located on two end sides of the short side of the quadrilateral region Q. In this case, the external form of the ground portion 6 may be line-symmetrical with respect to the axis passing through the center 9 of the quadrilateral region Q and parallel to the long side of the quadrilateral region Q. Further, in the antenna device 200, the first corner 86 (first cutout portion 4) and the second corner 87 (second cutout portion 5) may be at diagonal positions in the quadrilateral region Q. In this case, the external form of the ground portion 6 may be point-symmetrical with respect to the center 9 of the quadrilateral region Q.

From the above, in the antenna device 200, the first corner 86 (first cutout portion 4) and the second corner 87 (second cutout portion 5) only have to be located so as to sandwich the third antenna 40 therebetween in the quadrilateral region Q.

Note that the external dimensions of the first cutout portion 4 and the second cutout portion 5 described above are merely examples, and can be changed as appropriate depending on the frequency band of radio waves supported by the third antenna 40. The external form of the first cutout portion 4 and the external form of the second cutout portion 5 may be different from each other. Further, the external form of the first cutout portion 4 and the external form of the second cutout portion 5 may be the same, and may be different only in dimensions (i.e., one may have a shape similar to that of the other). Further, the cutout portion 3 may have only one of the first cutout portion 4 or the second cutout portion 5. Furthermore, the cutout portion 3 may be located at a position other than the corners of the quadrilateral region Q.

In FIG. 19A, in side view when viewed in the X direction, the position of the end part of the cutout portion 3 on the −Y direction side in the ground portion 6 (hereinafter may be referred to as "maximum vertical cutout position") is given by a dashed line. Further, in FIG. 19B, an arrow V indicates an example of a direction of a side view when viewed in the X direction.

In the antenna device 200 in an embodiment of the present disclosure, the external dimensions of the first cutout portion 4 and the external dimensions of the second cutout portion 5 are the same, and thus the end part on the −Y direction side of the first cutout portion 4 and the end part on the −Y direction side of the second cutout portion 5 results in being at the same position. Thus, the maximum vertical cutout position of the cutout portion 3 is also the position of the end part of the first cutout portion 4 on the −Y direction side in the ground portion 6, and also the position of the end part of the second cutout portion 5 on the −Y direction side in the ground portion 6.

Note that the dimension in the Y direction of the external form of the first cutout portion 4 and the dimension in the Y direction of the external form of the second cutout portion 5 may be different from each other. In this case, the maximum vertical cutout position of the cutout portion 3 is the position more on the −Y direction side out of the position of the end part of first cutout portion 4 on the −Y direction side in the ground portion 6, and the position of the end part of second cutout portion 5 on the −Y direction side in the ground portion 6. Details of the maximum vertical cutout position given by the dashed line in FIG. 19A will be described later.

<Frequency Characteristics>

Figure 20A:
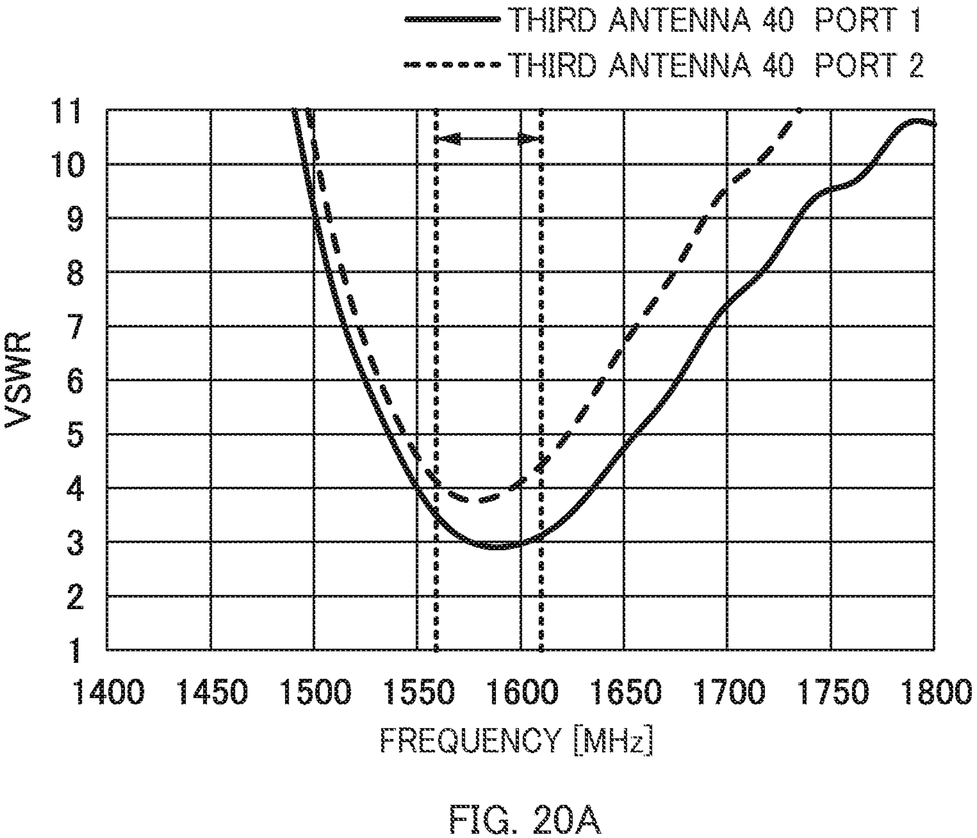
FIG. 20A is a diagram illustrating the frequency characteristics of VSWRs by port of a third antenna 40.
Figure 20B:
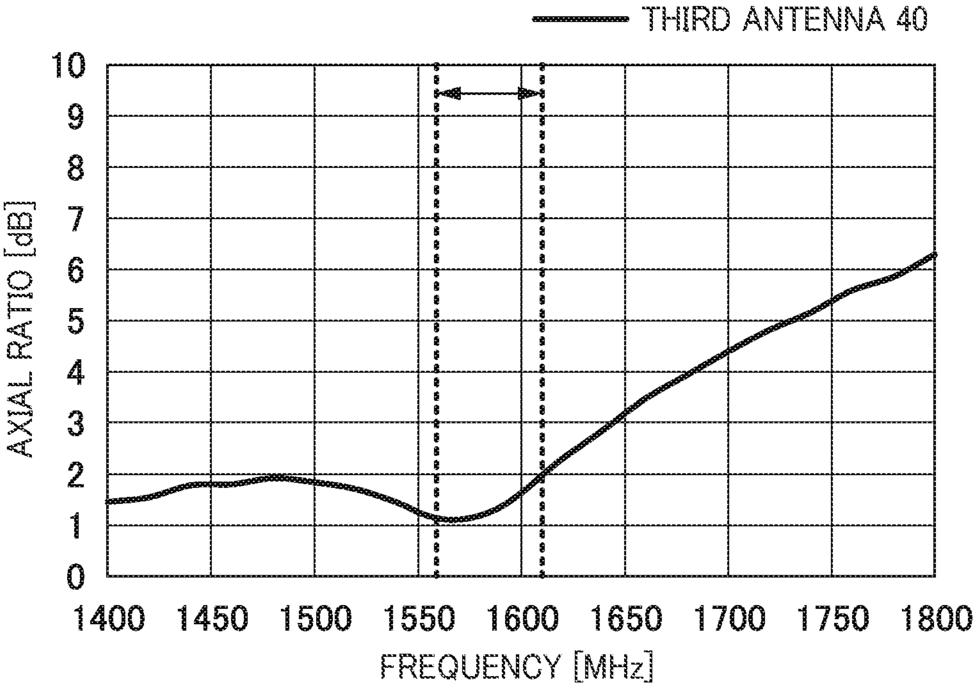
FIG. 20B is a diagram illustrating the frequency characteristics of the axial ratio of a third antenna 40.

FIG. 20A is a diagram illustrating the frequency characteristics of the VSWRs by port of the third antenna 40. FIG. 20B is a diagram illustrating the frequency characteristics of the axial ratio of the third antenna 40. In each of FIGS. 20A and 20B, the dashed line represents the range of the frequency band of radio waves supported by the third antenna 40.

In FIG. 20A, the horizontal axis represents frequency and the vertical axis represents voltage standing wave ratio (VSWR). In the third antenna 40, the results of the feeding portion 44 on the port 1 side are represented by a solid line, and the results of the feeding portion 45 on port 2 side are represented by a dashed line. Further, in FIG. 20B, the horizontal axis represents frequency, and the vertical axis represents axial ratio.

As illustrated in FIG. 20A, the difference in characteristics of the VSWR between the ports (port 1 and port 2) of the third antenna 40 is smaller than the case of the third antenna 40B (external form of the ground portion 6B is rectangular) in the second comparative example illustrated in FIG. 18A described above. When comparing the difference between the peaks of the VSWRs, the difference in the characteristics of the VSWR between the ports in the third antenna 40B in the second comparative example illustrated in FIG. 18A is about 2, meanwhile the difference in the characteristics of the VSWR between the ports in the third antenna 40 in an embodiment of the present disclosure is about 1. Accordingly, the difference in the radiation efficiency between the ports in the third antenna 40 also decreases, and as illustrated in FIG. 20B, the axial ratio of the third antenna 40 is greatly improved as compared to the case of the third antenna 40B in the second comparative example illustrated in FIG. 18B described above.

In the antenna device 200 in an embodiment of the present disclosure, the ground portion 6 has a shape obtained by forming the cutout portion 3 in the quadrilateral region Q, which is a rectangle, and the third antenna 40 is disposed at the ground portion 6. As described above, the axial ratio of the third antenna 40 is greatly improved as compared to the case of the third antenna 40B, which is disposed at the ground portion 6B having the same shape and dimensions as of the quadrilateral region Q.

Accordingly, in the antenna device 200 in an embodiment of the present disclosure, with the ground portion 6 where the third antenna 40 is disposed having a shape obtained by forming the cutout portion 3 in the quadrilateral region Q, the characteristics of the axial ratio in the third antenna 40 are close to those of in the case of the third antenna 40A disposed at the ground portion 6A, which is a square.

<<Position of Third Antenna in Ground Portion>>

As described above, in the antenna device 200 in an embodiment of the present disclosure, the third antenna 40 is disposed at the center 9 of the quadrilateral region Q in the ground portion 6. The following verifies the desirable position of the third antenna in the ground portion, with the position of the third antenna in the Y direction in the ground portion being variously changed.

Overview

Figure 21A:
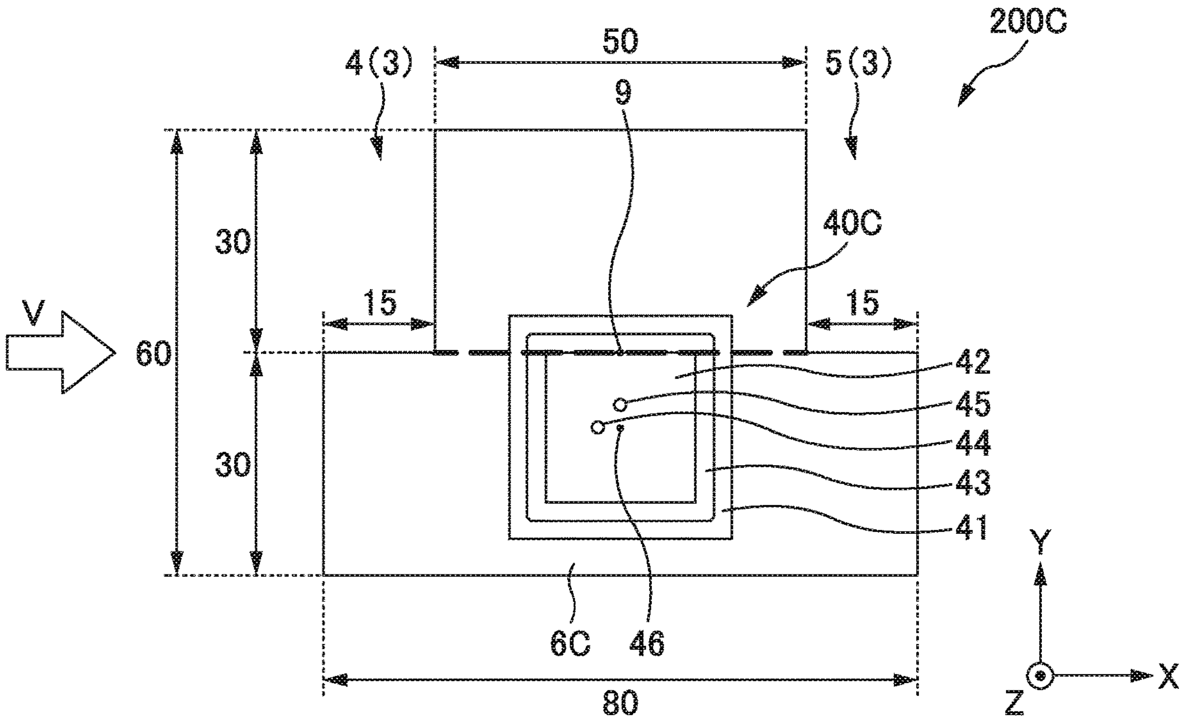
FIG. 21A is an explanatory diagram illustrating an antenna device 200C of a third comparative example.
Figure 21B:
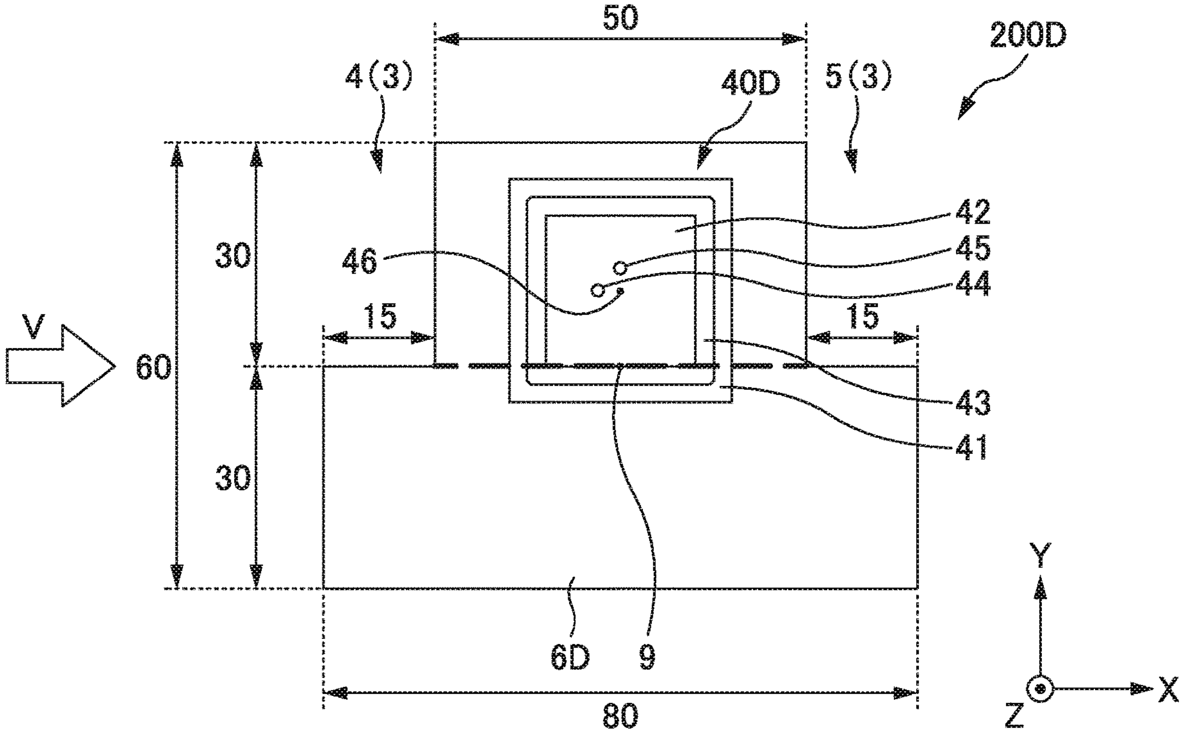
FIG. 21B is an explanatory diagram illustrating an antenna device 200D of a first modification example.

FIG. 21A is an explanatory diagram illustrating an antenna device 200C of a third comparative example. FIG. 21B is an explanatory diagram illustrating an antenna device 200D of a first modification example.

In the antenna device 200C of the third comparative example, the third antenna 40C is located at a position that does not overlap with the cutout portion 3 in side view when viewed in the X direction (arrow V as an example of the direction), as illustrated in FIG. 21A. Here, the phrase "the third antenna 40C is located at a position that does not overlap with the cutout portion 3" indicates the end part on the +Y direction side of the radiating element 42 of the third antenna 40C is located on the −Y direction side relative to the maximum vertical cutout position (position of the dashed line) of the cutout portion 3.

In the antenna device 200D of the first modification example, the third antenna 40D is located at a position that lies in the cutout portion 3 in side view when viewed in the X direction (arrow V as an example of the direction), as illustrated in FIG. 21B. Here, the phrase "the third antenna 40D is located at a position that lies in the cutout portion 3" indicates the end part on the −Y direction side of the radiating element 42 of the third antenna 40D is located at the maximum vertical cutout position of the cutout portion 3 or located on the +Y direction side relative to the maximum vertical cutout position of the cutout portion 3. That is, it indicates that the entire radiating element 42 of the third antenna 40D is located at a position that lies in the cutout portion 3, in side view when viewed in the X direction.

Note that in the antenna device 200 in an embodiment of the present disclosure, the third antenna 40 is located at a position that overlaps with the cutout portion 3 in side view when viewed in the X direction (arrow V as an example of the direction), as illustrated in FIG. 19B. Here, the phrase "the third antenna 40 is located at a position that overlaps with the cutout portion 3" indicates the end part on the +Y direction side of the radiating element 42 of the third antenna 40 is located on the +Y direction side relative to the maximum vertical cutout position of the cutout portion 3, and the end part on the −Y direction side of the radiating element 42 of the third antenna 40 is located on the −Y direction side relative to the maximum vertical cutout position of the cutout portion 30.

<Frequency Characteristics>

Figure 22A:
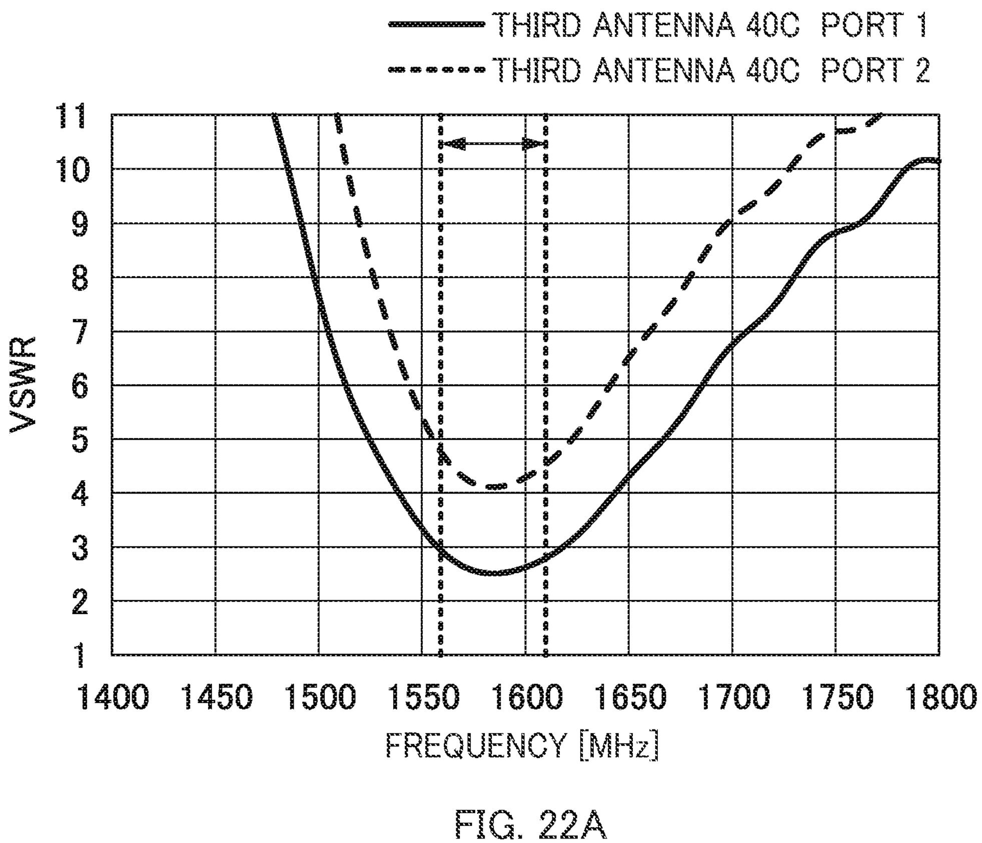
FIG. 22A is a diagram illustrating the frequency characteristics of the VSWRs by port of a third antenna 40C.
Figure 22B:
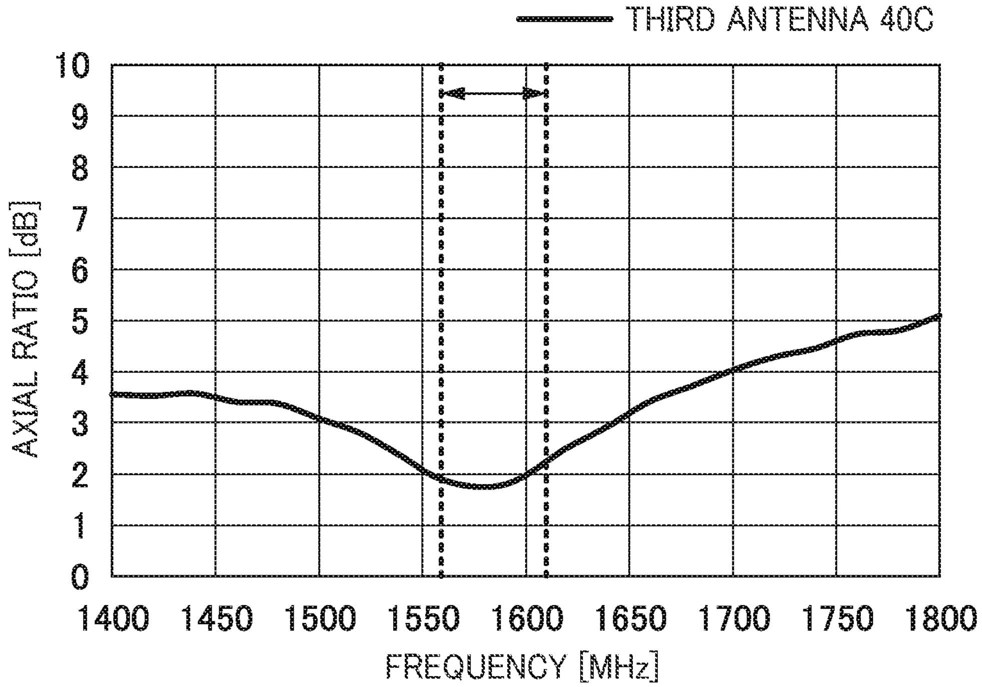
FIG. 22B is a diagram illustrating the frequency characteristics of the axial ratio of a third antenna 40C.
Figure 23A:
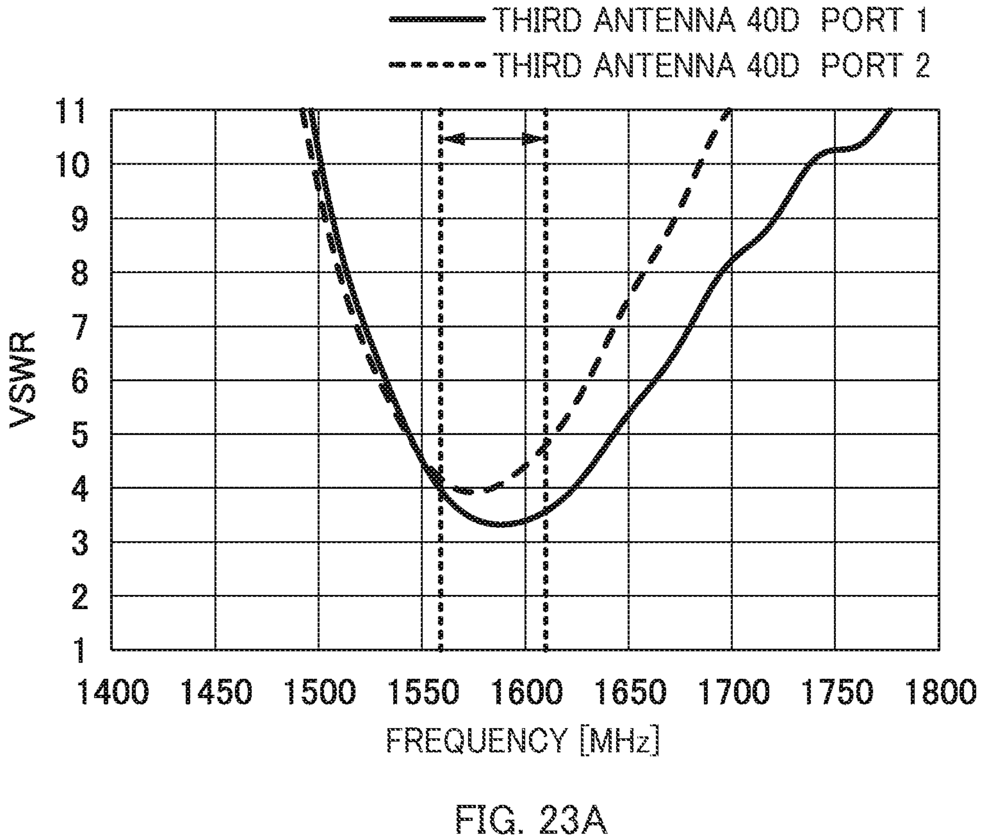
FIG. 23A is a diagram illustrating the frequency characteristics of the VSWRs by port of a third antenna 40D.
Figure 23B:
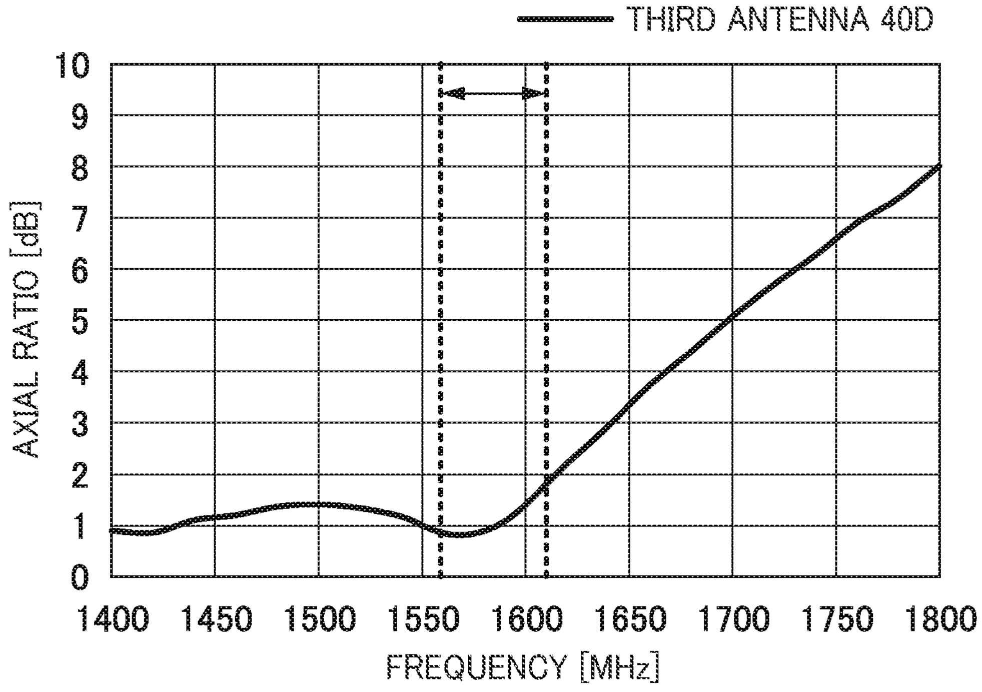
FIG. 23B is a diagram illustrating the frequency characteristics of the axial ratio of a third antenna 40D.

FIG. 22A is a diagram illustrating the frequency characteristics of the VSWRs by port of the third antenna 40C. FIG. 22B is a diagram illustrating the frequency characteristics of the axial ratio of the third antenna 40C. FIG. 23A is a diagram illustrating the frequency characteristics of the VSWRs by port of the third antenna 40D. FIG. 23B is a diagram illustrating the frequency characteristics of the axial ratio of the third antenna 40D. In each of FIGS. 22A to 23B, the dashed line represents the range of the frequency band of radio waves supported by the third antenna (the third antenna 40C and the third antenna 40D).

In FIGS. 22A and 23A, the horizontal axis represents frequency and the vertical axis represents voltage standing wave ratio (VSWR). In the third antennas (the third antenna 40C and the third antenna 40D), the results of the feeding portion 44 on the port 1 side are given by a solid line, and the results of the feeding portion 45 on the port 2 side are given by a dashed line. Further, in FIGS. 22B and 23B, the horizontal axis represents frequency, and the vertical axis represents axial ratio.

As illustrated in FIG. 22A, in the antenna device 200C of the third comparative example, the characteristics of the VSWR are significantly different between the ports (port 1 and port 2) of the third antenna 40C. Accordingly, the radiation efficiency is significantly different between the ports of the third antenna 40C, and as illustrated in FIG. 22B, the axial ratio of the third antenna 40C is significantly worse than the axial ratio of the third antenna 40 in an embodiment of the present disclosure.

On the other hand, as illustrated in FIG. 23A, in the antenna device 200D of the first modification example, the difference in characteristics of the VSWR between the ports (port 1 and port 2) of the third antenna 40D decreases as compared to the case of the third antenna 40C in the third comparison example illustrated in FIG. 22A described above. Accordingly, the difference in the radiation efficiency between the ports of the third antenna 40D also decreases, and as illustrated in FIG. 23B, the axial ratio of the third antenna 40D is greatly improved as compared with the case of the third antenna 40C in the third comparative example illustrated in FIG. 22A described above.

From the above, in order to improve the axial ratio of the third antenna, it is desirable to employ such aspects as the antenna device 200 in an embodiment of the present disclosure illustrated in FIG. 19A and the antenna device 200D in the first modification example illustrated in FIG. 21B. That is, preferably, the cutout portion 3 is formed so as to overlap at least a part of the third antenna, in side view when viewed in the X direction. More preferably, the center 46 of the third antenna is shifted on the side of the long side of the quadrilateral region Q on which the cutout portion 3 is formed, relative to the center 9 of the quadrilateral region Q. That is, the center 46 of the third antenna is shifted on the +Y direction side relative to the center 9 of the quadrilateral region Q.

<<Forming Ground Portion into Quadrilateral>>

Figure 24A:
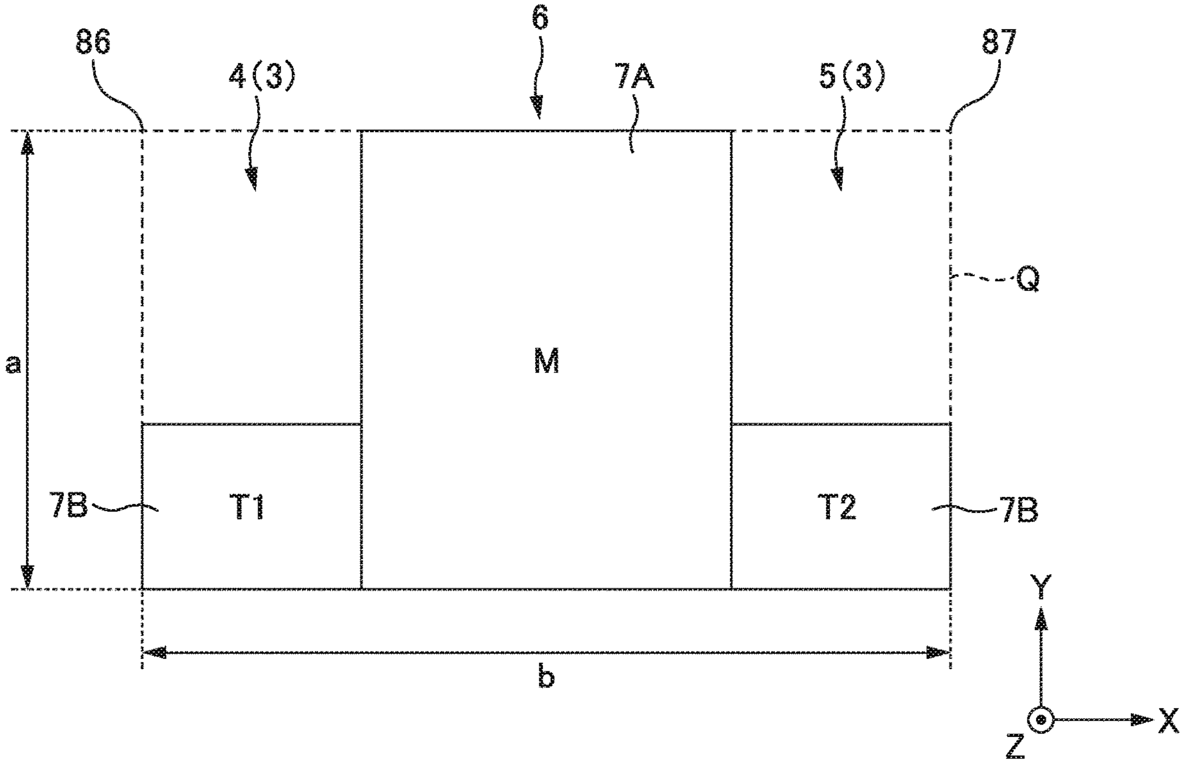
FIG. 24A is a schematic diagram of a ground portion 6.
Figure 24B:
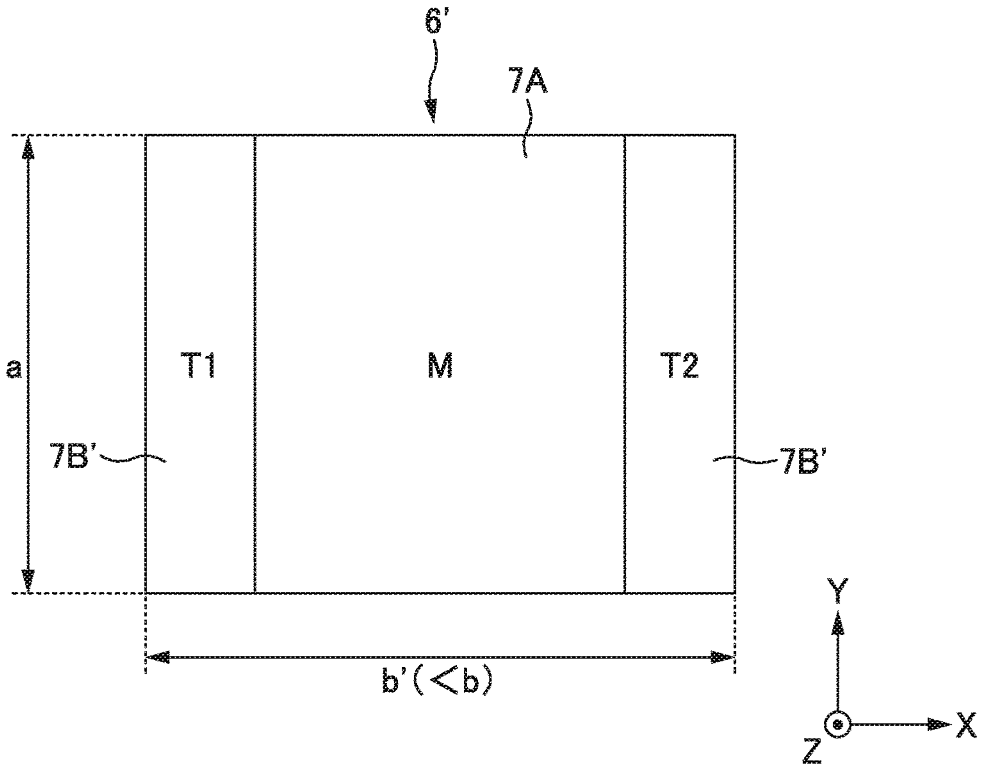
FIG. 24B is a schematic diagram of a region 6' obtained by forming a ground portion 6 into a quadrilateral.

FIG. 24A is a schematic diagram of the ground portion 6. FIG. 24B is a schematic diagram of a region 6' obtained by forming the ground portion 6 into a quadrilateral.

The ground portion 6 used in the following description has a shape that is similar to that of the ground portion 6 in an embodiment of the present disclosure. That is, as illustrated in FIG. 24A, the ground portion 6 has a shape in which the cutout portion 3 is formed in the quadrilateral region Q in plan view when viewed in the −Z direction (downward direction), as illustrated in FIG. 24A. Further, the ground portion 6 has an inverted T shape, for example. The external form of the quadrilateral region Q is a rectangle in which the vertical length is shorter than the lateral length.

As in the ground portion 6 in an embodiment of the present disclosure, the cutout portion 3 formed in the quadrilateral region Q includes the first cutout portion 4 located at the first corner 86 of the quadrilateral region Q and the second cutout portion 5 located at the second corner 87 of the quadrilateral region Q. Accordingly, the external form of the ground portion 6 has a shape including a protruding region 7B on each end side of a main region 7A in the X direction, as illustrated in FIG. 24A.

After careful consideration, the present inventor found that when the shape of the ground portion 6 having such an external form as described above is formed into a quadrilateral approaches a square, the axial ratio of the third antenna located at the ground portion 6 is improved.

Here, the phrase "forming the ground portion 6 into a quadrilateral" indicates, as illustrated in FIGS. 24A and 24B, the protruding regions 7B of the ground portion 6 respectively formed on the two end side thereof in the X direction are evened without changing the area of the protruding regions 7B, such that the entire region is transformed into a quadrilateral. That is, the ground portion 6 is transformed into a quadrilateral region 6' illustrated in FIG. 24B such that the area of each of the protruding regions 7B is equal to the area of each of the regions 7B' illustrated in FIG. 24B. The present inventor considers that when this region 6' approaches a square, the axial ratio of the third antenna disposed at the ground portion 6 will be improved.

Here, as illustrated in FIG. 24A, a is defined as the vertical length (short side) of the quadrilateral region Q of the ground portion 6, and b is defined as the lateral length (long side) of the quadrilateral region Q. In this case, as illustrated in FIG. 24B, in the region 6' obtained by forming the ground portion 6 into a quadrilateral, the vertical length results in a, which is the same as the vertical length (short side) of the quadrilateral region Q, and the lateral length results in b' which is smaller than the lateral length (long side) b of the quadrilateral region Q (b'<b).

As illustrated in FIG. 24A, the area of the ground portion 6 is obtained by adding the area (M) of the main region 7A and the areas (T1+T2) of the protruding regions 7B (M+T1+T2). Further, when the area 6' obtained by forming the ground portion 6 into a quadrilateral is a square, then b'=a, and thus the area of the region 6' formed into a square results in a. Accordingly, when the area (M+T1+T2) of the ground portion 6 approaches the area ($a^2$) of the region 6' formed into a square, the axial ratio of the third antenna disposed at the ground portion 6 is improved.

To paraphrase the above argument, the area of the ground portion 6 can also be obtained by subtracting the area of the cutout portion 3 of the ground portion 6 from the area (a×b) of the quadrilateral region Q, as illustrated in FIG. 24A. Here, the area of the ground portion 6 can be expressed as ab-S, where S is the area of the cutout portion 3. Accordingly, when the area (ab -S) of the ground portion 6 approaches the area ($a^2$) of the region 6' formed into a square, the axial ratio of the third antenna disposed at the ground portion 6 is improved.

From the above, it seems that the axial ratio of the third antenna disposed at the ground portion 6 is improved, by forming the cutout portion 3 so as to satisfy the following Formula 1.

$$Ab - S = a^2 \qquad \text{(Formula 1)}$$

Further, when Formula 1 is solved for the area S of the cutout portion 3, the following Formula 2 is obtained.

$$S = ab - a^2 \qquad \text{(Formula 2)}$$

Next, a model in which the external form of the first cutout portion 4 in the quadrilateral region Q (and the external form of the second cutout portion 5 in the quadrilateral region Q) is a quadrilateral, is used to verify an aspect in which the axial ratio of the third antenna can be improved the most, with the areas of the first cutout portion 4 and the second cutout portion 5 being variously changed.

<<When Only Lateral Length of Cutout Portion 3 is Varied>>

The following describes the case in which only the lateral length of each of the first cutout portion 4 and the second cutout portion 5 is varied, with the vertical length of each of the first cutout portion 4 and the second cutout portion 5 being fixed.

Overview

Figure 25A:
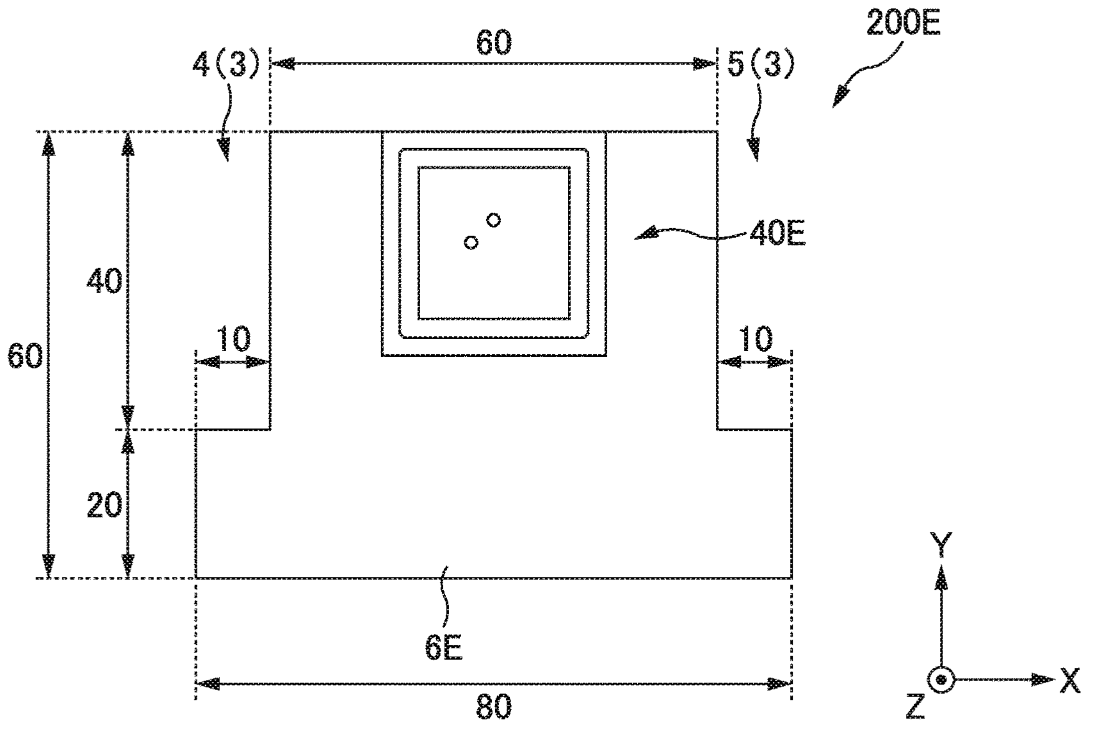
FIG. 25A is an explanatory diagram illustrating an antenna device 200E of a second modification example.
Figure 25B:
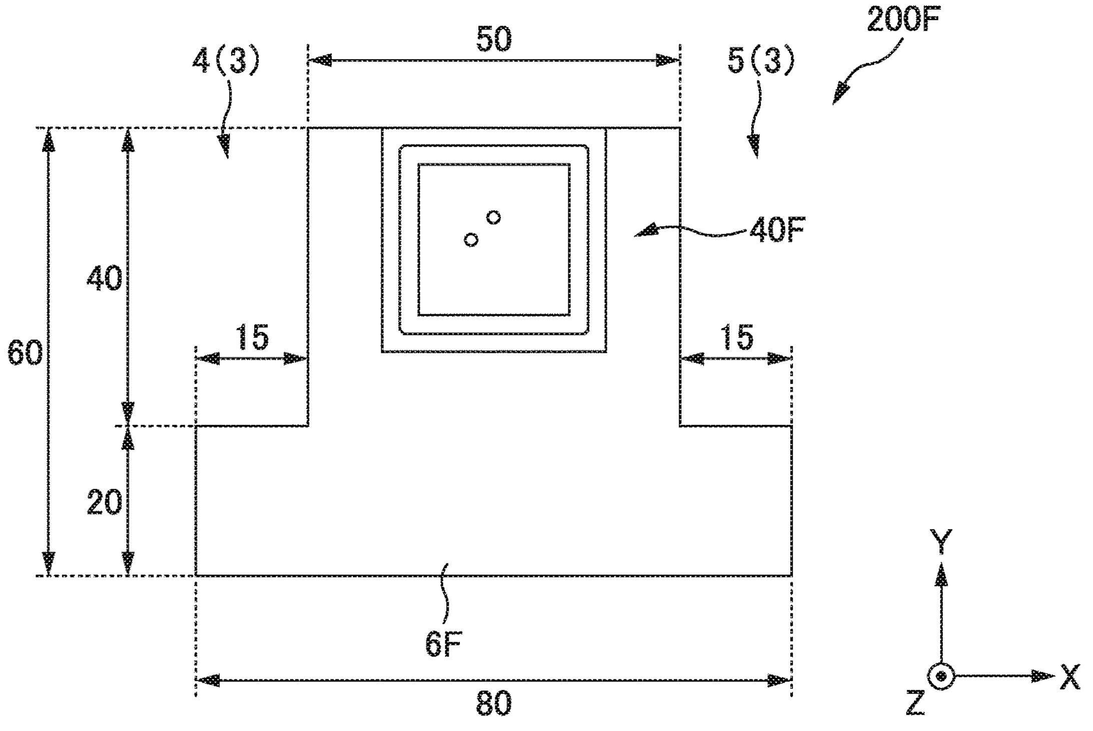
FIG. 25B is an explanatory diagram illustrating an antenna device 200F of a third modification example.

FIG. 25A is an explanatory diagram illustrating an antenna device 200E of a second modification example. FIG. 25B is an explanatory diagram illustrating an antenna device 200F of a third modification example.

In this verification, the frequency characteristics of the VSWRs by port of the third antenna and the frequency characteristics of the axial ratio of the third antenna are simulated, while the lateral length of each of the first cutout portion 4 and the second cutout portion 5 is varied in the range of 5 mm to 25 mm, with the vertical length of each of the first cutout portion 4 and the second cutout portion 5 being fixed at 40 mm.

Two noteworthy examples are illustrated in FIGS. 25A and 25B. As illustrated in FIG. 25A, in the antenna device 200E of the second modification example, the lateral length of each of the first cutout portion 4 and the second cutout portion 5 formed in the ground portion 6E is 10 mm. As illustrated in FIG. 25B, in the antenna device 200F of the third modification example, the lateral length of each of the first cutout portion 4 and the second cutout portion 5 formed in the ground portion 6F is 15 mm.

Here, when quadrilateral region Q has a vertical length a=60 mm and a lateral length b=80 mm, the area S of the cutout portion 3 corresponding to the ground region that is formed into a quadrilateral that is a square, is 1200 mm-when using Formula 1 described above. It can be seen that the ground portion corresponding to the area of the cutout portion 3 being 1200 $mm^2$ is the ground portion 6F in the third modification example illustrated in FIG. 25B out of the two examples described above.

<Frequency Characteristics>

Figure 26A:
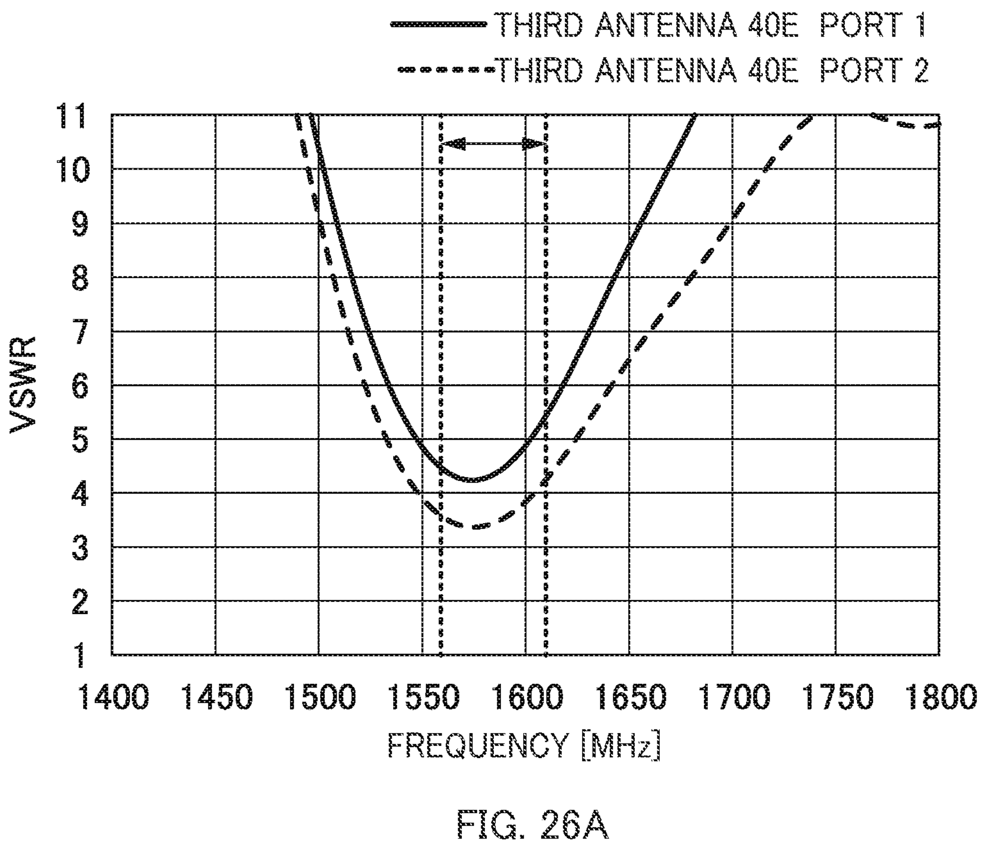
FIG. 26A is a diagram illustrating the frequency characteristics of the VSWRs by port of a third antenna 40E.
Figure 26B:
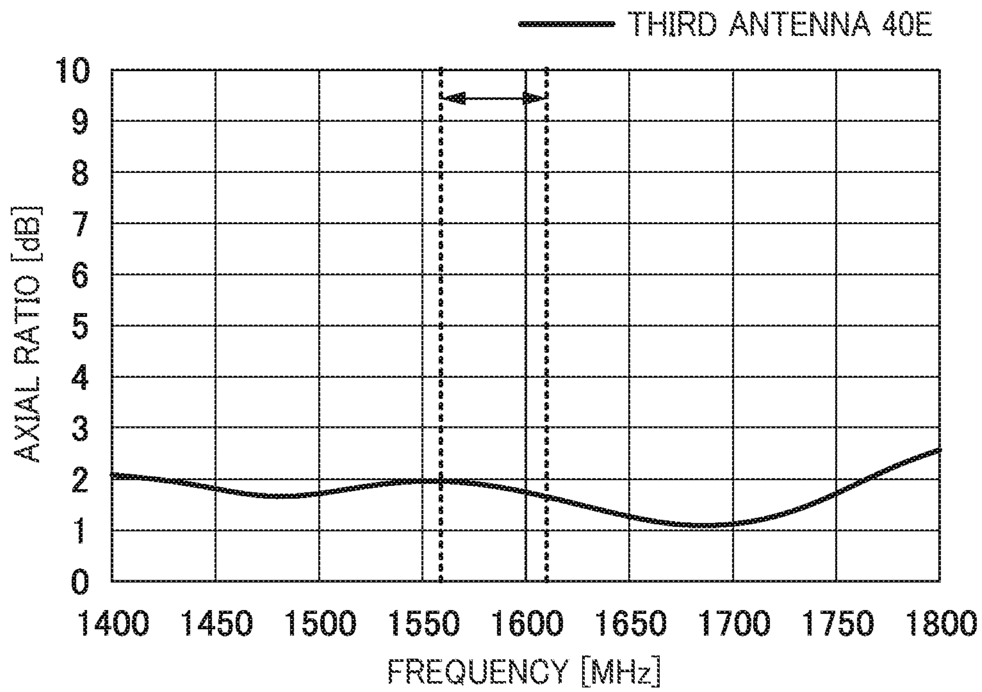
FIG. 26B is a diagram illustrating the frequency characteristics of the axial ratio of a third antenna 40E.
Figure 27A:
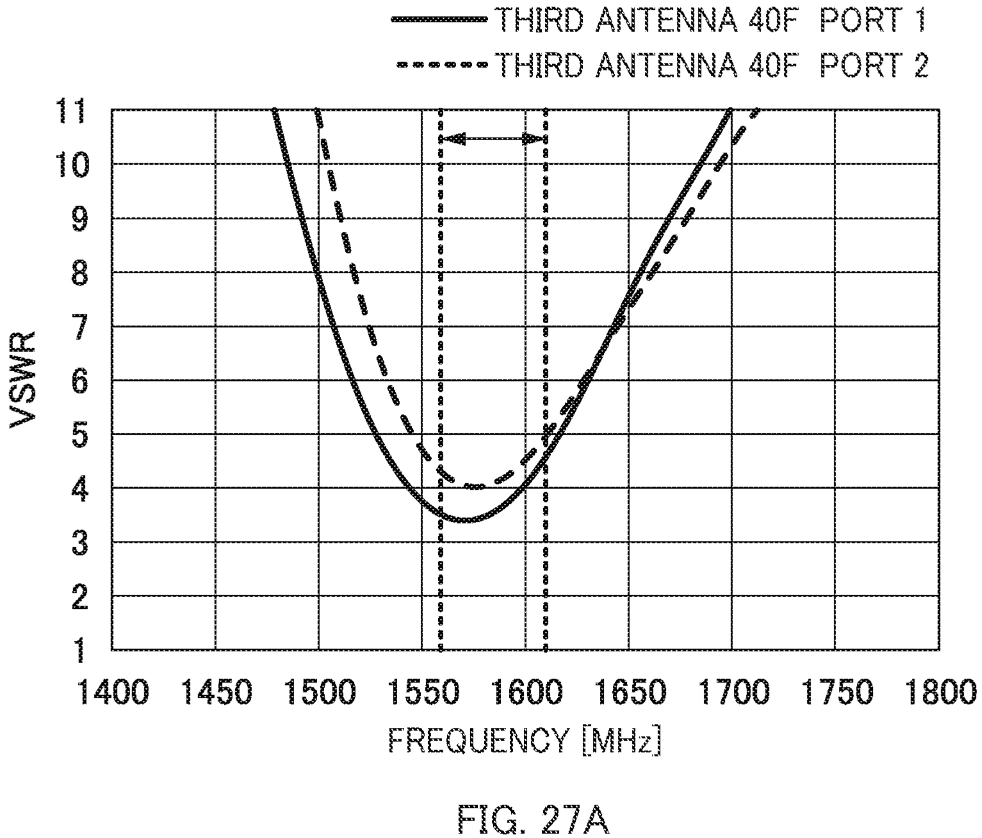
FIG. 27A is a diagram illustrating the frequency characteristics of the VSWRs by port of a third antenna 40F.
Figure 27B:
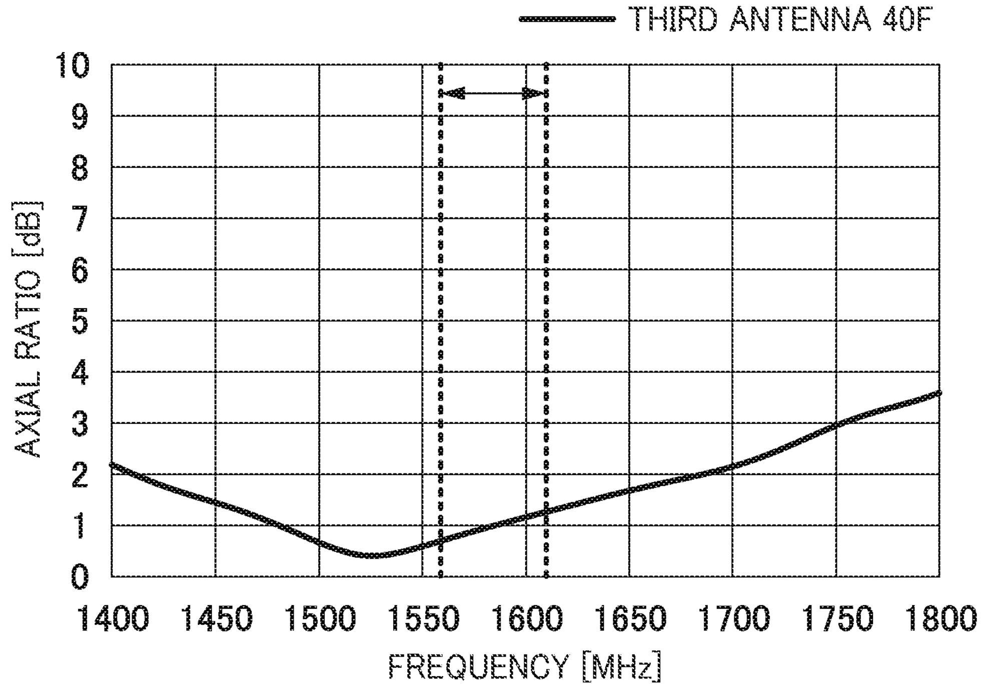
FIG. 27B is a diagram illustrating the frequency characteristics of the axial ratio of a third antenna 40F.

FIG. 26A is a diagram illustrating the frequency characteristics of the VSWRs by port of a third antenna 40E. FIG. 26B is a diagram illustrating the frequency characteristics of the axial ratio of the third antenna 40E. FIG. 27A is a diagram illustrating the frequency characteristics of the VSWRs by port of a third antenna 40F. FIG. 27B is a diagram illustrating the frequency characteristics of the axial ratio of the third antenna 40F. In each of FIGS. 26A to 27B, the dashed line represents the range of the frequency band of radio waves supported by the third antenna.

In FIGS. 26A and 27A, the horizontal axis represents frequency and the vertical axis represents voltage standing wave ratio (VSWR). In the third antenna, the results of the feeding portion 44 on the port 1 side are given by a solid line, and the results of the feeding portion 45 on the port 2 side are given by a dashed line. Further, in FIGS. 26B and 27B, the horizontal axis represents frequency, and the vertical axis represents axial ratio.

In this verification, when the lateral length of each of the first cutout portion 4 and the second cutout portion 5 is varied in the range from 5 mm to 25 mm, the characteristics of the VSWR on the port 2 side were better than the characteristics of the VSWR on the port 1 side, when the length is in the range from 5 mm to 10 mm (the ground portion 6E in the second modification example), although part thereof is not illustrated. Further, the characteristics of the VSWR on the port 1 side were better than the characteristics of the VSWR on the port 2 side, when the length is in the range from 15 mm (the ground portion 6E in third modification example) to 25 mm.

The above described points can be seen also from that the characteristics of the VSWR on the port 2 side were better than the characteristics of the VSWR on the port 1 side, when the length is 10 mm (the ground portion 6E in the second modification example), as illustrated in FIG. 26A. Further, it can be seen also from that the characteristics of the VSWR on the port 1 side were better than the characteristics of the VSWR on the port 2 side, when the length is 15 mm (the ground portion 6E in the third modification example), as illustrated in FIG. 27A.

From the above, in this verification, it can be seen that the characteristics of the VSWR on the port 2 side and the characteristics of the VSWR on the port 1 side are reversed in the range in which the length is from 10 mm to 15 mm. That is, it can be seen that in the range in which the length is from 10 mm to 15 mm, the characteristics of the VSWR are substantially the same between the ports (port 1 and port 2) of the third antenna, and the axial ratio of the third antenna is good.

Here, as described above, when also considering that an example in which the region obtained by forming the ground portion into a quadrilateral is a square corresponds to the third modification example in which the length is 15 mm, then the area of the cutout portion 3 (the first cutout portion 4 and the second cutout portion 5) is desirably less than or equal to ab-$a^2$, where the region obtained by forming the ground portion into a quadrilateral is a square, obtained from Equation 2 described above. Further, it is desirable that the area of the cutout portion 3 (the first cutout portion 4 and the second cutout portion 5) is (ab-$a^2$)/2 or more.

<<When Only Vertical Length of Cutout Portion 3 is Varied>>

Next, a description will be given of the case in which only the vertical length of each of the first cutout portion 4 and the second cutout portion 5 are varied, with the lateral length of each of the first cutout portion 4 and the second cutout portion 5 being fixed.

Overview

Figure 28A:
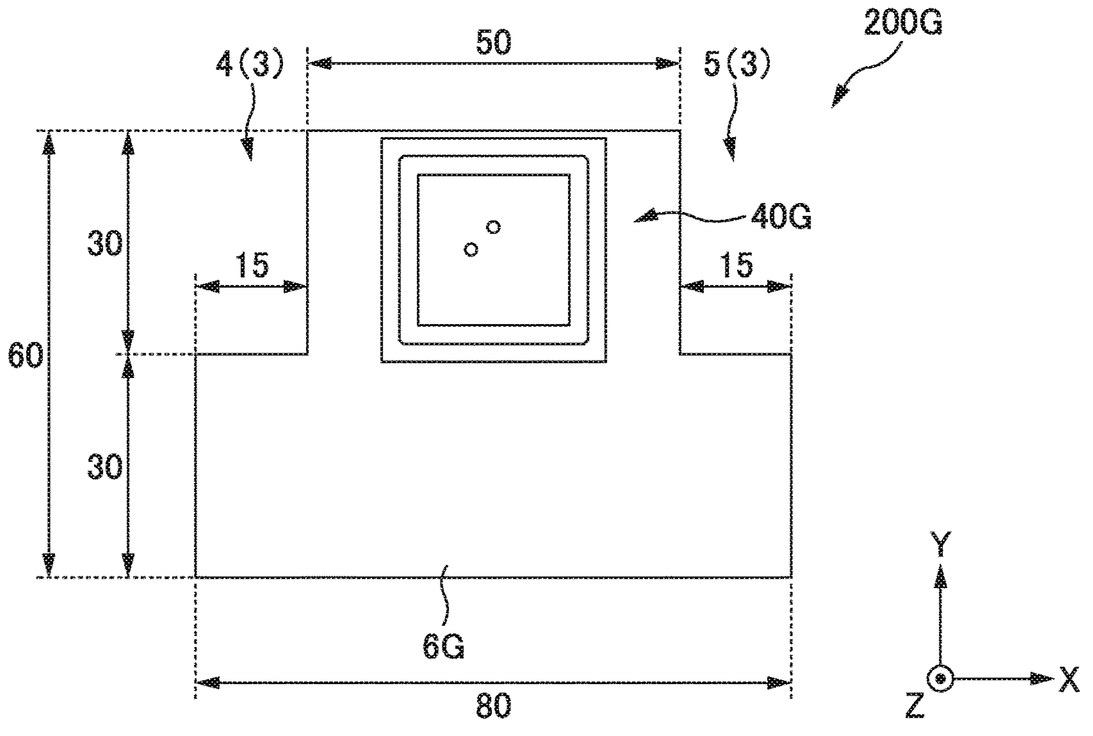
FIG. 28A is an explanatory diagram illustrating an antenna device 200G of a fourth modification example.
Figure 28B:
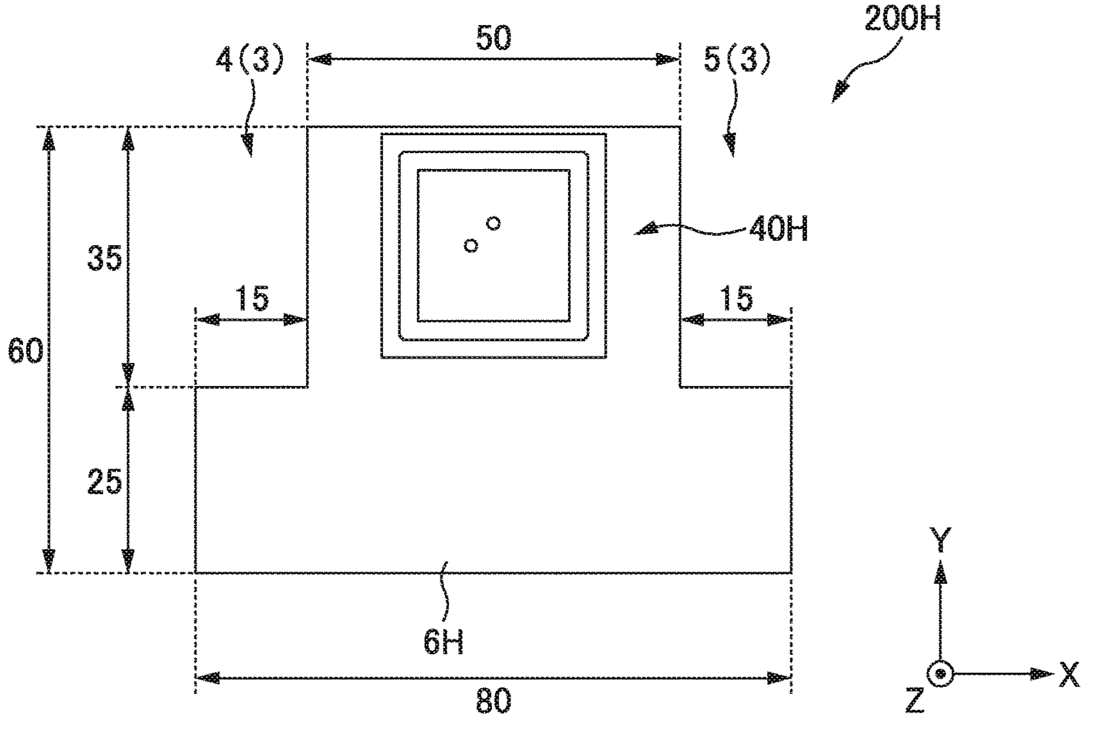
FIG. 28B is an explanatory diagram illustrating an antenna device 200H of a fifth modification example.
Figure 28C:
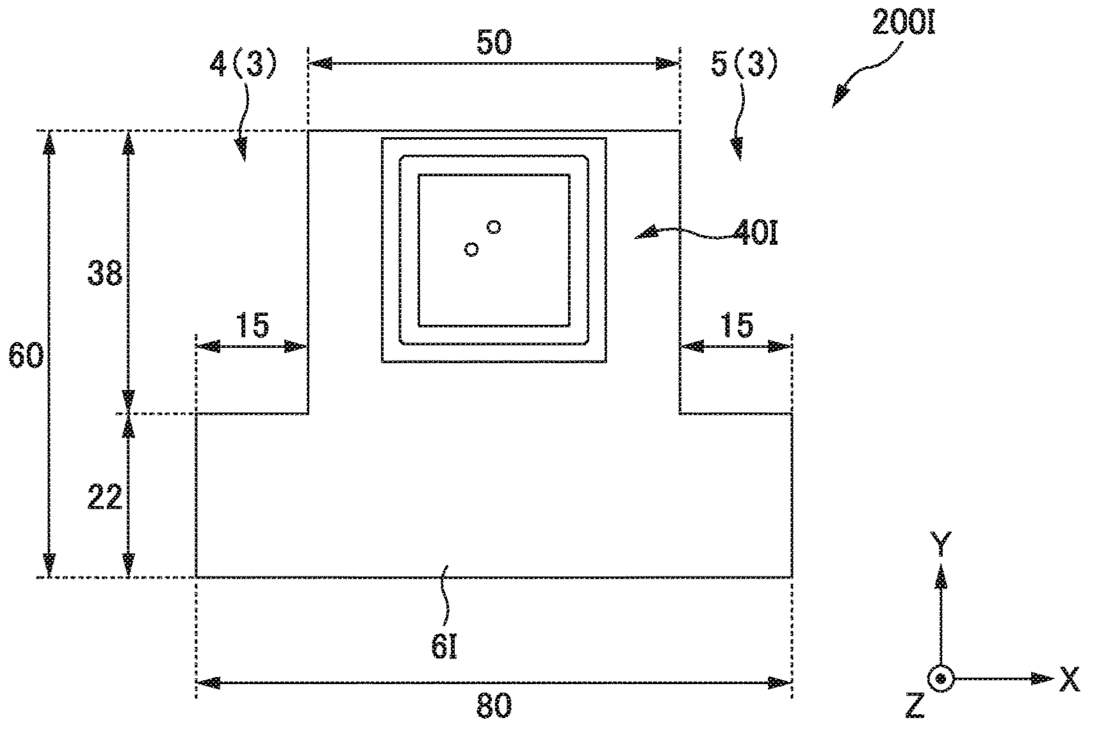
FIG. 28C is an explanatory diagram illustrating an antenna device 2001 of a sixth modification example.
Figure 28D:
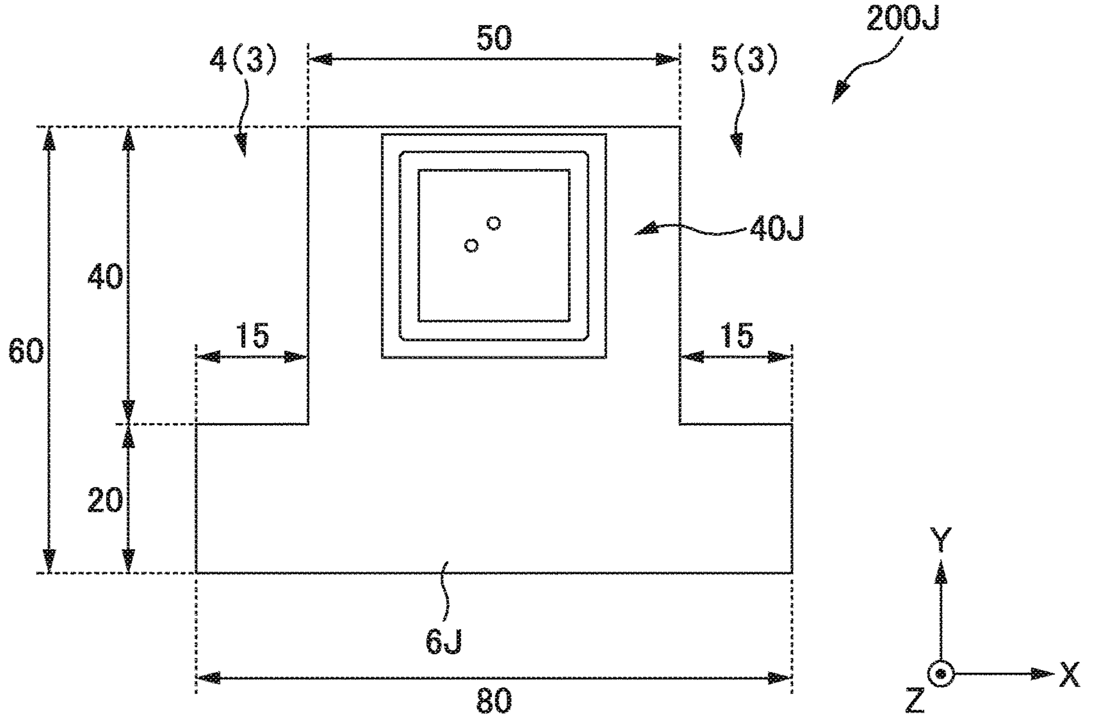
FIG. 28D is an explanatory diagram illustrating an antenna device 200J of a seventh modification example.

FIG. 28A is an explanatory diagram illustrating an antenna device 200G of a fourth modification example. FIG. 28B is an explanatory diagram illustrating an antenna device 200H of a fifth modification example. FIG. 28C is an explanatory diagram illustrating an antenna device 200I of a sixth modification example. FIG. 28D is an explanatory diagram illustrating an antenna device 200J of a seventh modification example.

In this verification, the frequency characteristics of the VSWRs by port of the third antenna and the frequency characteristics of the axial ratio of the third antenna are simulated, while the vertical length of each of the first cutout portion 4 and the second cutout portion 5 is varied in the range of 10 mm to 50 mm, with the lateral length of each of the first cutout portion 4 and the second cutout portion 5 being fixed at 15 mm.

Four noteworthy examples are illustrated in FIGS. 28A and 28D. As illustrated in FIG. 28A, in the antenna device 200G of the fourth modification example, the vertical length of each of the first cutout portion 4 and the second cutout portion 5 formed in a ground portion 6G is 30 mm. As illustrated in FIG. 28B, in the antenna device 200H of the fifth modification example, the vertical length of each of the first cutout portion 4 and the second cutout portion 5 formed in a ground portion 6H is 35 mm. As illustrated in FIG. 28C, in the antenna device 2001 of the sixth modification example, the vertical length of each of the first cutout portion 4 and the second cutout portion 5 formed in a ground portion 61 is 38 mm. As illustrated in FIG. 28D, in the antenna device 200J of the seventh modification example, the vertical length of each of the first cutout portion 4 and the second cutout portion 5 formed in a ground portion 6J is 40 mm.

Here, when quadrilateral region Q has a vertical length a=60 mm and a lateral length b=80 mm, the area S of the cutout portion 3 when the ground region formed into a quadrilateral that is a square, is 1200 mm-when using Formula 1 described above. It can be seen that the ground portion when the area of the cutout portion 3 is 1200 $mm^2$ corresponds to the ground portion 6J in the seventh modification example illustrated in FIG. 28D out of the four examples described above.

<Frequency Characteristics>

Figure 29A:
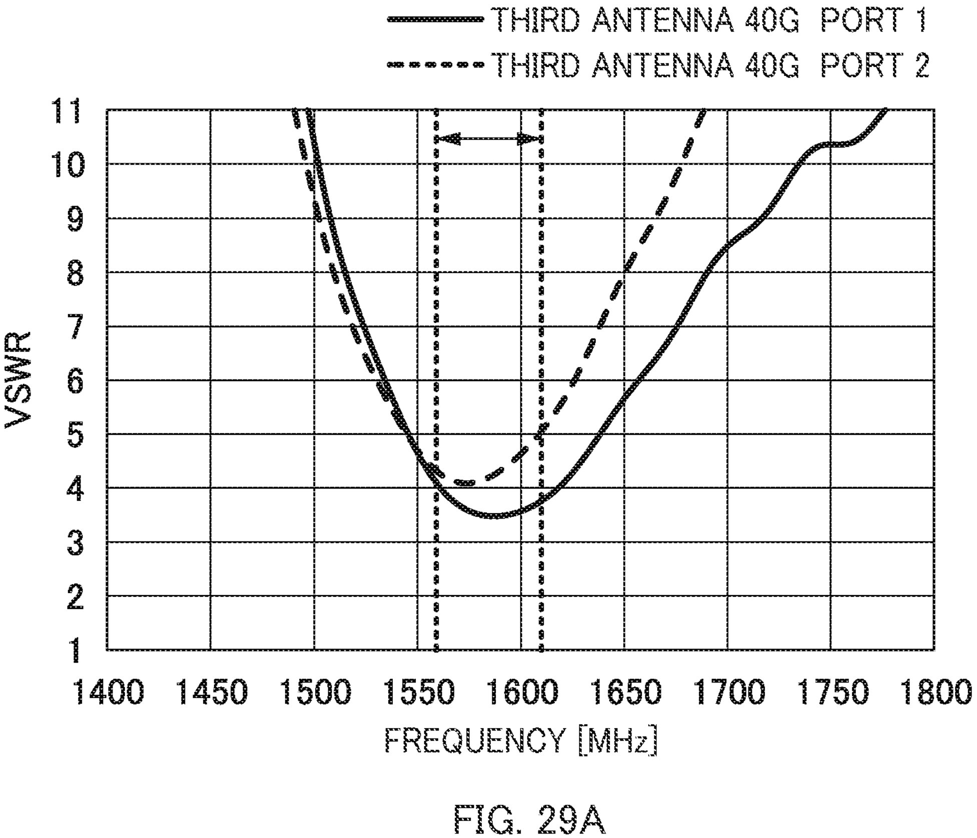
FIG. 29A is a diagram illustrating the frequency characteristics of the VSWRs by port of a third antenna 40G.
Figure 29B:
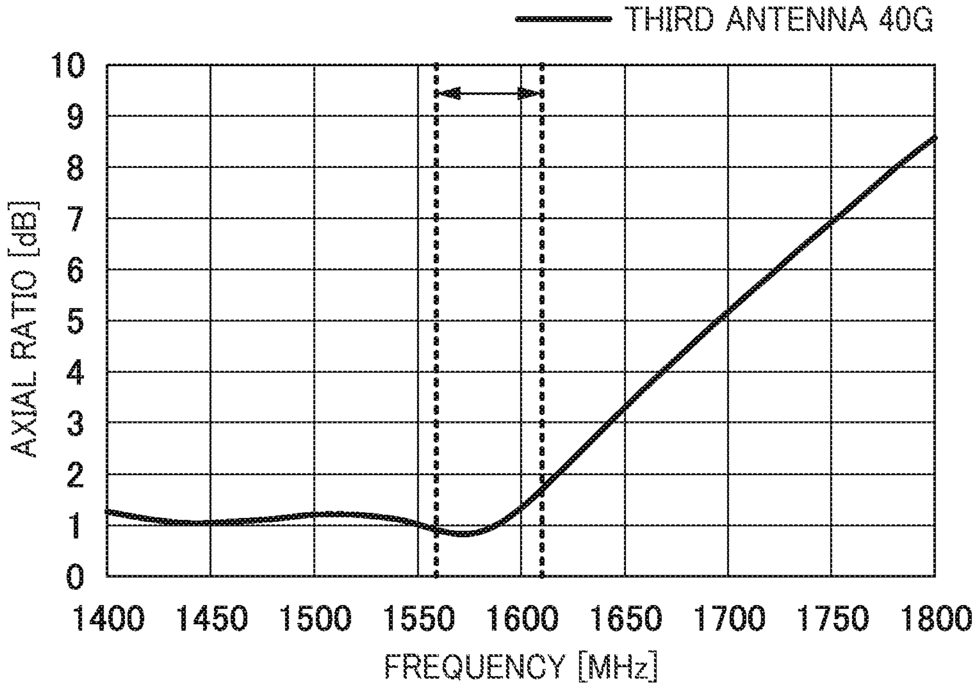
FIG. 29B is a diagram illustrating the frequency characteristics of the axial ratio of a third antenna 40G.
Figure 30A:
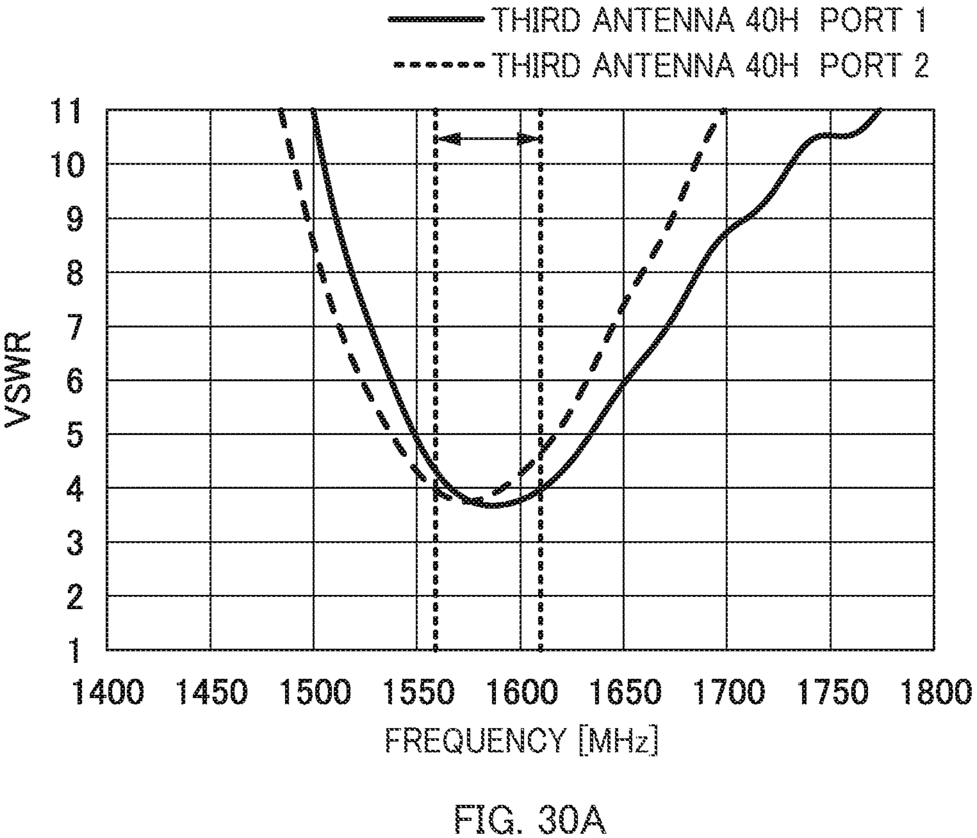
FIG. 30A is a diagram illustrating the frequency characteristics of the VSWRs by port of a third antenna 40H.
Figure 30B:
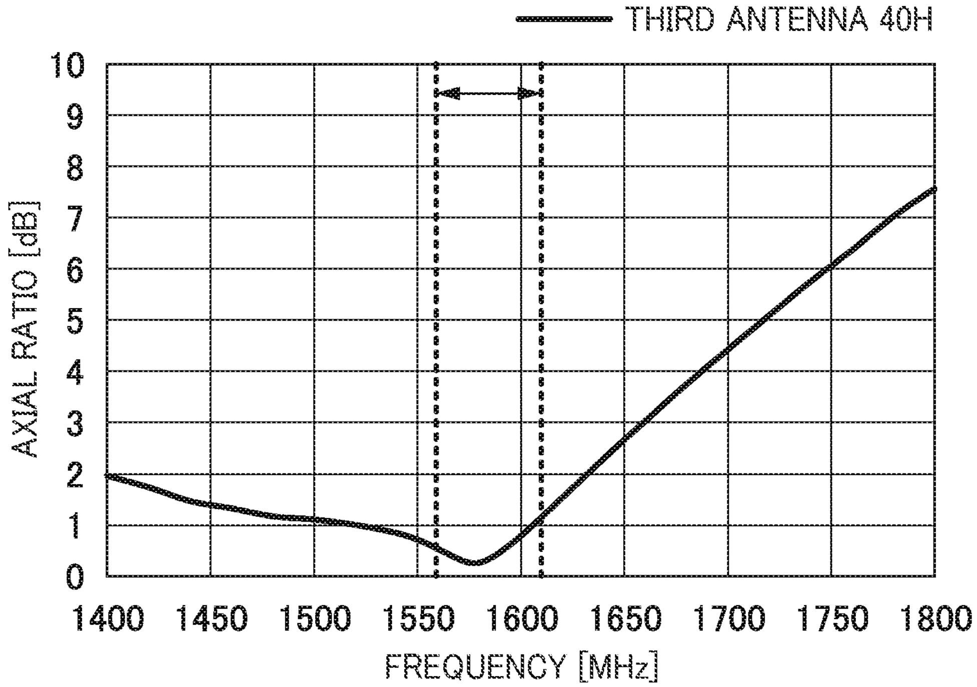
FIG. 30B is a diagram illustrating the frequency characteristics of the axial ratio of a third antenna 40H.

FIG. 29A is a diagram illustrating the frequency characteristics of the VSWRs by port of a third antenna 40G. FIG. 29B is a diagram illustrating the frequency characteristics of the axial ratio of the third antenna 40G. FIG. 30A is a diagram illustrating the frequency characteristics of the VSWRs by port of a third antenna 40H. FIG. 30B is a diagram illustrating the frequency characteristics of the axial ratio of the third antenna 40H. In each of FIGS. 29A to 30B, the dashed line represents the range of the frequency band of radio waves supported by the third antenna.

Figure 31A:
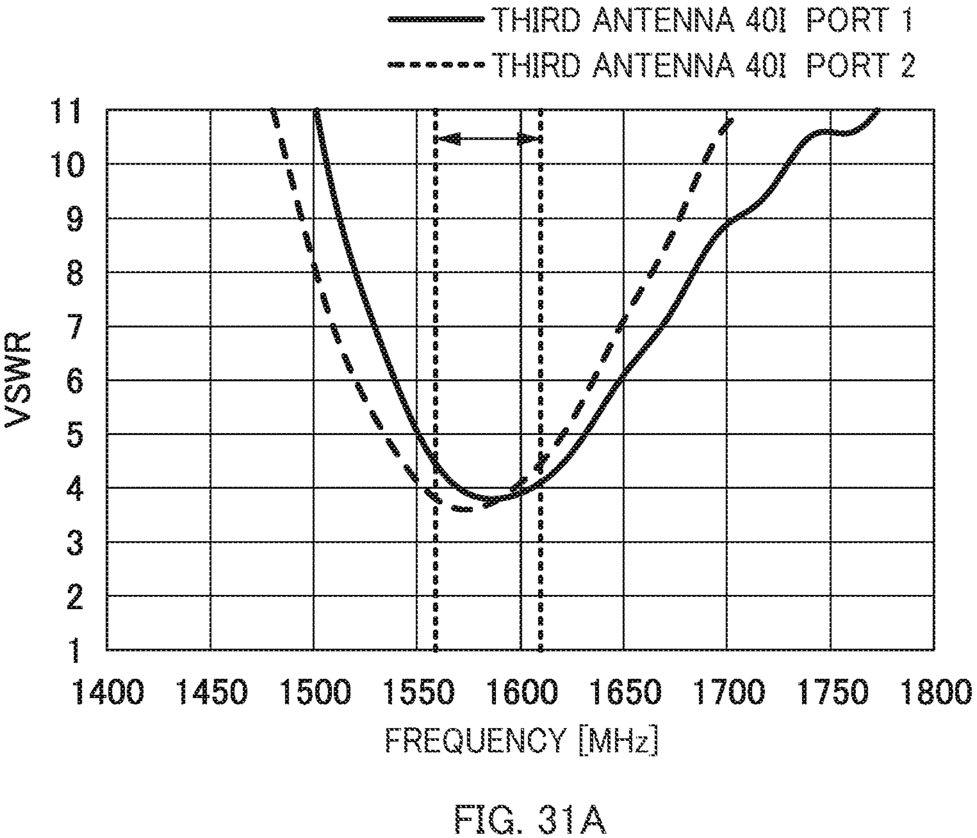
FIG. 31A is a diagram illustrating the frequency characteristics of the VSWRs by port of a third antenna 40I.
Figure 31B:
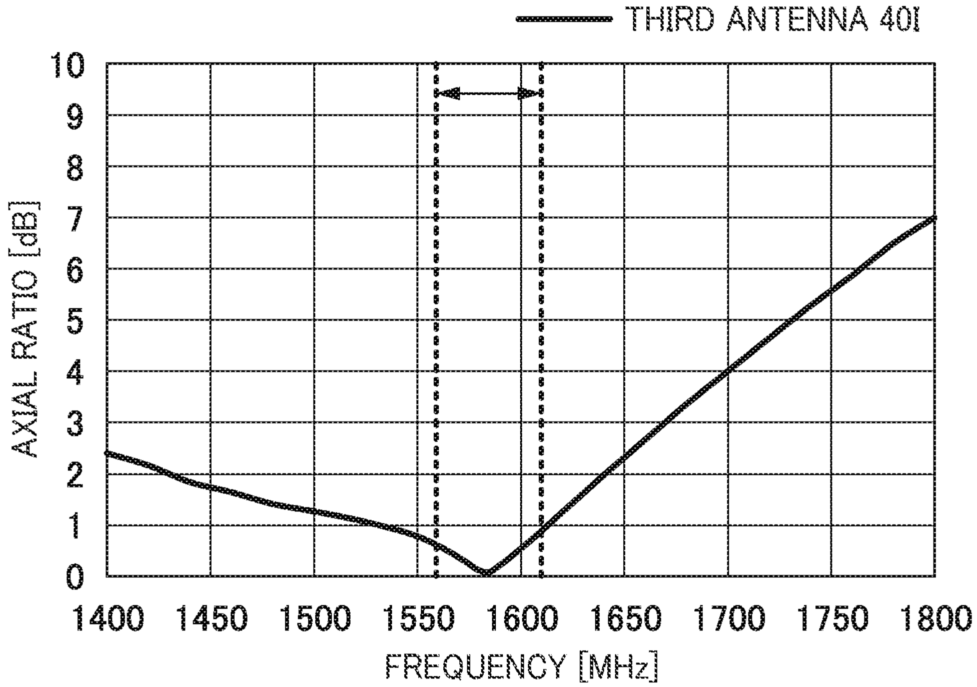
FIG. 31B is a diagram illustrating the frequency characteristics of the axial ratio of a third antenna 40I.
Figure 32A:
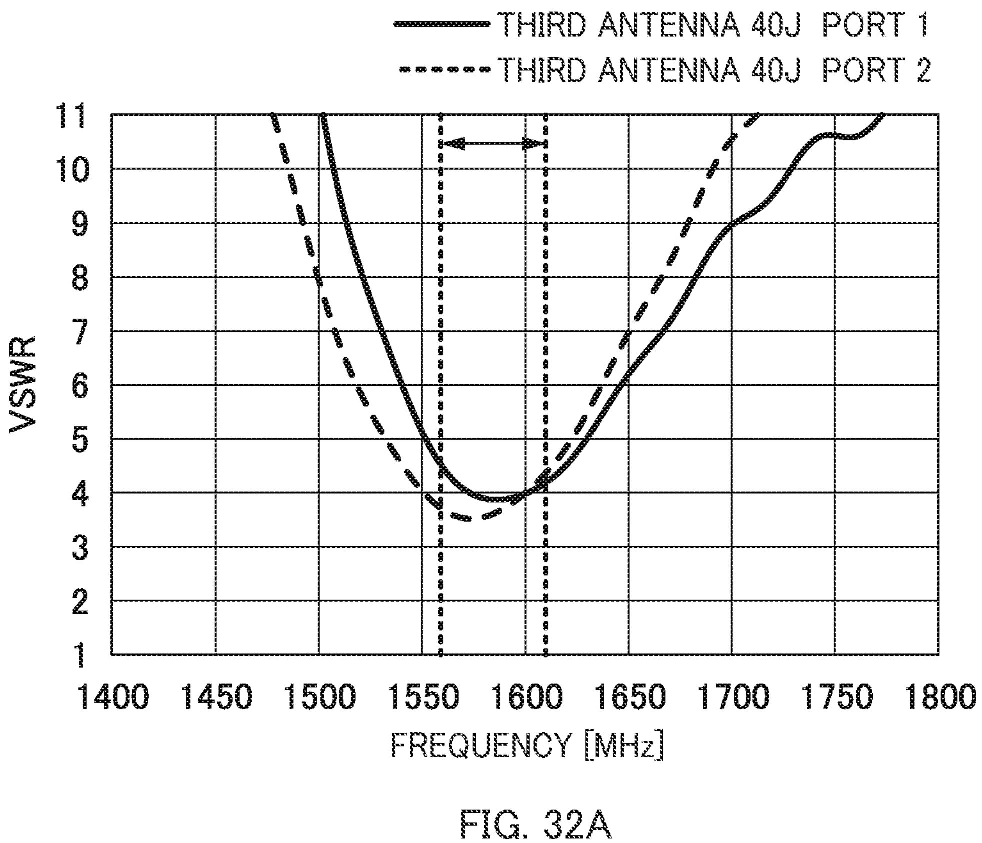
FIG. 32A is a diagram illustrating the frequency characteristics of the VSWRs by port of a third antenna 40J.
Figure 32B:
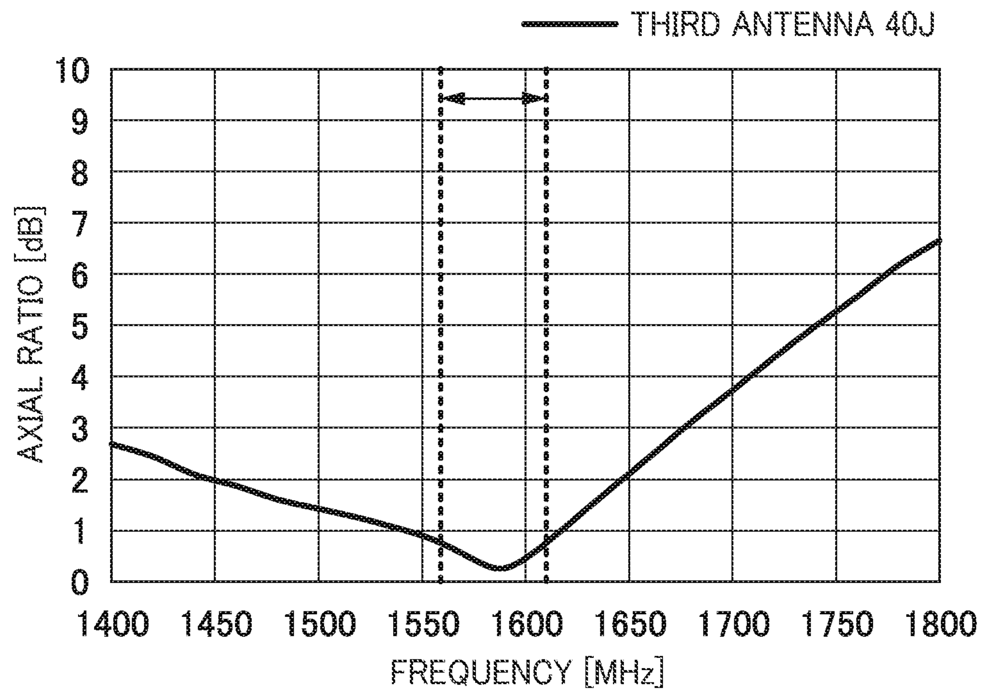
FIG. 32B is a diagram illustrating the frequency characteristics of the axial ratio of a third antenna 40J.

Further, FIG. 31A is a diagram illustrating the frequency characteristics of the VSWRs by port of a third antenna 40I. FIG. 31B is a diagram illustrating the frequency characteristics of the axial ratio of the third antenna 40I. FIG. 32A is a diagram illustrating the frequency characteristics of the VSWRs by port of a third antenna 40J. FIG. 32B is a diagram illustrating the frequency characteristics of the axial ratio of the third antenna 40J. In each of FIGS. 31A to 32B, the dashed line represents the range of the frequency band of radio waves supported by the third antenna.

In FIGS. 29A, 30A, 31A, and 32A, the horizontal axis represents frequency, and the vertical axis represents voltage standing wave ratio (VSWR). In the third antenna, the results of the feeding portion 44 on the port 1 side are given by a solid line, and the results of the feeding portion 45 on the port 2 side are given by a dashed line. Further, in FIGS. 29B, 30B, 31B, and 32B, the horizontal axis represents frequency, and the vertical axis represents axial ratio.

In this verification, when the vertical length of each of the first cutout portion 4 and the second cutout portion 5 is varied in the range from 10 mm to 50 mm, the characteristics of the VSWR on the port 1 side were better than the characteristics of the VSWR on the port 2 side, in the range in which the length is from 10 mm to 30 mm (the ground portion 6G in the fourth modification example), although part thereof is not illustrated. Further, the characteristics of the VSWR on the port 2 side were better than the characteristics of the VSWR on the port 1 side, in the range in which the length is from 40 mm (the ground portion 6J in the seventh modification example) to 50 mm.

The above described points can be also seen from that the characteristics of the VSWR on the port 1 side were better than the characteristics of the VSWR on the port 2 side, when the length is 30 mm (the ground portion 6G in the fourth modification example), as illustrated in FIG. 29A. Further, it can be seen also from that the characteristics of the VSWR on the port 2 side were better than the characteristics of the VSWR on the port 1 side, when the length is 40 mm (the ground portion 6J in the seventh modification example), as illustrated in FIG. 32A.

Further, as illustrated in FIGS. 30A and 31A, in the range in which the length is from 35 mm (the ground portion 6H in the fifth modification example) to 38 mm (the ground portion 6I in the sixth modification example), the characteristics of the VSWR are substantially the same between the ports (port 1 and port 2).

From the above, in this verification, it can be seen that the characteristics of the VSWR on the port 1 side and the characteristics of the VSWR on the port 2 side are reversed in the range in which the length is from 10 mm to 50 mm. That is, it can be seen that in the range in which the length is from 30 mm to 40 mm, the characteristics of the VSWR are substantially the same between the ports (port 1 and port 2) of the third antenna, and the axial ratio of the third antenna is good. Further, in this verification, it can be seen that the range in which the length is from 35 mm to 38 mm is particularly preferable.

Here, as described above, when considering that an example in which the region obtained by forming the ground portion into a quadrilateral is a square corresponds to the seventh modification example in which the length is 40 mm, then the area of the cutout portion 3 (the first cutout portion 4 and the second cutout portion 5) is desirably less than or equal to $ab\text{-}a^2$, where the region obtained by forming the ground portion into a quadrilateral is a square, obtained from Equation 2 described above. Further, it is desirable that the area of the cutout portion 3 (the first cutout portion 4 and the second cutout portion 5) is $(ab\text{-}a^2)/2$ or more.

As described above, such an aspect has been verified in which the axial ratio of the third antenna is improved the most, with the areas of the first cutout portion 4 and the second cutout portion 5 being variously changed. However, it is not limited to the above described case, but the cutout portion 3 only have to be formed such that the difference in reflection loss caused by the difference between the minimum value of the VSWR in the feeding portion 44 on the port 1 side and the minimum value of the VSWR in the feeding portion 45 on the port 2 side is 3 dB or less. With the ground portion having such a cutout portion 3 formed therein, the axis ratio of the third antenna can be improved.

<<Other Modification Examples >>>

Figure 33:
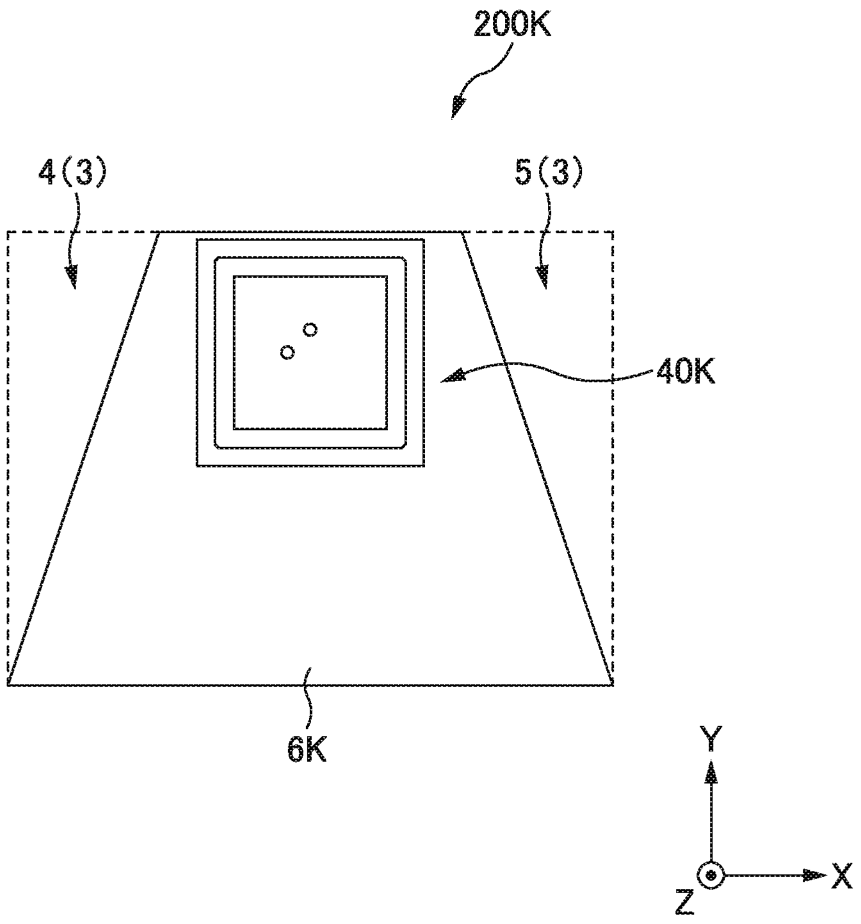
FIG. 33 is an explanatory diagram illustrating an antenna device 200K of an eighth modification example.

FIG. 33 is an explanatory diagram illustrating an antenna device 200K of an eighth modification example.

The external form of the first cutout portion 4 with respect to the quadrilateral region Q (and the external form of the second cutout portion 5 with respect to the quadrilateral region Q) is not limited to a quadrilateral, but may be any other shape. For example, as in the antenna device 200K of the eighth modification example illustrated in FIG. 33, a ground portion 6K may be formed into a trapezoid, with the first cutout portion 4 and the second cutout portion 5 each having a triangular external form. In the antenna device 200K as well, it is possible to improve the axial ratio of a third antenna 40K.

Figure 34A:
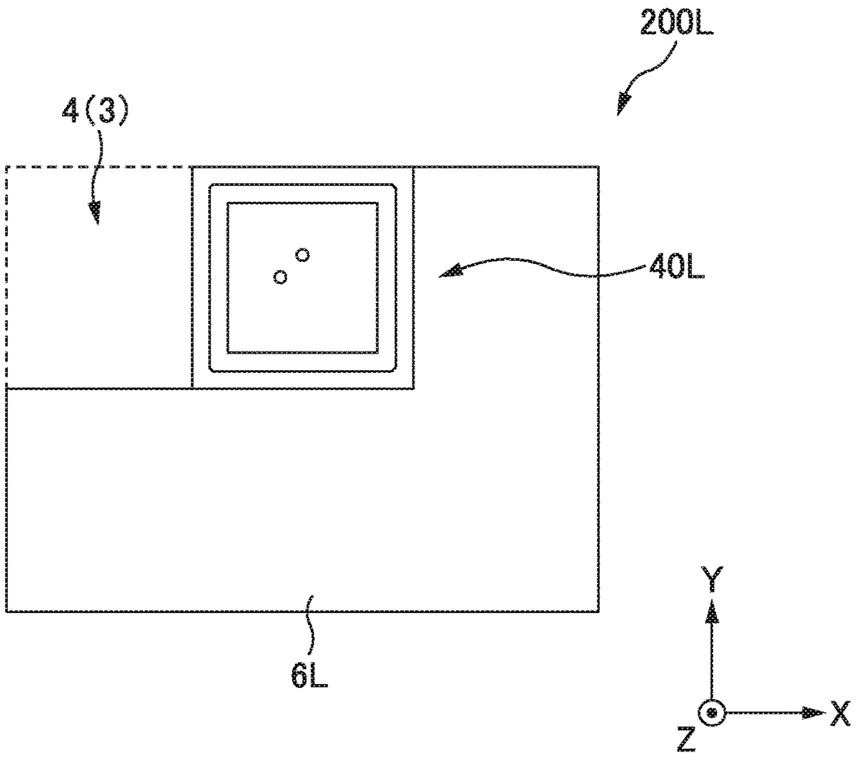
FIG. 34A is an explanatory diagram of an antenna device 200L of a ninth modification example.
Figure 34B:
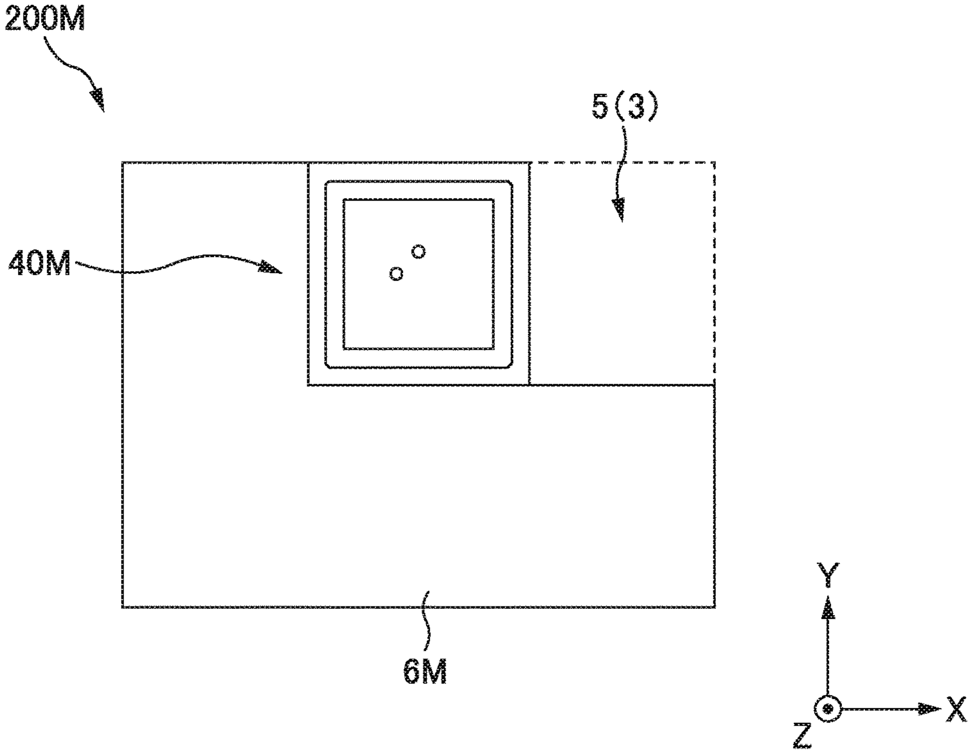
FIG. 34B is an explanatory diagram illustrating an antenna device 200M of a tenth modification example.

FIG. 34A is an explanatory diagram of an antenna device 200L of a ninth modification example. FIG. 34B is an explanatory diagram illustrating an antenna device 200M of a tenth modification example.

The cutout portion 3 is not limited to including both the first cutout portion 4 and the second cutout portion 5, but may include only one of the first cutout portion 4 or the second cutout portion 5. For example, as in the antenna device 200L of the ninth modification example illustrated in FIG. 34A, a third antenna 40L may be disposed at a ground portion 6L including only the first cutout portion 4. Further, as in the antenna device 200M of the tenth modification example illustrated in FIG. 34B, a third antenna 40M may be disposed at a ground portion 6M including only the second cutout portion 5. In the antenna device 200L and the antenna device 200M as well, it is possible to improve the axial ratio of the third antenna (the third antenna 40L and the third antenna 40M).

SUMMARY

According to the present Description, an antenna device of aspects described below is provided.

(Aspect 1)

An aspect 1 comprises: the third antenna 40; and the ground portion 6 at which the third antenna 40 is disposed, the ground portion 6 having an external form obtained by forming the cutout portion 3 in a rectangle, and the cutout portion 3 overlaps with at least a part of the third antenna 40, in side view.

A "patch antenna" corresponds to the "third antenna 40" in an aspect described above.

According to an aspect described above, the axial ratio of the third antenna 40 can be improved.

(Aspect 2)

In an aspect 2, the center 46 of the third antenna 40 is shifted toward the long side of the rectangle having the cutout portion 3 formed therein, relative to the center 9 of the rectangle.

A "first center" corresponds to the "center 46" in an aspect described above. Further, a "second center" corresponds to the "center 9" in an aspect described above.

According to an aspect described above, the axial ratio of the third antenna 40 can be improved.

(Aspect 3)

In an aspect 3, the external form of the ground portion 6 is line-symmetrical with respect to an axis passing through the center 9 of the rectangle, the axis being parallel to the short side of the rectangle.

According to an aspect described above, the axial ratio of the third antenna 40 can be improved.

(Aspect 4)

In an aspect 4, the cutout portion 3 includes the first cutout portion 4 positioned at the first corner 86 of the rectangle.

According to an aspect described above, the axial ratio of the third antenna 40 can be improved.

(Aspect 5)

In an aspect 5, the rectangle includes the second corner 87 located so as to sandwich the third antenna 40 between the first corner 86 and the second corner 87, and the cutout portion 3 further includes the second cutout portion 5 positioned at the second corner 87.

According to an aspect described above, the axial ratio of the third antenna 40 can be improved.

(Aspect 6)

In an aspect 6, the first cutout portion 4 and the second cutout portion 5 are positioned so as to be line-symmetrical with respect to an axis passing through the center 9 of the rectangle, the axis being parallel to the short side of the rectangle.

According to an aspect described above, the axial ratio of the third antenna 40 can be improved.

(Aspect 7)

In an aspect 7, the third antenna 40 includes the feeding portion 44 on the port 1 side and the feeding portion 45 on the port 2 side, and the cutout portion 3 is formed such that the difference in reflection loss caused by the difference between the minimum value of the VSWR in the feeding portion 44 on the port 1 side and the minimum value of the VSWR in the feeding portion 45 on the port 2 side is 3 dB or less.

A "first feeding portion" corresponds to the "feeding portion 44 on the port 1 side" in an aspect described above. Further, a "second feeding portion" corresponds to the "feeding portion 45 on the port 2 side" in an aspect described above.

According to an aspect described above, the axial ratio of the third antenna 40 can be improved.

(Aspect 8)

In an aspect 8, the area of the cutout portion 3 is $ab-a^2$ or less, where a is the length of the short side and b is the length of the long side in the rectangle.

According to an aspect described above, the axial ratio of the third antenna 40 can be improved.

(Aspect 9)

In an aspect 9, the area of the cutout portion 3 is $(ab-a^2)/2$ or more.

According to an aspect described above, the axial ratio of the third antenna 40 can be improved.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

REFERENCE SIGNS LIST

1, 1A, 1C-11, 6, 6A-6M ground portion
2 front surface
3 cutout portion
4 first cutout portion
5 second cutout portion
9 center
30, 40, 40A-40M third antenna
34, 44 feeding portion on the port 1 side
35, 45 feeding portion on the port 2 side
46 center
86 first corner
87 second corner
100, 100A-1001, 200, 200A-200M antenna device

The invention claimed is:

1. An antenna device comprising:
a patch antenna; and
a ground portion at which the patch antenna is disposed, the ground portion having an external form obtained by forming a cutout portion in a rectangle, the cutout portion overlapping with at least a part of the patch antenna, in side view, wherein
the patch antenna includes a first feeding portion and a second feeding portion, and
the cutout portion is formed such that a difference in reflection loss caused by a difference between a minimum value of a voltage standing wave ratio (VSWR) in the first feeding portion and a minimum value of a VSWR in the second feeding portion is 3 dB or less.

2. The antenna device according to claim 1, wherein a first center of the patch antenna is shifted toward a long side of the rectangle having the cutout portion formed therein, relative to a second center of the rectangle.

3. The antenna device according to claim 2, wherein the external form of the ground portion is line-symmetrical with respect to an axis passing through the second center of the rectangle, the axis being parallel to a short side of the rectangle.

4. The antenna device according to claim 1, wherein the cutout portion includes a first cutout portion positioned at a first corner of the rectangle.

5. The antenna device according to claim 4, wherein
the rectangle includes a second corner located so as to sandwich the patch antenna between the first corner and the second corner, and
the cutout portion further includes a second cutout portion positioned at the second corner.

6. The antenna device according to claim 5, wherein the first cutout portion and the second cutout portion are positioned so as to be line-symmetrical with respect to an axis passing through the second center of the rectangle, the axis being parallel to a short side of the rectangle.

7. The antenna device according to claim 1, wherein the area of the cutout portion is $ab-a^2$ or less, where a is a length of a short side and b is a length of the long side, in the rectangle.

8. The antenna device according to claim 7, wherein the area of the cutout portion is $(ab-a^2)/2$ or more.

9. An antenna device comprising:

a patch antenna; and a ground portion at which the patch antenna is disposed, the ground portion having an external form obtained by forming a cutout portion in a rectangle, the cutout portion overlapping with at least a part of the patch antenna, in side view, wherein the area of the cutout portion is ($ab-a^2$) or less, where a is a length of a short side and b is a length of the long side, in the rectangle.

10. The antenna device according to claim 9, wherein a first center of the patch antenna is shifted toward a long side of the rectangle having the cutout portion formed therein, relative to a second center of the rectangle.

11. The antenna device according to claim 10, wherein the external form of the ground portion is line-symmetrical with respect to an axis passing through the second center of the rectangle, the axis being parallel to a short side of the rectangle.

12. The antenna device according to claim 9, wherein the cutout portion includes a first cutout portion positioned at a first corner of the rectangle.

13. The antenna device according to claim 12, wherein the rectangle includes a second corner located so as to sandwich the patch antenna between the first corner and the second corner, and the cutout portion further includes a second cutout portion positioned at the second corner.

14. The antenna device according to claim 13, wherein the first cutout portion and the second cutout portion are positioned so as to be line-symmetrical with respect to an axis passing through the second center of the rectangle, the axis being parallel to a short side of the rectangle.

15. The antenna device according to claim 9, wherein the area of the cutout portion is ($ab-a^2$)/2 or more.

* * * * *